United States Patent [19]
Olarig

[11] Patent Number: 6,047,343
[45] Date of Patent: Apr. 4, 2000

[54] METHOD AND APPARATUS FOR DETECTING INSERTION AND REMOVAL OF A MEMORY MODULE USING STANDARD CONNECTORS

[75] Inventor: Sompong P. Olarig, Cypress, Tex.

[73] Assignee: Compaq Computer Corporation, Houston, Tex.

[21] Appl. No.: 09/307,254

[22] Filed: Apr. 3, 1999

Related U.S. Application Data

[63] Continuation-in-part of application No. 08/658,602, Jun. 5, 1996, Pat. No. 5,943,482, application No. 08/658,538, Jun. 5, 1996, and application No. 08/885,103, Jun. 30, 1997, abandoned.

[51] Int. Cl.[7] ............................................. G06F 13/00
[52] U.S. Cl. ........................... 710/102; 710/103; 711/115
[58] Field of Search .................................. 710/101, 102, 710/103; 711/100, 115; 713/300; 714/47, 48; 370/257; 307/147; 361/683, 686; 439/377

[56] References Cited

U.S. PATENT DOCUMENTS

| | | | |
|---|---|---|---|
| 4,835,737 | 5/1989 | Herrig et al. | 710/103 |
| 5,555,510 | 9/1996 | Verseput et al. | 710/103 |
| 5,568,610 | 10/1996 | Brown | 714/48 |
| 5,625,238 | 4/1997 | Ady et al. | 307/147 |
| 5,805,903 | 9/1998 | Elkhoury | 713/300 |

*Primary Examiner*—Gopal C. Ray
*Attorney, Agent, or Firm*—Sharp, Comfort & Merrett P.C.

[57] ABSTRACT

A method and apparatus for detecting insertion and removal of memory modules in a computer system using standard connectors is disclosed. A memory controller includes logic to read serial presence bits from memory modules incorporating such serial presence features. In response to system software the memory controller monitors a particular slot connector where a memory module is to be inserted or removed. Changes in the serial presence bits indicate insertion or removal. Each slot connector is further connectable to a memory bus for insertion and removal of memory modules while the computer system is operational.

34 Claims, 32 Drawing Sheets

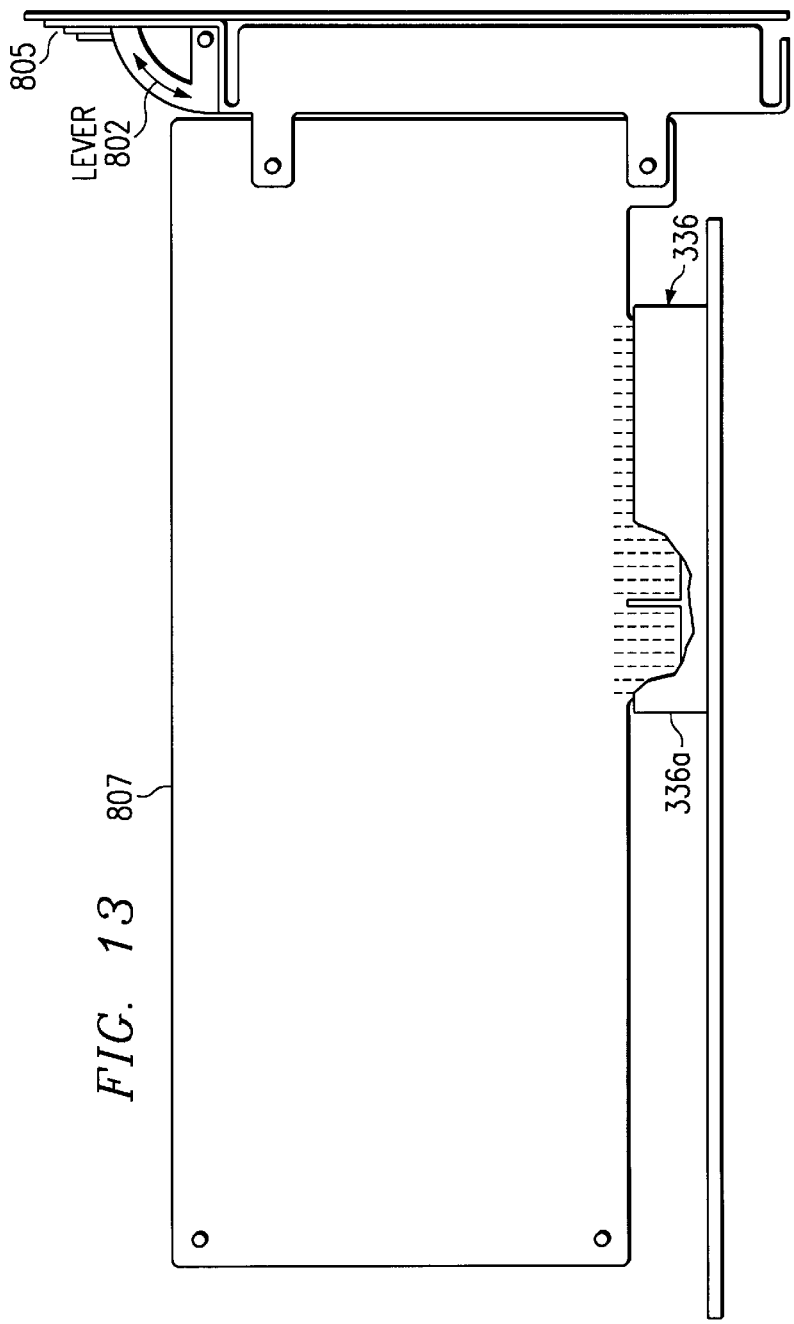
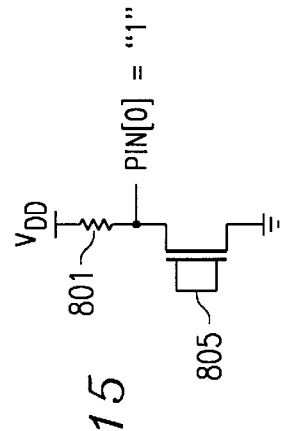
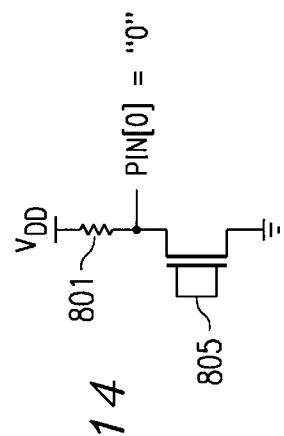

STOP_SCAN = (BYTE_PTR_EQUAL_CNT & GETTING_BYTE) OR
((BYTE[1] & BIT[0] 2 CHECK_SWITCH_ONLY) OR
(BYTE[4] & BIT[0] & !CHECK_SWITCH_ONLY)) & !GETTING_BYTE

METHOD AND APPARATUS FOR DETECTING INSERTION AND REMOVAL OF A MEMORY MODULE USING STANDARD CONNECTORS

CROSS-REFERENCE TO RELATED APPLICATIONS

This application is a continuation-in-part of U.S. application Ser. No. 08/658,602 U.S. Pat. No. 5,943,482 and Ser. No. 08/658,538, filed Jun. 5, 1996, and U.S. application Ser. No. 08/885,103 now abandoned, entitled, "Insertion and Removal of Components of a Computer," filed Jun. 30, 1997.

BACKGROUND OF THE INVENTION

1. Field of the Invention

The invention relates to installation and removal of memory modules of a computer system.

2. Description of Related Art

A typical computer system has memory that stores programs and data. Quite often, the memory is formed from several dynamic random access memory (DRAM) or synchronous DRAM (SDRAM) memory semiconductor packages, or chips. To aid in the removal or addition of several memory chips at once, groups of memory chips typically are packaged together to form a memory board, or memory module (e.g., a SIMM or a DIMM).

The memory module typically includes several memory chips which are mounted to a printed circuit board (PCB). The PCB has circuitry that electrically connects the memory chips together, and the PCB is constructed to plug into memory module connector slot of the system and electrically connect the memory chips to the connector slot.

Typically, to replace a memory module of the system, power to the computer system must be turned off. As a result, operations (e.g., executing software programs) on the system typically must be shut down to install or remove memory modules.

SUMMARY OF THE INVENTION

According to the preferred embodiment of the present invention, a method and apparatus for detecting insertion and removal of memory modules in a slot connnector of a computer system includes the memory module having presence detection logic. The slot connector is selectively connectable to a memory bus and power and clock lines for facilitating insertion and removal of the memory modules while the computer system is operational.

A common presence detect bus is coupled to the slot connector for reading presence detect data from the memory module. Each slot connector is uniquely addressed to read the presence detect data from the memory module contained in the slot connector.

Insertion of the memory module into the slot connector may be detected when valid data is read from the slot connector. Removal of the memory module from the slot connector may be detected when invalid presence detect data is read from the slot connector.

The computer system may also include a memory controller configured to selectively connect the memory bus, power and clock lines to the connector. Power may be applied to the slot connector before reading from the presence detection logic of the memory module. The memory bus and clock line may be connected to the slot connector after insertion of the memory module is detected or may be disconnected from the slot connector before a removal detection is performed to facilitate changing memory modules during computer system operation. A hard disk drive may also be included for storing data that is capable of being held by the memory modules.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIG. 13 is a side view of an expansion card inserted into an expansion card slot connector.

FIGS. 14 and 15 are electrical schematic diagrams of lever circuitry.

DESCRIPTION OF ILLUSTRATIVE EMBODIMENTS

In the ensuing description and in the figures, all signal mnemonics followed or proceeded by a "#", "_", or "!" signify inverted logic states.

Figure 1:
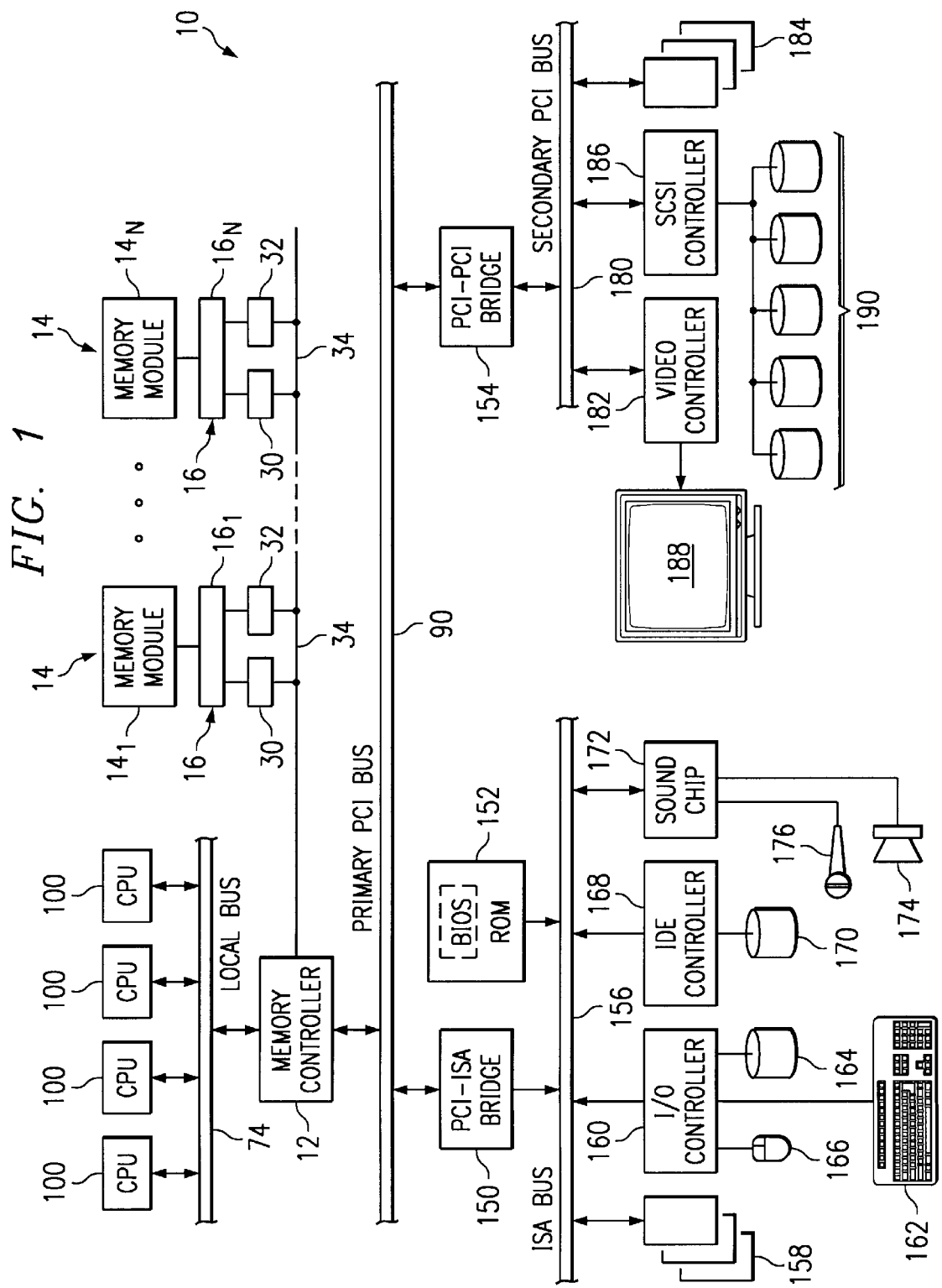
FIG. 1 is an electrical schematic diagram of a computer system.

Referring to FIG. 1, a computer system 10 is constructed to accommodate installation and removal of memory modules 14 (i.e., memory modules $14_1$, $14_2$ ... $14_N$) while the system 10 remains powered up, i.e., the system 10 accommodates "hot plugging" of memory modules 14. As a result, additional memory can be added to the system 10 and defective memory can be replaced without shutting down the system 10.

A memory module may include one or more memory devices attached to a circuit board or carrier. The memory devices may include dynamic random access memories (DRAM), such as fast page mode (FPM) or extended data output (EDO), synchronous DRAMs (i.e. SDRAMs), double data rate SDRAMs (i.e. DDR SDRAMs), Rambus and direct Rambus DRAMs (RDRAMs), and synchronous link DRAMs (SLDRAMs).

The hot plugging features of the computer system 10 are centered around a hot plug memory controller 12 that is constructed to control the connection/disconnection of the memory modules 14 to/from the system 10. Like typical computer systems, the memory module 14 is constructed to be plugged into a memory module slot connector. However, unlike these typical systems, the memory controller 12 is constructed to selectively control when and the manner in which memory module slot connectors 16 (i.e., slot connectors $16_1$, $16_2$ ... $16_N$) are electrically connected to the system 10.

The control by the hot plug controller 12 includes isolating, or disconnecting, connector slot(s) 16 that are empty, or do not hold a memory module, and isolating connected slot connector(s) before inserted memory(s) module can be removed from the connector(s). In this manner, the memory module 14 cannot be inserted into or removed from the slot connector 16 when the connector 16 is connected to the system 10. As a result, specialized hot plug memory modules are not required and off-the-shelf memory modules may be used. Futhermore, once a slot connector 16 is disconnected from the system 10, the memory module inserted into the slot connector 16 may be removed anytime at the convenience of the user without disrupting operations of the system 10.

To install a memory module 14, the memory module 14 is inserted into one of slot connectors 16 that is empty, and an associated lever 18 (see FIG. 7) of that connector 16 is then moved from an open to a closed position which secures the memory module 14 in place. Once the lever 18 is closed, software of the computer system 10 is alerted. In response, the software interacts with the memory controller 12 to install the memory module, as described below.

Removing a memory module 14 from one of the connectors 16 includes moving the lever 18 from a closed position to an open position, waiting until a light emitting diode (LED) 20 (see FIG. 7) associated with the connector 16 turns from red to green, and then dislodging the module 14 from the connector 16. The memory controller 12 is constructed to disconnect an otherwise connected slot connector 16 from the system 10 when the associated lever 18 is moved from the closed position to the open position.

Alternatively, a lever-less embodiment utilizes serial presence detect (SPD) functionality of modern memory modules and memory devices to confirm insertion and removal. Certain memory modules and devices include a small configuration memory typically comprised of electrically erasable read-only-memory (EEPROM) for holding settings, such as density, speed, etc.

In the lever-less embodiment, to install a memory module 14, serial presence detect logic 31 (see FIG. 2) of the memory controller 12 monitors all empty slots connectors 16. Once the memory module 14 is inserted into one of slot connectors 16, the serial presence detect logic will detect its presence and alert software of the computer system 10. In response, the software interacts with the memory controller 12 to complete the installation of the memory module 14, as described below.

Removing a memory module 14 from one of the connectors 16 includes receiving an indication from software of the computer system 10 to remove a particular memory module 14. The software alerts the memory controller 12, and in response, the memory controller 12 disconnects the otherwise connected slot connector 16 from the system 10 and causes the serial presence detect logic 31 to monitor the slot connector 16 for physical removal. Once the software indication is given, a light emitting diode (LED) 20 (see FIG. 7) associated with the slot connector 16 turns from red to green to indicate authorization to remove the memory module 14. When the memory module 14 is physically removed, the serial presence detect logic detects the removal and alerts the software to confirm the removal.

In either embodiment, once disconnected from the system 10, the slot connector 16 remains disconnected down until a memory module 14 is installed in that connector, as described above. Thus, simply moving the lever 18 of an empty slot connector 18 back to the closed position does not turn reconnect the slot connector 16 to the system 10.

Besides moving the lever 18 of a connected slot connector 16 from the closed to the open position, the controller 12 is constructed to disconnect the slot connector 16 from the system 10 in response to other events. These events include the memory controller's detection of a defective memory module 14 (inserted in the connector 16), detection of a power fault in the slot connector 16 and receipt of a software command to disconnect the slot connector 16.

The detection of a power fault and the software command to disconnect are one time events which cause the memory controller 12 to disconnect the appropriate slot connector 16. However, detecting when a memory module is defective, in some arrangements, includes observing the performance of the memory module over a period of time.

The detection of a defective memory module involves an interaction between the memory controller 12 and software (e.g., code from a basic input/output system (BIOS) 151) of the system 10. This interaction includes the memory controller 12 detecting, via error checking and correction logic (FIG. 5), when data that is read from a particular memory module 14 is corrupted. Upon detection, the memory controller 12 alerts software of the system 10 which, in response, notes the corruption as part of an ongoing algorithm to determine if the particular memory module is defective. When the software ultimately determines that the particular module is defective, the software instructs the memory controller 12 via a software command to disconnect the slot connector 16 that holds the module.

The algorithm to identify a defective memory module may be based on a number of different factors. For example, depending on the particular arrangement, the number of defective memory cells in the memory module and the spatial locality of the defective memory locations are factors in determining when to label the memory module as being defective. In some arrangements, the memory controller 12 labels the memory module as defective if just one uncorrectable error occurs in data that is read from the module. In some arrangement, a few defective memory cells (i.e., known as hard errors) are tolerated, and the memory controller 12 masks out the memory cells from the addressable memory space and reboots the system 10. In some arrangements, the memory controller 12 takes advantage of the fact that defective memory locations which are contiguous in memory are more easily masked out by the memory controller 12 than defective memory locations scattered throughout the memory module 14.

In some arrangements, the algorithm takes into account the number of uncorrectable errors that occur in reads from the memory module. In other arrangements, the number of correctable errors is also considered. In some arrangements, the performance evaluation parameters used by algorithm are programmable by a user of the system 10.

In controlling the connection/disconnection of a particular slot connector 16, the memory controller 16 regulates when power is connected to the connector 16 and also regulates when other signals are connected to the slot connector 16. For example, in some arrangements, the memory controller 12 selectively regulates when a system clock line, address lines, data lines and control lines are connected to the slot connectors 16.

When a particular slot connector 16 is connected to the system 10, memory bus 34 lines (e.g., address, data and control lines), clock, and power lines are not connected to the slot connector 16 at the same time. Instead, the memory controller 12 views these lines as belonging to different groups, with each group having a respective type (e.g., a memory bus type, a clock type or a power type). In this manner, in a power up sequence, the memory controller 12 sequences the connection of the different groups to the slot connector 16 based on their types. Similarly, via a power down sequence, the memory controller 12 sequences the disconnection of the different groups from the slot connector 16 based on their types.

As an example of a power up sequence for a slot connector 16 that holds an SDRAM memory module, the memory controller 12 first provides power to the slot connector 16 by connecting the power lines to the slot connector. After allowing time for the power on the memory module inserted in the slot connector 16 to stabilize, the memory controller 12 then connects the clock line to the slot connector 16. Because the clock line is connected to the slot connector 16 after the power lines, circuitry on the memory module is fully turned on before the circuitry is driven by a clock signal.

After connecting the clock line to the slot connector 16, the memory controller 12 next waits for a predetermined duration to permit circuitry on the memory module 14 to become synchronized with and fully functional with the clock signal. Next, the address, data and control lines of the memory bus 34 are connected to the slot connector 16. The memory controller 12 then issues precharge commands to precharge all memory banks of the memory module. Next, the memory controller 12 issues at least eight auto refresh commands before issuing a mode register set command to initialize the mode registers of the SDRAMs of the module to complete the power up sequence.

The power down sequence generally follows the power up sequence in reverse order. In the power down sequence, the memory controller 12 first issue commands to idle the SDRAMs of the memory module. Next, the memory controller 12 disconnects the memory bus 34 lines from the slot connector 16. As a result, glitches from the memory module are prevented from propagating to the bus 34 because the memory module 14 is fully functional with the clock signal when the bus lines are disconnected. After disconnecting the clock line, the memory controller 12 disconnects power from the slot connector 16 to complete the power down sequence.

In other arrangements, other power up and power down sequences are used. For example, the power up and power down sequences may be affected by the type and vendor of the memory module 14. Quite often the vendor of the memory module 14 recommends connecting an external bracket of the module 14 to system ground. This requires, in the power up sequence, that the system ground and the memory board ground be connected together before any other lines are connected to slot connector 16.

Besides the power up and power down sequences, the memory controller 12 is also constructed to perform other functions to aid in installing or removing a memory module 14. For example, when powering up or powering down a particular slot connector 16, the memory controller 12 puts the other memory modules 14 that are not associated with the particular connector 16 in a standby mode. The memory controller 12 brings these modules out of standby mode when the particular slot connector has been connected/disconnected and resumes accessing the remaining modules that are connected, as necessary.

Figure 7:
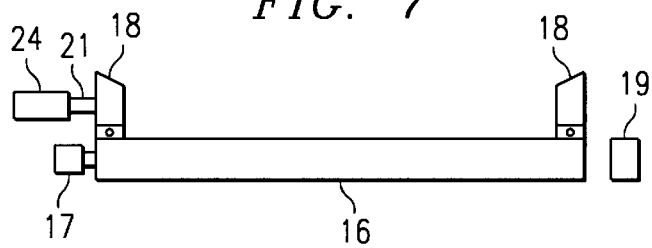
FIG. 7 is a schematic diagram of a memory module slot connector.

In one embodiment, the computer system 10 is also constructed to prevent premature removal of the memory module 14 before the slot connector 16 is disconnected from the system 10. Referring to FIG. 7, to accomplish this, the controller 12 is configured to control electromechanical latches 24 (e.g., solenoid switches). Each different latch 24 is associated with a different slot connector 16. The memory controller 12 activates the latch 24 when the associated slot connector 16 is connected to the system 10 to prevent removal of the inserted memory module 14. The memory controller 12 deactivates the latch 24 when the associated slot connector 16 is disconnected from the system 10.

The latch 24 is positioned so that when the memory controller 12 activates the latch 24, a plunger 21 of the latch 24 engages one of the levers 18 and prevents the lever 18 that is engaged from moving to the open position. When the memory controller 12 deactivates the latch 24, the plunger 21 relaxes and allows the lever 18 to be fully opened and any inserted memory module to be removed.

When a slot connector 16 is disconnected from the system 10, data stored by a memory module 14 inserted in that connector is lost which could cause a shutdown or crash of the system 10. However, the memory controller 12 is constructed to distribute data across the memory modules 14 in a redundant, fault tolerant scheme which permits recovery of the lost data and ensures operations on the computer system 10 continue when one of the memory modules 14 is replaced. In this manner, when a memory module 14 is replaced, the memory controller 12 uses data from the remaining memory modules to restore the otherwise lost data on the replacement memory module. This fault tolerant scheme and the construction of the memory controller 12 are further discussed in U.S. patent application Ser. No. 08/940,282, entitled "Fault Tolerant Memory," filed on the same day as this application, and hereby incorporated by reference.

Restoration of data may not be possible if a user replaces a memory module with another memory module having a smaller size. To prevent this from occurring, before beginning the power up sequence, the memory controller 12 is constructed to check the size of the replacement memory module before beginning the restoration. To accomplish this, the memory controller 12 serially retrieves the size from the memory module. Typically, the size of the memory module is stored in the memory module by the manufacturer in a predetermined location.

If the size of the replacement memory module is too small, then the memory controller 12 alerts software of the computer system 10. This software then informs the user to install a different memory module having a sufficient size and similar type.

Figure 2:
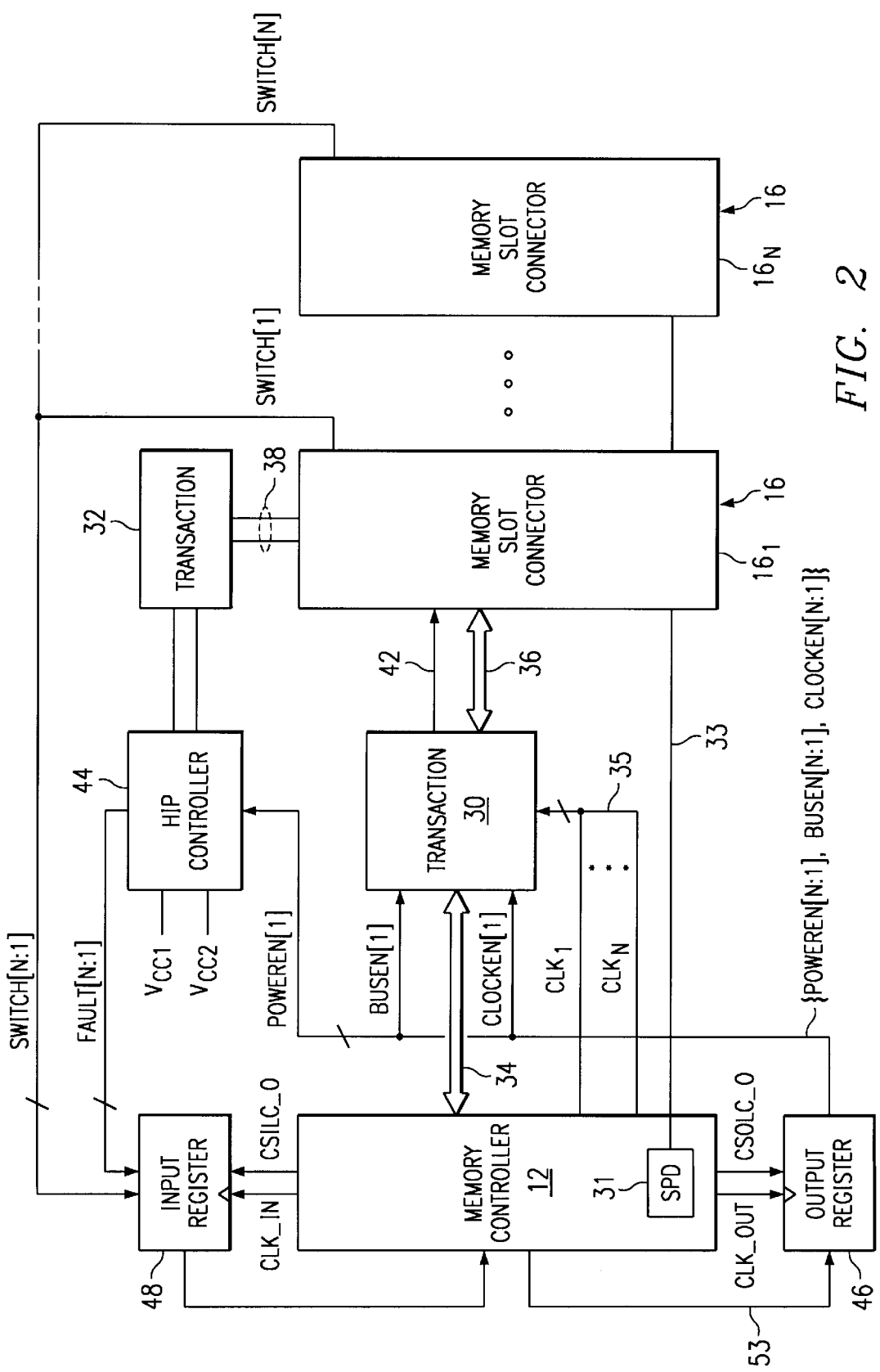
FIG. 2 is an electrical schematic diagram of circuitry for controlling installation and removal of memory modules.

Referring to FIG. 2, for each slot connector 16 (e.g., slot connector 16₁, as shown), the memory controller 12 controls the connection and disconnection of lines to the slot connector 16 through metal oxide semiconductor field-effect (MOSFET), low power transistors 30 and high power transistors 32. The memory controller 12 uses the faster, low power transistors 30 to selectively connect memory bus 34 lines (e.g., control, data and address lines) and one of several system clock lines 35 to the slot connector 16. In this manner, the memory controller 12 uses the transistors 30 to selectively connect the memory bus 34 to a memory bus segment 36 that is hardwired to the slot connector 16. The memory controller 12 also uses the transistors 30 to selectively connect one of the clock lines 35 to a clock line segment 42 that is hardwired to the slot connector 16. The slot connector 16 has spring-type contact fingers that are configured to electrically connect the segments 36 and 42 to the inserted memory module 14. The clock lines 35 include N clock lines with each different clock line 35 carrying a different clock signal (i.e., either $CLK_1$, $CLK_2$, ... or $CLK_N$) for a different slot connector 16.

The memory controller 12 uses the higher power transistors 32 to connect power supply voltages (called VCC1 and VCC2), such as 5V and 3.3 V voltage levels, to power supply lines 38 that are hardwired to the slot connectors 16. The slot connector 16 has spring-type contact fingers that are configured to electrically connect the lines 38 to the inserted memory module 14.

More than one slot connector 16 may be connected to the system 10 at one time, such as the case at power up of the system 10 or when more than one memory module 14 is installed at one time. To limit the in-rush of current flowing to the slot connectors 16 during these connections, in some arrangements, the system 10 has a controller 44 which connects the voltage levels to the different power lines 38 in a sequence.

In this manner, the memory controller 12 indicates to the controller 44 which slot connectors 16 are to receive power, and in response, the controller 44 connects power to the slot connectors 16 in a predetermined sequence. This sequence might include, for example, connecting power to the slot connectors 16 one at a time. The connection of the supply voltage levels to the power lines 38 occurs during a predetermined duration allowed by the memory controller 12 for the power to the slot connectors 16 to stabilize, as described below.

The memory controller 12 generates control signals to control the connection/disconnection of lines during the power up and power down sequences. In turn, these control signals cause drive signals to be generated which operate the transistors 30 and 32. The drive signals include N (for N slot connectors 16) logical (i.e., the signals have either a high or a low value) bus enable signals called BUSEN[N:1]. Each one of the BUSEN[N:1] signals is associated with a different slot connector 16 and indicates (by its assertion, or logical one value) when the memory bus 34 is to be connected to the bus segment 36 that is hardwired to that slot connector 16. The drive signals also include logical clock enable signals called CLOCKEN[N:1]. Each one of the CLOCKEN [N:1] signals is associated with a different slot connector 16 and indicates (by its assertion, or logical one value) when the clock line 35 is to be connected to the clock line segment 42 that is hardwired to that connector 16.

The drive signals also include logical power enable signals called POWEREN[N:1]. Each one of the POWEREN [N:1] signals is associated with a different slot connector 16 and indicates (by its assertion, or logical one value) whether the voltage levels VCC1 and VCC2 should be connected to the power lines 38 that are hardwired to that connector 16. The BUSEN[N:1] and CLOCKEN[N:1] signals are received by the transistors 30, and the POWEREN[N:1] signals are received by the HIP controller 44.

The memory controller 12 also includes serial presence detect logic 31 for reading configuration information bytes or bits from each memory module 14. Serial detection is preferred, but parallel detection could also be implemented. The serial detection logic 31 is adapted to conform with industry standards. One example of the serial detection logic 31 can be found in U.S. patent application Ser. No. 09/114,426, entitled "Method and Apparatus for Supporting Hetrogeneous Memory in Computer Systems," filed Jul. 13, 1998 and hereby incorporated by reference. The serial presence detect logic 31 is a master that communicates with one or more slave memory modules 14 via a serial presence detect bus 33, which includes a serial data line (SDA) and serial clock line (SCL). Each slot connector 16 has a unique slave address. The memory controller 12 can read configuration information such as memory speed and size. Transistors are preferrably not used to for the serial presence detect bus 33 because the bus needs to be active to detect when a memory module 14 is inserted or removed.

Besides furnishing signals to control the connection/disconnection of the slot connectors 16, the memory controller 12 also receives status signals that are indicative of the state of the connectors 16. For example, each slot connector 16 has an associated switch 17 (see FIG. 7) that provides signals called SWITCH[N:1]. Each one of the SWITCH[N:1] signals is associated with a different slot connector 16 and indicates (by its assertion, or logical one value) when the lever 18 of the associated connector 16 is open. The lever and switch are further described in U.S. patent application Ser. No. 08/658,385, entitled "Securing a Card in an Electronic Device," filed Jun. 5, 1996, and hereby incorporated by reference.

As another example of the status signal, the HIP controller 44 provides power fault signals called FAULT[N:1]. Each one of the FAULT[N:1] signals is associated with a different slot connector 16 and indicates (by its assertion, or logical one value) when a power fault (e.g., a short circuit) at the associated slot connector 16 occurs. In other arrangements, the memory controller 12 receives additional status signals.

In some arrangements, the memory controller 12 is located on a semiconductor package, or chip, that is separate from the other circuitry (e.g., the transistors 30 and 32) that is used to control the connectors 16. To minimize the number of input and output pins of the package, in some arrangements, the memory controller 12 is constructed to serially furnish the control signals and serially receive the status signals. Outside of the package, these serial signals are converted into latched parallel signals. To accomplish this, the circuitry outside of the package includes an external output register 46 (for the control signals) and an external input register 48 (for the status signals).

The output register 46 serially receives the control signals from the memory controller 12, and when instructed to do so by the memory controller 12, the output register 46 latches the control signals to furnish the drive signals. The input register 48 serially receives updates of the status signals, and when instructed to do so by the memory controller 12, the output register 46 latches these updates to form the status signals that are serially received by the memory controller 12.

Figure 3:
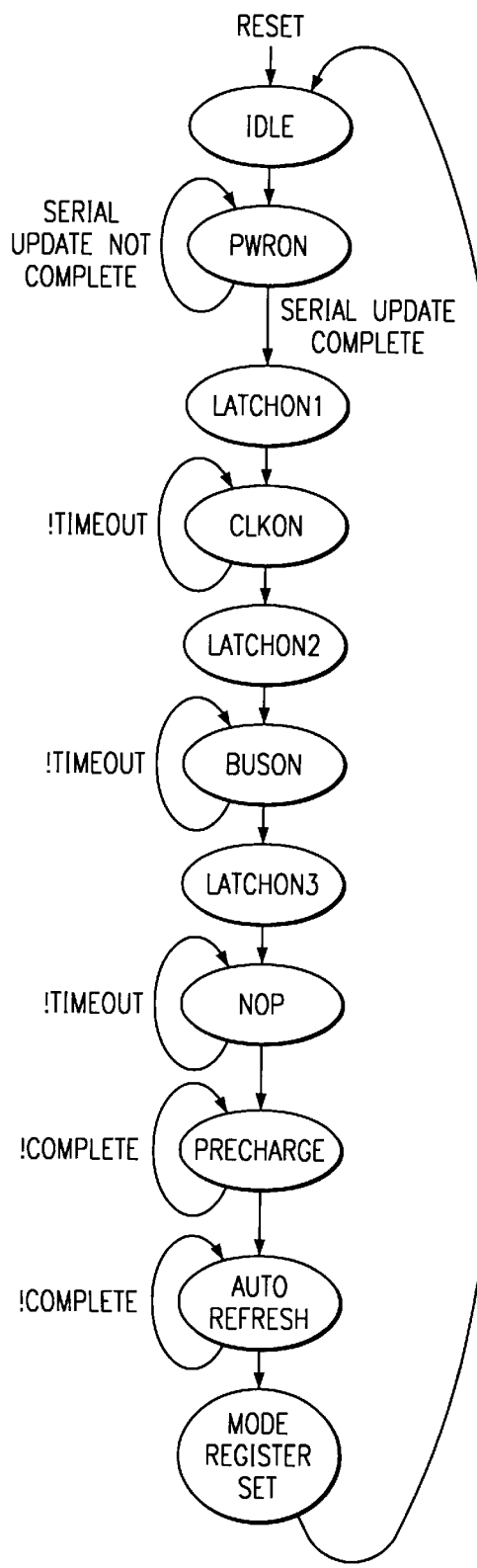
FIG. 3 is a state diagram illustrating a power on sequence.
Figure 4:
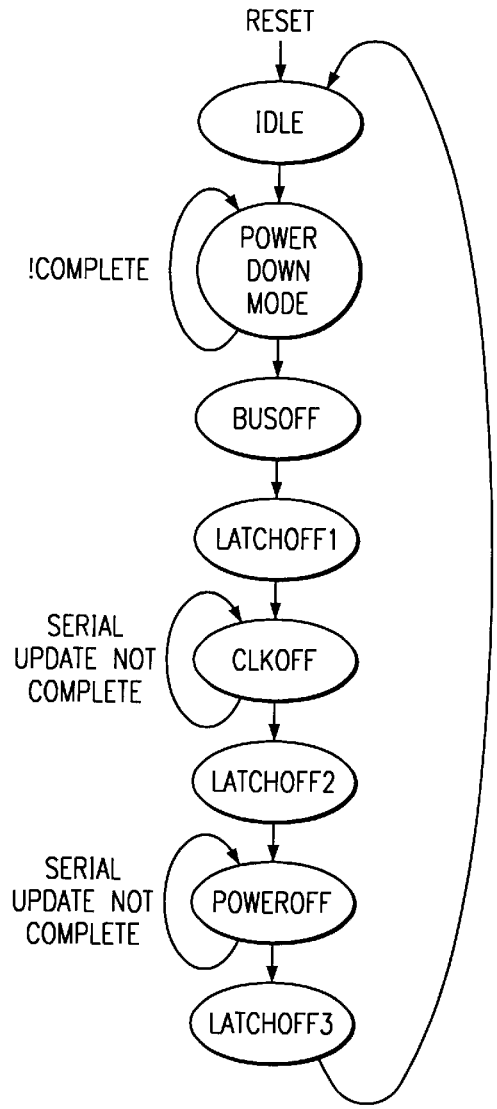
FIG. 4 is a state diagram illustrating a power down sequence.

Referring to FIG. 3, to serially control the power up sequence, the memory controller 12 uses a sequence of shift phases. Each shift phase performs one step of the power up sequence. In this manner, to turn on power to the selected slot connector(s) 16, the memory controller 12 first transitions from an IDLE state to a PWRON state to begin a first shift phase. In the PWRON state, the memory controller 12 serially furnishes a first set of control signals to the output register 46. When the memory controller 12 instructs the output register 46 to latch these control signals in a subsequent LATCHON1 state, the resulting drive signals connect power to the selected slot connector(s) 16 while keeping the clock and the bus 34 disconnected from the selected slot connector(s) 16.

As described, the transistors 30 are used to selectively physically connect/disconnect the clock lines from the memory slot connectors 16. However, in other arrangements, the clock lines are always connected to the connectors 16, and clock enable signals (i.e., CKE signals) are used to selectively control when the memory modules "see" the clock signals of the clock lines.

The memory controller 12 transitions from the LATCHON1 state to a CLKON state to begin a second shift phase of the power up sequence. In the CLKON state, the memory controller 12 shifts a second set of control signals to the output register 46 to connect the clock line 35 to the selected slot connector(s) 16 while leaving the power connected and the bus 34 disconnected. After the shifting of the control signals to the register 46 is complete, the memory controller 12 transitions to a LATCHON2 state in which the controller 12 instructs the output register 46 to furnish the updated drive signals and thus, furnish a clock signal to the selected slot connector(s) 16.

The memory controller 12 next transitions from the LATCHON2 state to a BUSON state to begin a third shift phase of the power up sequence. In BUSON state, the memory controller 12 shifts a third set of control signals to the output register 46 to connect the bus 34 to the selected slot connector(s) 16 while keeping the power and clock lines connected. After the shifting of the control signals to the register 46 is complete, the memory controller 12 transitions to a LATCHON3 state in which the controller 12 instructs the output register 46 to furnish the updated drive signals.

To complete the power on sequence, the memory controller 12 generates several commands for the memory modules 14 that are held by the selected slot connector(s) 16. These commands are transmitted to the selected memory modules 14 via bus cycles on the bus 34. In this manner, the memory controller 12 transitions from the LATCHON3 state to a NOP state in which the memory controller 12 maintains a no operation (NOP) condition at the inputs of the memory module(s) for a predetermined duration (e.g., 100 ms).

Next, the memory controller 12 transitions from the NOP state to a PRECHARGE state in which the memory controller 12 issues precharge commands for all memory banks of the memory module(s) 14 held by the selected slot connector(s) 16. Similarly, the memory controller 12 transitions from the PRECHARGE state to an AUTO_REFRESH state in which the memory controller 12 issues a predetermined number (e.g., eight) of auto refresh commands to the memory module(s) 14 held by the selected slot connector(s). Finally, before transitioning back to the IDLE state, the memory controller 12 issues a mode register set command to initialize the mode registers of the memory module(s) 14 held by the selected slot connector(s) 16.

To disconnect selected slot connector(s) 16 from the system 10 (via the power down sequence), the memory controller 12 first transitions from an IDLE state to a POWERDOWN state in which the memory controller 12 issues commands to place the memory module(s) 14 that are held by the selected slot connector(s) 16 in an idle state. Next, the memory controller 12 transitions to a BUSOFF state to begin a first shift phase of the power down sequence.

In the BUSOFF state, the memory controller 12 serially furnishes a first set of control signals to the output register 46. This first set of control signals negates the appropriate ones of the BUSEN[N:1] signals to disconnect the bus 34 from the selected slot connector(s) 16. After the first shift sequence, the CLOCKEN[N:1] and POWEREN[N:1] remain unchanged. At the completion of the first shift phase, the bits of the output register 46 are updated by the memory controller 12 transitioning from the BUSOFF state to a LATCHOFF1 state in which the controller 12 instructs the output register 46 to furnish the updated drive signals.

The memory controller 12 transitions from the LATCHOFF1 state to a CLKOFF state to begin a second shift phase of the power down sequence. In the CLKOFF state, the memory controller 12 shifts a second set of control signals to the output register 46 to disconnect the clock line(s) 35 from the selected slot connector(s) 16 (via the CLOCKEN[N:1] signals) while leaving the BUSEN[N:1] and POWEREN[N:1] signals unchanged. After the second shift phase is complete, the memory controller 12 transitions to a LATCHOFF2 state in which the controller 12 instructs the output register 46 to furnish the updated drive signals.

The memory controller 12 next transitions from the LATCHOFF2 state to a POWEROFF state to begin a third shift phase of the power up sequence. In this third shift phase, the memory controller 12 shifts a third set of control signals to the output register 46 to disconnect power from the selected slot connectors(s) 16. The BUSEN[N:1] and CLOCKEN[N:1] signals remain unchanged. After the third shift phase, the memory controller 12 transitions to a LATCHOFF3 state in which the controller 12 instructs the output register 46 to furnish the drive signals to complete the power down sequence. The memory controller 12 then transitions from the LATCHOFF3 state to the IDLE state.

Referring back to FIG. 2, both the output 46 and input 48 registers are clocked by clock signals called CLK_OUT and CLK_IN, respectively, which are provided by the memory controller 12. The memory controller 12 instructs the output 46 and input 48 registers to latch the updated control signals through latch signals called CSOLC_O and CSILC_O, respectively. The output register 46 serially receives the control signals from the memory controller 12 via a serial input line 53, the input register 48 serially furnishes the status signals to the memory controller 12 via a serial output line 51.

The memory controller 12 (via the serial input line 53) serially scans the bits of the input register 48 with the N least significant bits of the input register 48 being the SWITCH [N:1] signals. The memory controller 12 is constructed to detect a change in any one of the logical status of the SWITCH[N:1] signals (i.e., detect when the open/closed status of one of the levers 18 change) and generate a maskable interrupt upon this occurrence. If one of the levers 18 of an associated slot connector 16 that is powered up transitions from a closed position (securing the associated memory module 14) to an open position (not securing the associated memory module 14), the memory controller 12 then disconnects that slot connector 16 from the system 10.

The memory controller 12 debounces detected changes in the SWITCH[N:1] signals. In this manner, in some arrangements, when the logical level of a particular SWITCH[N:1] signal changes, the new logical level must remain stable for a debounce scan interval (e.g., 100 ms) before the memory controller 12 validates the change. During the debounce scan interval, the memory controller 12 slows down the scanning of the bits of the register 48 so that the bits are scanned a predetermined number (e.g., 10) of times. If a change in any of the switch signals is detected during this scan interval, the debounce scan interval is restarted. After no changes are detected for the debounce scan interval, the memory controller 12 returns to scanning the bits of the register 48 at the faster rate.

The memory controller 12 does not debounce the non-switch status signals when a change in logical level of one the non-switch status signals is detected. However, as is the case for the SWITCH[N:1] signals, the memory controller 12 generates an interrupt when a change in logical level of one of the non-switch status signals is detected.

In the latch-less embodiment, since switches are not present debouncing of the switch signals is no longer needed. The serial presence detect logic 31 is used in lieu of the switches to indicate insertion or removal of a memory module 12. In the case of an insertion, the memory controller 12 monitors the empty slot connector 16 via the serial presence detect bus 33 for a change of the serial presence data bytes. When the memory module 14 is inserted into the slot connector 16 and powered, valid serial presence data bytes will be read by the memory controller 12 indicating insertion. In the case of a removal, when the serial presence bytes no longer match those previously read by the memory controller 12, removal or power-down is indicated.

Figure 34A:
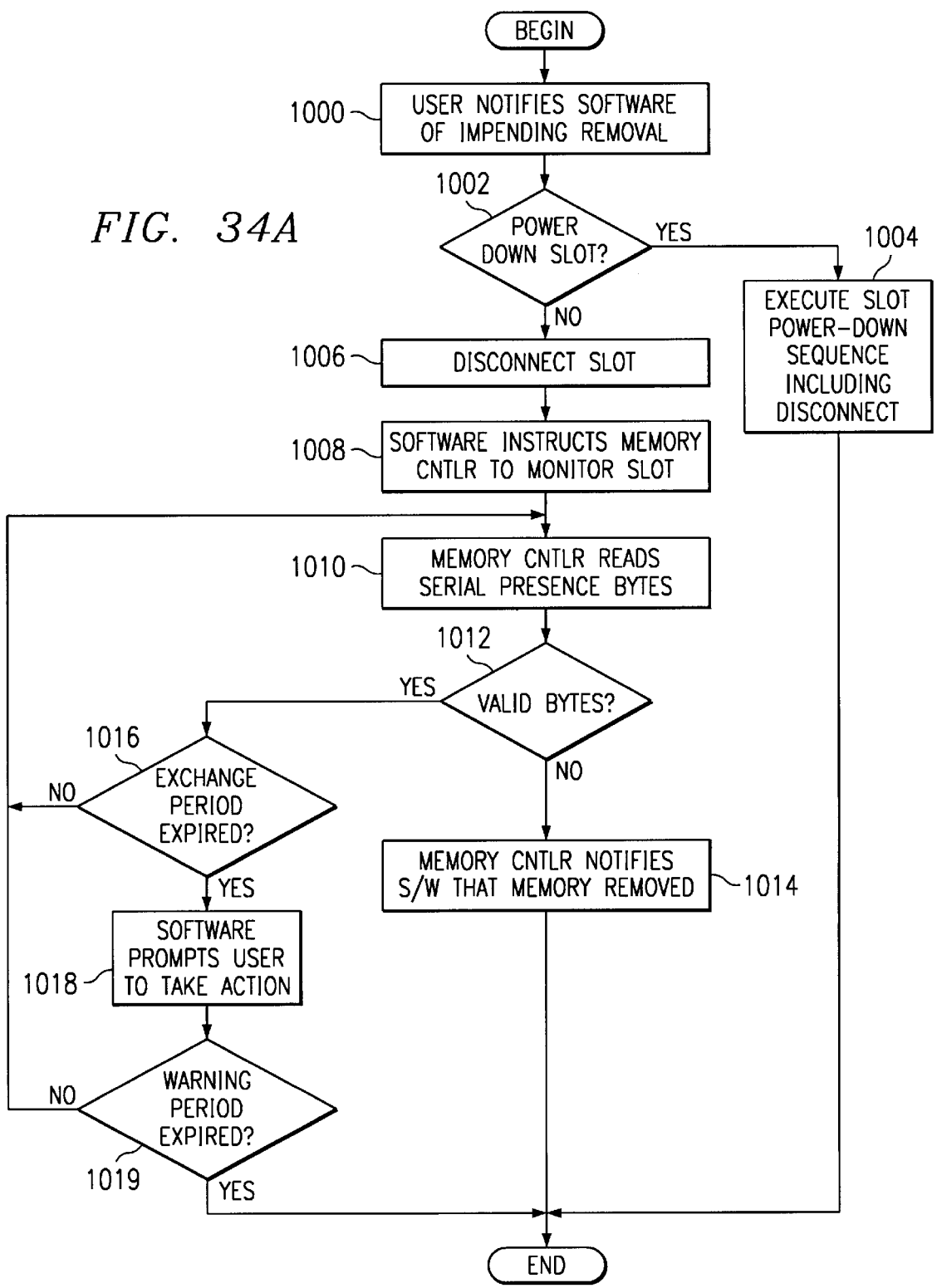
FIGS. 34A and 34B are flow diagrams illustrating a sequence of events for detecting insertion and removal of memory modules.
Figure 34B:
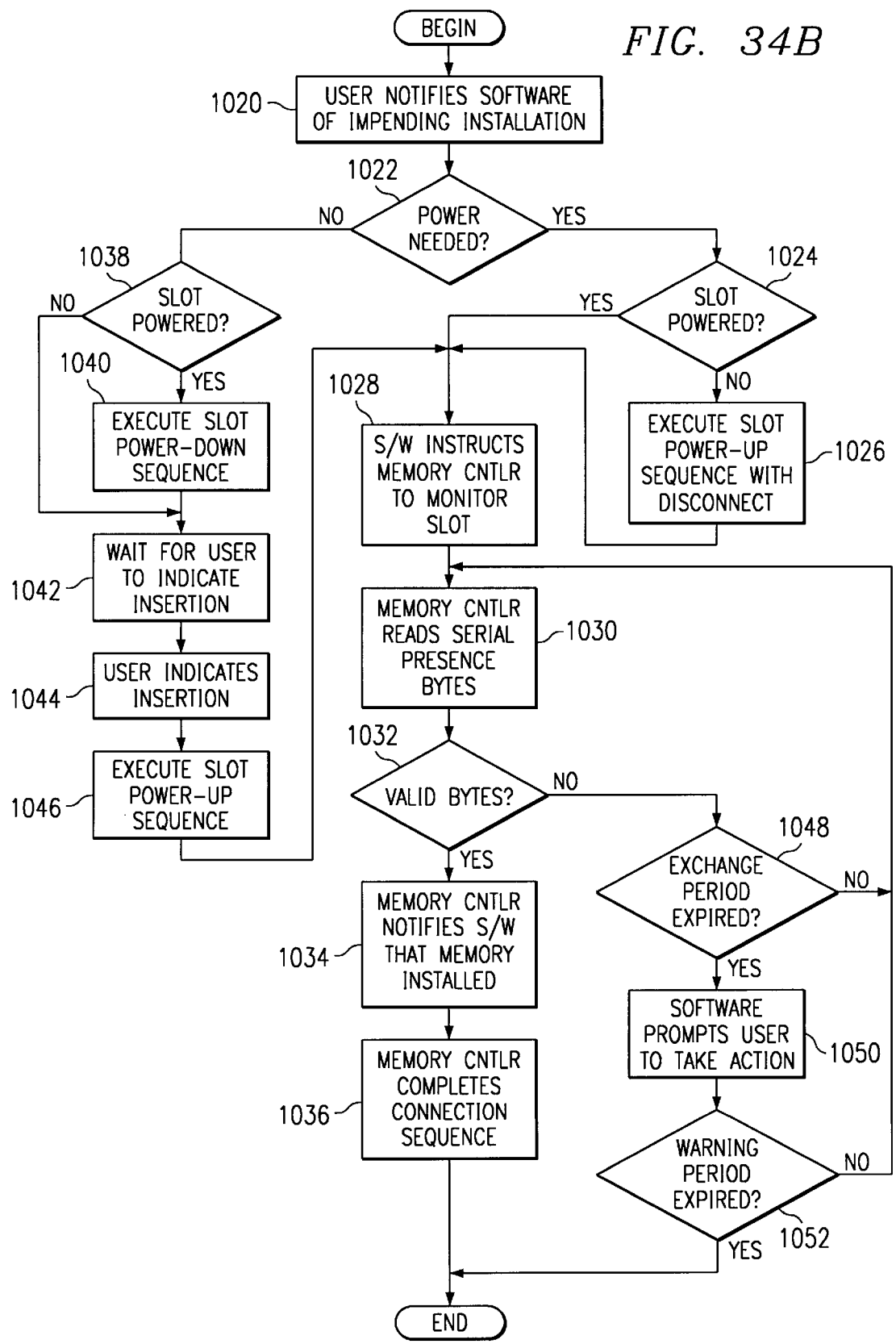

Referring to FIGS. 34A and 34B there are illustrated a flow diagram of events associated with the detection of insertion and removal of the memory module 14 according to the preferred embodiment. This mechanism is particularly useful for fault tolerant memory schemes, like the one described above, which can continue to operate with one defective memory module 14.

Referring first to FIG. 34A, the memory presence detection sequence begins after a memory module 14 has been identified as defective by the memory controller 12 and the system software has been notified. At a step 1000, the user or administrator indicates through the system software that the defective memory module 14 will be removed for replacement. The memory module 14 may be removed either with power still applied or with the slot powered off. Preferrably the user indicates his requirement when the removal indication is given in step 1000. Alternatively, the power requirement could be initialized during a configuration step and saved in the software initialization settings or even a bit in the memory controller 12.

At step 1002, the power requirement is determined. If the slot connector 16 is required to be powered down, then the sequence continues to step 1004 where the power-down sequence described herein is executed to disconnect power, the memory bus 34 and clock lines. If the slot connector 16 is required to be powered, then the sequence continues to step 1006 where the slot connector 16 is disconnected from the memory bus 34 as described herein, except that the serial presence bus and power lines are not disconnected. The sequence continues to step 1008 where the system software instructs the memory controller 12 to monitor the serial presence bits of the particular slot connector 16.

At step 1010, the memory controller 12 reads the serial presence bits from the particular slot connector 16. At step 1012, the memory controller determines whether the serial presence bits are different from when the slot connector 16 was last read, and therefore invalid. If the bits are identical, the sequence branches to step 1016 to determine whether an exchange period has expired.

A timer is located in the memory controller 12 to count-down the exchange period and a warning period, but alternatively, the system software could independently warn the user of an impending abort if action is not taken within the exchange period and the warning period. For example, the user is given a certain exchange period, such as two minutes, to remove the memory module 14 and a further warning period, such as 30 seconds, before the operation is aborted. Alternatively, the user could be requested to provide an indication of whether to continue and if no user indication is received during the warning period the operation can be aborted. If it is determined at step 1016 that the exchange period has not expired, the sequence returns to step 1010. If the exchange period has expired, the sequence proceeds to step 1018 where system software is caused to prompt the user to take action within the warning period or the operation will be aborted. During this step 1018, a clock may be displayed on the screen 188 showing the user the time remaining before the operation is aborted. The sequence continues to step 1019 to determine whether the warning period has expired. If the warning period has expired, the removal operation is aborted. If at step 1019 the warning period has not expired, the sequence returns to step 1010.

If at step 1012, the bits are different or incomprehensible, the sequence continues to step 1014 where the memory controller notifies the system software that the memory module 14 of the particular slot connector 16 has been removed.

If the slot connector 16 is powered-down in step 1004, the memory controller 12 is unable to confirm removal of the defective memory module 14. However, the system software will implicitly understand that the memory module 14 was removed when the user indicates his readiness to insert the replacement memory module 14.

Turning now to FIG. 34B, there is illustrated a flow diagram of a sequence of events relating to the insertion of a replacement memory module 14. It is understood that this method is not limited to the installation of defective memory modules only. This method is also useful to detect the presence of a memory module when an additional memory module is added to the system (i.e., hot-add memory).

At step 1020, the user notifies the system software of his intention to install the new or replacement memory module 14. At step 1022, the system software determines whether the slot connector 16 should be powered-up for installation. If power is needed, the sequence continues to step 1024 to determine if power is already applied to the slot connector 16. If so, the sequence continues to step 1028, discussed below. If not so, the sequence continues to step 1026 where the system software instructs the memory controller 12 to connect the power lines to the slot connector as discribed herein. The memory bus 34 and clock lines are not connected at this stage.

At step 1028, the system software instructs the memory controller 12 to monitor the serial presence bytes of the particular slot connector 16. At step 1030, the memory controller 12 reads the serial presence bits from the particular slot connector 16. At step 1032, the memory controller determines whether the serial presence bits are different from when the slot connector 16 was last read, and therefore valid. If the bits are identical or incomprehensible, the sequence branches to step 1048 to determine if the exchange period has expired.

If it is determined at step 1048 that the exchange period has not expired, the sequence returns to step 1030. If the exchange period has expired, the sequence proceeds to step 1050 where system software is caused to prompt the user to take action within the warning period or the operation will be aborted. During this step 1050, a clock may be displayed on the screen 188 showing the user the time remaining before the operation is aborted. The sequence continues to step 1052 to determine whether the warning period has expired. If the warning period has expired, the installation operation is aborted. If at step 1052 the warning period has not expired, the sequence returns to step 1030 for the memory controller to again read the serial presence bits.

If at step 1032, the bits are different or comprehensible, the sequence continues to step 1034 where the memory controller notifies the system software that the memory module 14 of the particular slot connector 16 has been inserted. From step 1034, the sequence continues to step 1036 where the system software instructs the memory controller 12 to complete the connection sequence including connecting the memory bus 34 and clock lines in accordance with the sequence described herein.

If at step 1022, the system software determines that the slot connector 16 does not need power applied during the installation, the sequence continues to step 1038 where the system software determines whether the slot connector 16 is already powered. If so, the sequence continues to step 1040 where the power-down sequence described herein is executed. If the slot connector 16 is not powered, processing continues to step 1042.

At step 1042, the system software waits for the user to provide an indication that the memory module 14 has been inserted into the slot connector 16. At step 1044, the user indicates to the system software that the memory module 14 has been inserted and the sequence continues to step 1046 where a complete power-up sequence is performed to connect the memory bus 34 and power and clock lines. At this point, the sequence preferably continues to execute steps 1030–1034 to confirm the insertion. Alternatively, the system software could proceed directly to the end and complete the process without the confirmation.

Figure 5:
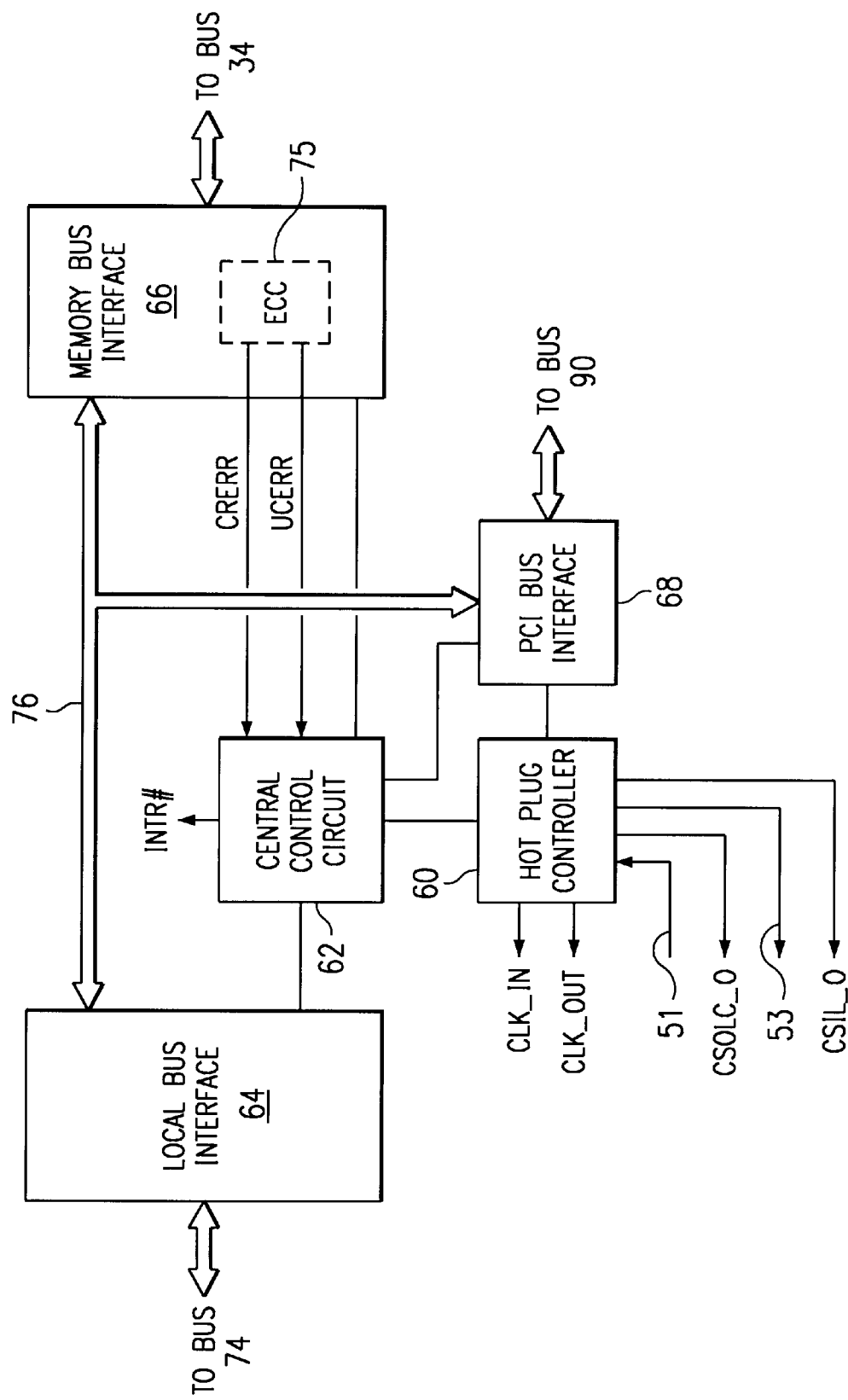
FIG. 5 is an electrical schematic diagram of the memory controller.

Referring to FIG. 5, the memory controller 12 has a hot plug controller 60 that is constructed to receive hot-plug related software commands, monitor the status of the slot connectors 16 (e.g., the open/closed status of the levers 18) and control the power up and power down sequences. Besides the hot plug controller 60, the memory controller has local 64, Peripheral Component Interconnect (PCI) 68, and memory 66 bus interfaces that are constructed to communicate with a local bus 74 (see FIG. 1), a PCI bus 90 and a memory bus 34, respectively.

A central control circuit 62 coordinates the flow of data between the interfaces 64, 66 and 68 and coordinates the general non-hot plug activity of the memory controller 12. The control circuit 62 also generates the bus cycles for the power up and power down sequences. These cycles include an auto refresh cycle, a precharge cycle and a mode register set cycle. Data, addresses and commands are passed between the interfaces 64, 66 and 68 via an internal bus 76. As typical, the interfaces 64, 66 and 68 have buffers (e.g., first-in-first out (FIFO) buffers) to synchronize data flow between the buses 34, 74 and 90.

The memory bus interface 75 includes error code correction (ECC) circuitry 75. All data retrieved from the memory modules 14 passes through the ECC circuitry 75 which detects when the data is corrupted. If corrupted data is recoverable, the ECC circuitry 75 corrects the data and informs the control circuit 62 by asserting a correctable error signal called CRERR. If the corrupted data is not recoverable, the ECC circuitry 75 does not correct the data and informs the control circuit 62 by asserting an uncorrectable error signal called UCERR.

In typical computer systems that use ECC memory, if the data is uncorrectable by using ECC code, a nonmaskable interrupt (NMI) is generated which typically crashes the computer system. However, the memory of the system 10 is organized in a fault tolerant scheme that allows correction of corrupted data that cannot be corrected by the ECC information. In this manner, if the ECC circuitry 75 determines that the data is not correctable with the ECC information, the central control circuit 62 generates a maskable interrupt (i.e., not an NMI) called INTR#, and the redundant, fault tolerant scheme is used to restore the corrupted data, as further described in "Fault Tolerant Memory," U.S. patent application Ser. No. 08/940,282.

For correctable data, the control circuit 12 also asserts the INTR# interrupt signal every time corrupted data is detected. In response, software of the computer system interacts with the control circuit 62 to determine whether the memory module 14 should be replaced. As discussed above, based on the number of data corruptions and/or whether or not the corrupted data is correctable, the software determines whether the memory module 14 needs to be replaced. In other arrangements, hardware is used to determine whether a memory module needs to be replaced.

The hot plug controller 60 generates the CSIL_O, CSOL_O, CLK_IN, CLK_OUT, and $CLK_1$–$CLK_N$ signals. The hot plug controller 60 serially receives the status signals via the serial input line 51 and serially furnishes the control signals via the serial output line 53. The hot plug controller 60 is also constructed to communicate with the control circuit 62 to generate the cycles on the memory bus 34 during the power up and power down sequence.

Figure 6:
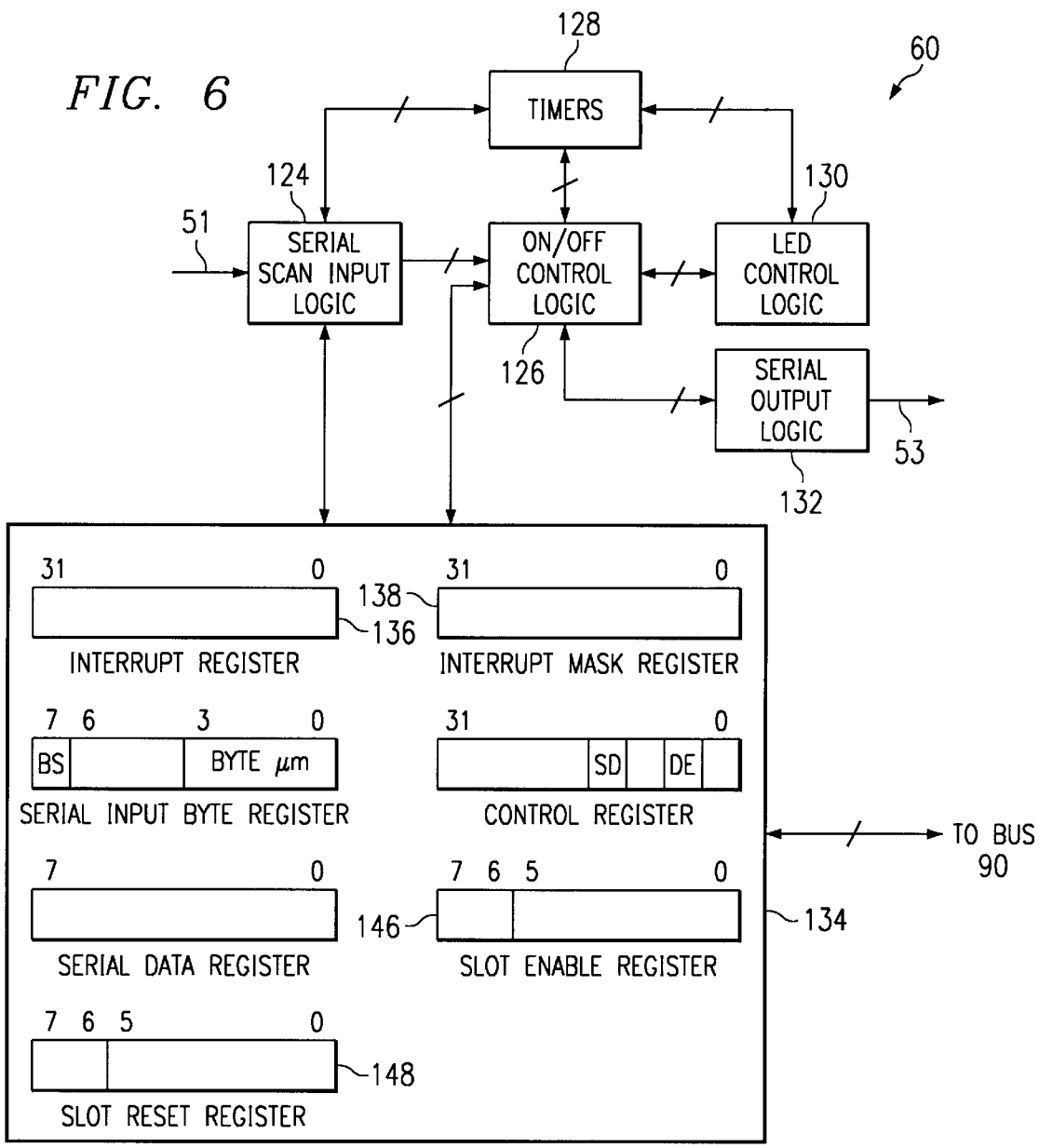
FIG. 6 is an electrical schematic diagram of hot plug logic of the memory controller.

Referring to FIG. 6, to accomplish its functions, the hot plug controller 60 has serial scan logic 124 that scans the status signals via the serial input line 51, as described above. When the lever 18 of an associated powered up slot connector 16 transitions from closed to open, the serial scan input logic 124 informs on/off control logic 126 which controls the timing of the power up and power down sequences.

Timers 128 are coupled to the serial scan input logic and the on/off logic 126. The timers 128 generate the delays for the power up and down sequences and generate the delay used to debounce the status signals. The timers 128 and on/off control logic 126 are also coupled to LED control logic 130 which controls the state (red or green) of the LEDs 19 (see FIG. 6) based on the state of the power up/power down sequence. Serial output logic 132 is coupled to the on/off control logic 126 and furnishes the control signals to the serial output line 53.

The hot plug controller 60 also has a block of registers 134 that is coupled to the PCI bus interface 68 (for software access), the serial scan input logic (for updates based on the status signals), and the on/off control logic 126 (for updates based on the state of the power up/power down sequence). The registers 134 include an interrupt register 136 that is updated by the serial scan input logic 124 to indicate the debounced, or validated, logic level of the status signals. The register 136 has different bits, and each bit indicates the state of a different status signal.

The registers 134 also include an interrupt mask register 138 which is programmable by software to selectively mask the generation of interrupts when the states of selected status signals change. The register 138 has different bits, and each bit is associated with one of the status signals.

For software to connect up one of the slot connectors 16, the registers 134 also include a slot enable register 146. Each bit of the register 146 is associated with a different slot connector 16. To connect a particular connector 16 to the system 10, software sets the level of the associated bit equal to a logic one value. Otherwise the bit has a logic zero value. Regardless of what is written to the slot enable register 146, the hot plug controller 134 does not connect up a slot connector 16 that has its associated lever 18 open.

For software to disconnect one of the slot connectors 16, the registers 134 include a slot disable register 148. Each bit of the register 148 is associated with a different slot connector 16. To disconnect a particular connector 16, software sets the level of the associated bit equal to a logic one value. Otherwise, the bit has a logic zero value.

Referring back to FIG. 1, besides the memory controller 12 and memory modules 14, the computer system 10 has processor slots to accommodate up to four central processing units (CPU)s. The processor slots are coupled to the local bus 74. Coupled to the primary PCI bus 90 are a PCI-Industry Standard Architecture (PCI-ISA) bridge 150 and a PCI-PCI bridge 154. The PCI-ISA bridge 150 interfaces the primary PCI bus 90 to an ISA bus 156.

A read only memory (ROM) 152 contains a copy of the BIOS code (which is shadowed in the memory modules 14) and is coupled to the ISA bus 156. Also coupled to the ISA bus 156 are ISA slot connectors 158, an input/output (I/O) controller 160, an Intelligent Device Electronics (IDE) controller 168 and a sound chip 172. The I/O controller 160 receives input from a keyboard 162 and a mouse 166. The I/O controller 160 also controls a floppy disk drive 164. The IDE controller 168 controls operation of a CD-ROM drive 170. The sound chip 172 receives audio input via a microphone 176 and plays audio output via a speaker 174.

The PCI-PCI bridge 154 interfaces the primary PCI bus 90 to a secondary PCI bus 180. A video controller 182, Small Computer Systems Interface (SCSI) 186 and PCI expansion slot connectors 184 are coupled to the secondary PCI bus 180. The video controller 182 drives a display 188, and the SCSI controller 186 controls an array 190 of disk drives.

Figure 8:
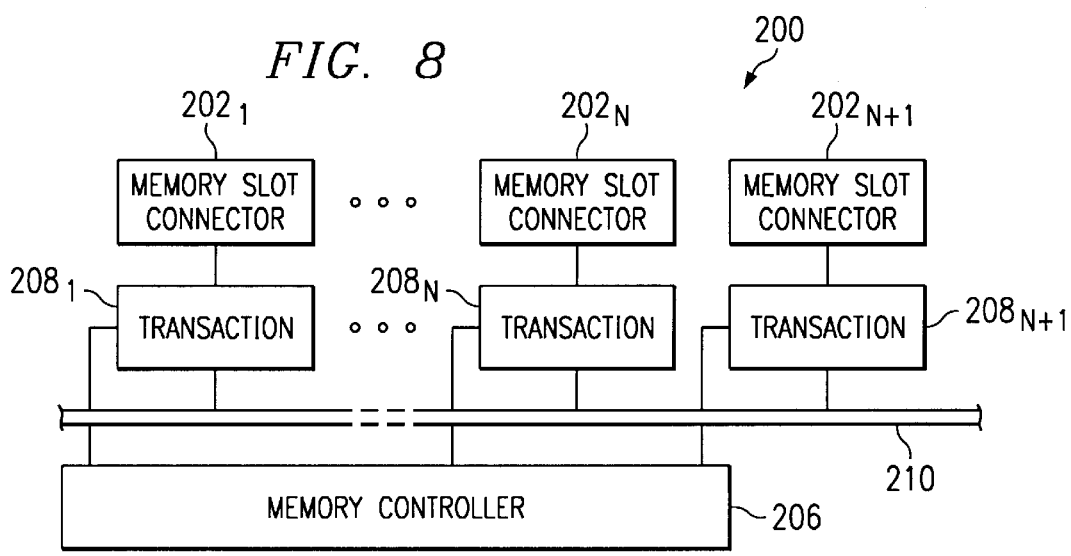
FIG. 8 is a schematic diagram of a memory subsystem.

In other arrangements, instead organizing the memory in a fault tolerant array, a fail over memory module is used. For example, referring to FIG. 8, a memory subsystem 200 of a computer system has N+1 memory slot connectors 201 (i.e., slot connectors $201_1$, . . . , $201_N$, and $201_{N+1}$) that are connected/disconnected to/from a memory bus 210 by associated sets 208 (i.e., sets $208_1$, . . . , $208_N$, and $208_{N+1}$) of transistors. All but one of the modules plugged into the connectors 202 are used for data storage, and the remaining module is used as a failover memory module.

A memory controller 206 uses the sets 208 of transistors to allow hot plugging of memory modules, as described above. However, to replace a memory module that is defective, the memory controller 206 is constructed to first transfer data from the defective module to the failover memory module, place the modules in a sleep mode, and then isolate the defective memory module via the transistors. This arrangement is further described in U.S. patent application Ser. No. 08/763,411, entitled, "Failover Memory For a Computer System," filed Dec. 11, 1996, and is hereby incorporated by reference.

In other arrangements, devices other than the memory modules 14 may be hot plugged. For example, referring to FIGS. 9, 12 and 13, a computer system 310 has six hot plug card connectors, or slot connectors 336 (slot connectors 336a–f), of a card platform 330 in which conventional expansion cards 807 can be inserted and removed (i.e., hot plugged) while the computer system 310 remains powered up. Six mechanical levers 802 are used to selectively secure (when closed, or latched) the expansion cards 807 that are inserted into corresponding hot plug slot connectors 336.

For purposes of removing or inserting the expansion card 807 into one of the slot connectors 336, the corresponding lever 802 must be opened, or unlatched, and as long as the lever 802 is opened, the corresponding slot connector 336 remains powered down. When the lever 802 is closed, the corresponding card 809 may then be powered up (described below). When powered up, the slot connectors 336 electrically connect cards 807 that are inserted to a Peripheral Component Interconnect (PCI) bus 332 of the computer system 310.

A hot plug controller 350 (connected to the bus 332) selectively powers up and down the slot connectors 336. To prevent the corruption of a bus cycle on the bus 332 when one of the slot connectors 336 is being powered up or down, the hot plug controller 350 acquires control of the bus 332 (i.e., owns the bus 332) during selected portions of these events. Because the controller 350 owns the bus 332, bus cycles associated with other bus devices (connected to the bus 332) are not interrupted or corrupted due to the propagation of connection/disconnection glitches down to the bus 332. The hot plug controller 350 acquires the bus 332 using conventional arbitration request and grant lines which allows preexisting bus cycles to terminate in an orderly fashion. To maintain control of the bus 332 after the grant, the controller 350 furnishes (i.e., initiates and completes) pseudo, or dummy bus cycles 200 (see FIGS. 10 and 11), on the bus 332.

The dummy bus cycles 200 are not used for passing data via the bus 332 (like a real bus cycle), but rather, each dummy bus cycle 200 is used to simulate a real bus cycle so that no other bus device may acquire the bus 332 during the selected portions of the power up and power down sequences. In accordance with the PCI rules of arbitration, an arbiter 327 (part of the PCI—PCI bridge circuit 326) can grant ownership of the bus 332 to another bus device before the current owner of the bus 332 (i.e., the current bus master) has completed furnishing its own cycles on the bus 332. This other bus device waits until the bus 332 becomes idle before acquiring the bus 332 and furnishing its cycles on the bus 332. Without the dummy bus cycles 200, the controller 350 may lose ownership of the bus 332 due to the idle state of the bus 332. However, as a result of the dummy bus cycles 200, the controller 350 maintains ownership of the bus 332.

The controller 350 functions as both the initiator and the target for each dummy bus cycle 200. Functioning as the initiator, the controller 350 furnishes a memory cycle to a pseudo address only recognized by the controller 350. To accomplish this, basic input/output system (BIOS) code executed from a read only memory (ROM) 323 (see FIG. 9) assigns a unique base address range to the hot plug controller 350. Functioning as the target, the controller 350 claims the memory cycle. After a predetermined delay, the controller 350 completes the transaction. However, data is not stored by the controller 350.

Figure 10:
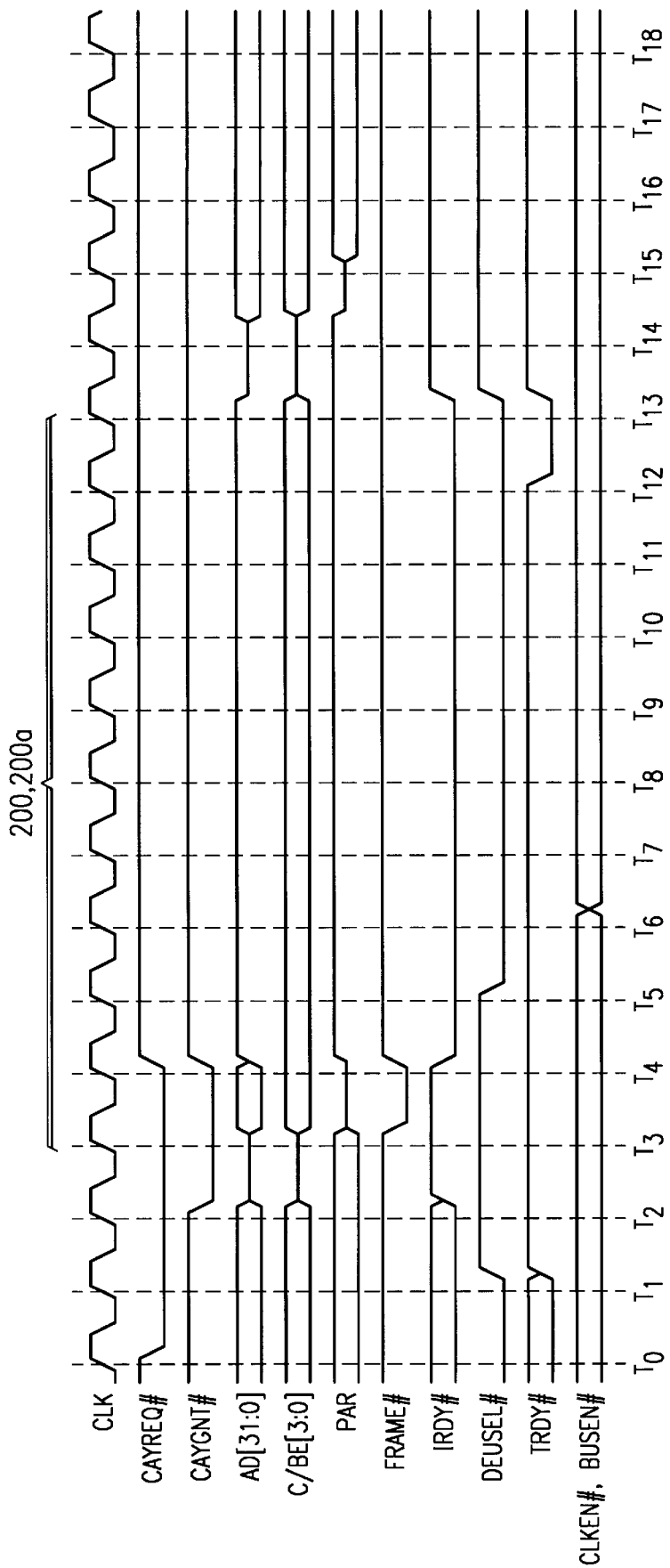
FIGS. 10 and 11 are timing diagrams of dummy bus cycles.
Figure 11:
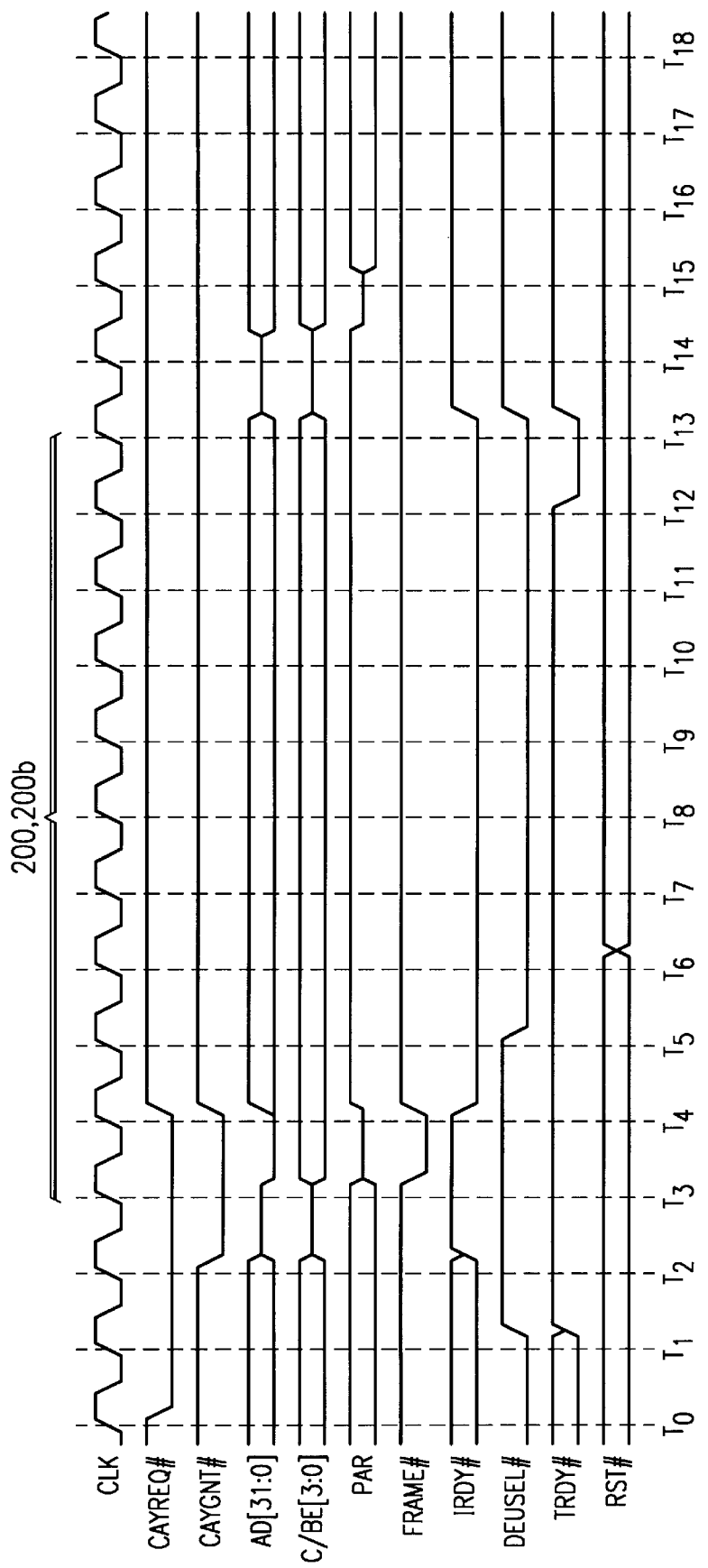

Referring to FIGS. 10 and 11, the hot plug controller 350 requests control of the bus 332 by asserting (at time T0) a PCI request signal CAYREQ# assigned to the controller 350. Subsequently, at time T2, the arbiter 327 grants the controller 350 access to the bus 332 by asserting a PCI grant signal CAYGNT# assigned to the controller 350. After the bus 332 has been granted (at time T3) to the controller 350, the controller 350 begins the dummy bus cycle 200 by asserting the PCI FRAME# signal, which indicates, by its assertion, that both a command and an address for the dummy bus cycle 200 are present on the bus 332.

After the arbiter 327 deasserts the grant signal CAYGNT# (at time T4), the arbiter 327 may grant the bus 332 to the next future bus owner. This future bus owner monitors the bus 332 for an idle state to determine when the controller 350 has finished using the bus 332. For example, the future bus owner may monitor the bus 332 to determine if an initiator ready signal IRDY# or PCI FRAME# signal has been asserted by the controller 350. Either the IRDY# signal or the FRAME# signal is used to indicate, by its assertion, that a bus cycle is in progress on the bus 332. If the IRDY# or FRAME# signal is not asserted by the time the arbiter 327 deasserts the grant signal CAYGNT#, then the future bus owner can furnish a cycle on the bus 332. To prevent this from occurring, the controller 350 asserts the FRAME# signal and then the IRDY# signal which allows the controller 350 to maintain control of the bus 332. Besides asserting the IRDY# signal at time T5, the controller asserts the device selection signal DEVSEL# to claim the transaction on the bus 332. As another example, the future owner may monitor the bus 332 for the assertion of the PCI FRAME# signal. At time T5, the controller 350 asserts the device selection signal DEVSEL# to claim the transaction on the bus 332.

To extend the duration of the dummy bus cycle 200, the controller 350 introduces wait states by waiting until time T12 to assert a target ready signal TRDY# to indicate the readiness of the controller 350 (i.e., the target) to complete transaction. Once the signal TRDY# is asserted, the dummy bus cycle 200 is completed in one PCI clock signal (i.e., at time T13). Thus, the duration of the dummy bus cycle 200 is ten clock cycles (from time T3 until time T13).

When the lever 802 that secures the expansion card 807 to its slot connector 336 is opened, the computer system 310 senses this occurrence and powers down the card 807 (and corresponding slot connector 336) before the card 807 can be removed from the corresponding slot connector 336. Slot connectors 336 that are powered down, like other slot connectors 336 not holding cards 807, remain powered down until software of the computer system 310 selectively powers up the slot connectors 336.

A card 346 (see FIG. 9) inserted into a card slot connector 334 (see FIG. 12) has the hot plug controller 350 which monitors the securement status (open or closed) of the levers 802 and powers down any card 807 (and corresponding slot connector 336) that is not secured by its lever 802. Software of the computer system 310 can also selectively power down any one of the slot connectors 336. The controller 350 may alternatively be hardwired to the bus 332.

The cards 807 are powered up through a power up sequence and powered down through a power down sequence. In the power up sequence, power is first supplied to the card 807 being powered up (while the card 807 is held in reset), and thereafter, a PCI clock signal (from the PCI bus 332) is furnished to the card 807 being powered up. The reset signal for the card 807 being powered up is then negated which brings the card 807 out of reset, and the card 807 sees an idle bus 332 since the communication lines of the bus 332 are not yet connected. Lastly, remaining PCI bus communication lines (e.g., address and data lines) of the card 807 are coupled to corresponding lines of the PCI bus 332, and the card 807 then sees the middle of a dummy cycle 200.

In other embodiments, in the power up sequence, the bus communication lines are connected to the card 807 before the card 807 is reset. For this arrangement, the dummy bus cycle 200 is used to place the bus 332 in a near idle state. When the card 807 comes out of reset, the FRAME# is deasserted and only the IRDY# signal is asserted. Thus, from the perspective of the newly powered up card 807 coming out of reset, this condition approximates an idle bus.

The power up sequence allows the circuitry of the card 807 being powered up to become fully functional with the PCI clock signal before the remaining PCI bus communication lines are connected to the card 807, The controller 350 arbitrates for and acquires, or owns, the bus 332 when the PCI clock signal and PCI communication lines are connected to the card 807 and when the card 807 is brought out of reset. When the controller 350 owns the bus 332, the controller 350 furnishes a dummy cycle 200. Because the controller 350 has control of the PCI bus 332 during these portions of the power up sequence, potential glitches on the PCI bus 332 from the power up sequence do not disturb operations of other cards 807 that are already powered up.

In the power down sequence, the controller 350 arbitrates and acquires the bus 332 when the card 807 is placed in reset, when the PCI bus communication lines of the card 807 being powered down are disconnected from the card 807, and when the PCI clock signal is disconnected from the card 807. During the power down sequence, each time the controller 350 acquires, or owns, the bus 332, the controller 350 furnishes a dummy bus cycle 200 to the bus 332. Each time the controller 350 owns the bus 332, potential glitches on the bus 332 from the power down sequence are prevented from disturbing operations of the other cards 807 that remain powered up.

The controller 350 is constructed to furnish one of two types (type A or type B) of dummy cycles 200. For a type A dummy bus cycle 200a, the address and data furnished to the bus 332 is representative of "FFFF_FFFFh" (where the suffix "h" indicates a hexadecimal representation) which keeps the address data lines of the bus 332 at their logic one state. Since the communication lines of the card 807 are unbiased also (i.e., since no transfer of energy occurs across switches connecting the communication lines of the card 807 to the communication lines of the bus 332), switching noise (e.g., electromagnetic interference generated by metal-oxide-semiconductor field-effect-transistors (MOSFETs)) associated with logic level transitions on the bus 332 is minimized. In the dummy bus cycle 200b (the type B dummy cycle), the address and data furnished to the bus 332 is representative of "0000_0000h."

The dummy bus cycle 200b is used in other embodiments when, during the power up sequence, the communication lines of the bus 332 are connected to the card 807 before the card 807 is brought out of reset. In these embodiments, the hot plug controller 350 might respond to the dummy bus cycle 200 if the card 807 detects a glitch on the FRAME# signal. To prevent this, the address and data furnished by the dummy cycle 200a is representative of an address (i.e., "0000_0000h") not recognized by the card 807. Thus, regardless of which portion (i.e., data or address) of the dummy bus cycle 200b is present on the bus 332 when the card 807 comes out of reset, the card 807 does not respond.

Because the slot connectors 336 may be either thirty-two bit or sixty-four bit slots, this status must be provided to the newly powered up card 807 through use of the PCI signal REQ64#. System logic (not shown) of the computer system 310 informs the card 807 (during the power up sequence) whether or not the slot connector 336 is a sixty-four bit slot by asserting (to indicate a sixty-four bit slot) or deasserting (to indicate a thirty-two bit slot) a slot specific signal called REQ64# for at least ten PCI clock cycles before deasserting the reset signal that is received by the card 807.

Besides the above-described hot plug system, the computer system 310 (FIG. 9) also includes a central processor unit (CPU) 314 and a level two (L2) cache 316, which are both coupled to a local bus 322. A system controller/host bridge circuit 318 interfaces the local bus 322 to a primary Peripheral Component Interconnect (PCI) bus 324 and controls access to a system memory 320 (coupled to the local bus 322). The PCI—PCI bridge circuit 326 controls access between the primary PCI bus 324 and the secondary PCI bus 332. A PCI-Extended Industry Standard Architecture (EISA) bridge circuit 315 interfaces the primary PCI bus 324 to an EISA bus 317. An input/output (I/O) circuit 321, a read only memory (ROM) 323 and an Intelligent Device Electronics (IDE) controller 309 are all coupled to the EISA bus 317. The I/O circuit 321 receives input from a keyboard 319 and a mouse 313 and controls operation of a floppy disk drive 312. The IDE controller 309 controls operation of a hard disk drive 311.

Figure 12:
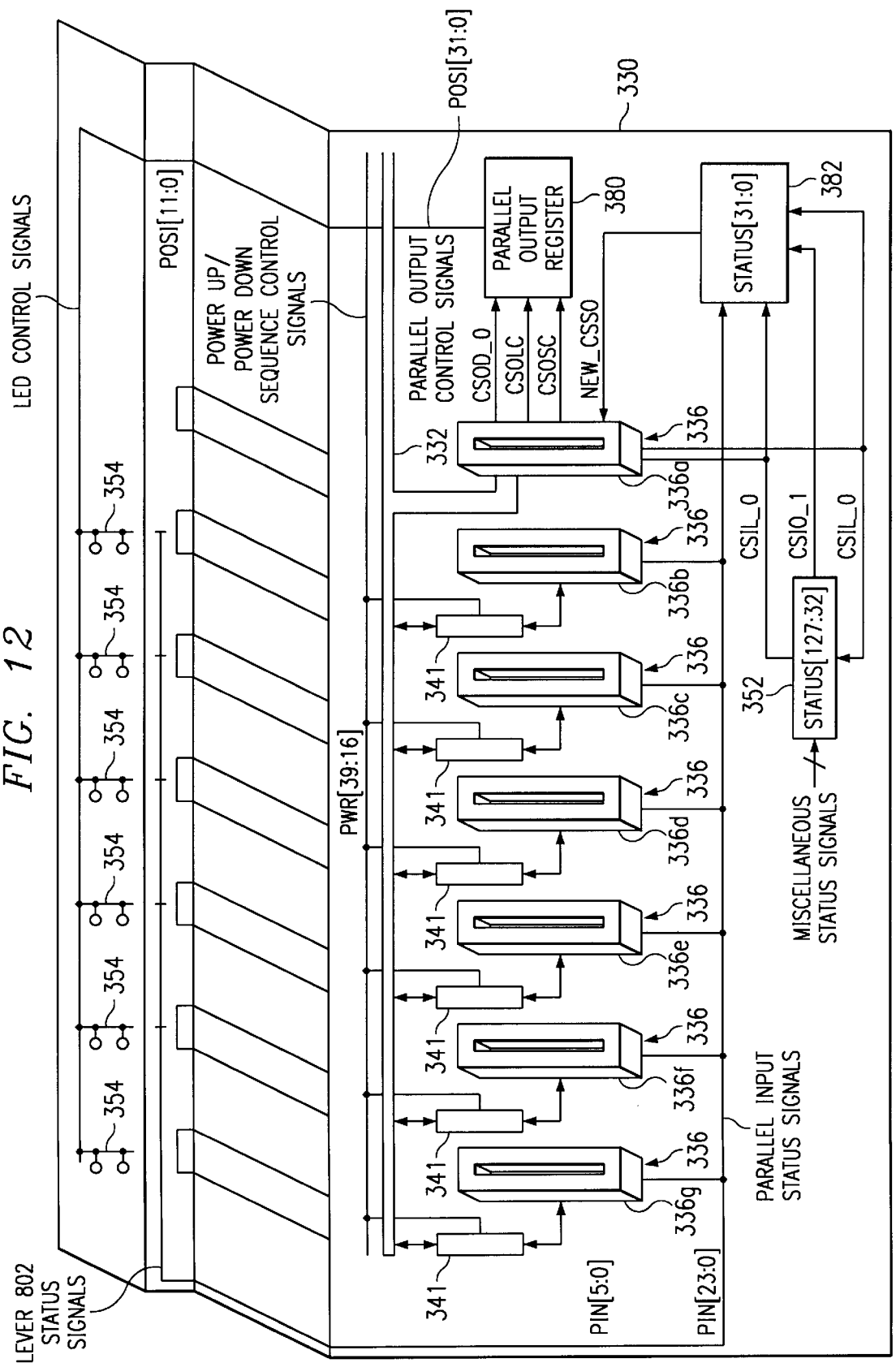
FIG. 12 is a perspective view of the expansion card slots of FIG. 9.

Referring to FIG. 12, the controller 350 controls the power up and power down sequences of the slot connectors 336 through twenty-four control signals POUT[39:16]. The control signals POUT[39:16] are a subset of forty output control signals POUT[39:0] generated by the controller 350. The control signals POUT[39:16] are latched versions of slot bus enable signals BUSEN#[5:0], slot power enable signals PWREN[5:0], slot clock enable signals CLKEN#[5:0] and slot reset signals RST#[5:0], all internal signals of the controller 350, further described below. The control signals POUT[39:0] and their relationship to the signals BUSEN#[5:0], PWREN[5:0], CLKEN#[5:0] and RST#[5:0] are described in the following table:

| SIGNAL POSITION | DESCRIPTION | ASSOCIATED CONTROL SIGNALS | WHEN SIGNAL IS ACTIVE |
|---|---|---|---|
| 0–11 | Control signals for LEDs 354 | | |
| 12–15 | General purpose output signals | GPOA[3:0] | |
| 16 | Reset signal for slot connector 336a | (RST#[0]) | Low |
| 17 | Reset signal for slot connector 336b | (RST#[1]) | Low |
| 18 | Reset signal for slot connector 336c | (RST#[2]) | Low |
| 19 | Reset signal for slot connector 336d | (RST#[3]) | Low |
| 20 | Reset signal for slot connector 336e | (RST#[4]) | Low |
| 21 | Reset signal for slot connector 336f | (RST#[5]) | Low |
| 22 | Clock enable signal for slot connector 336a | (CLKEN#[0]) | Low |
| 23 | Clock enable signal for slot connector 336b | (CLKEN#[1]) | Low |
| 24 | Clock enable signal for slot connector 336c | (CLKEN#[2]) | Low |
| 25 | Clock enable signal for slot connector 336d | (CLKEN#[3]) | Low |
| 26 | Clock enable signal for slot connector 336e | (CLKEN#[4]) | Low |
| 27 | Clock enable signal for slot connector 336f | (CLKEN#[5]) | Low |
| 28 | Bus enable signal for slot connector 336a | (BUSEN#[0]) | Low |
| 29 | Bus enable signal for slot connector 336b | (BUSEN#[1]) | Low |
| 30 | Bus enable signal for slot connector 336c | (BUSEN#[2]) | Low |
| 31 | Bus enable signal for slot connector 336d | (BUSEN#[3]) | Low |
| 32 | Bus enable signal for slot connector 336e | (BUSEN#[4]) | Low |
| 33 | Bus enable signal for slot connector 336f | (BUSEN#[5]) | Low |
| 34 | Power enable signal for slot connector 336a | (PWREN[0]) | High |
| 35 | Power enable signal for slot connector 336b | (PWREN[1]) | High |
| 36 | Power enable signal for slot connector 336c | (PWREN[2]) | High |
| 37 | Power enable signal for slot connector 336d | (PWREN[3]) | High |
| 38 | Power enable signal for slot connector 336e | (PWREN[4]) | High |
| 39 | Power enable signal for slot connector 336f | (PWREN[5]) | High |

PARALLEL OUTPUT CONTROL SIGNALS (POUT[39:0])

Figure 16:
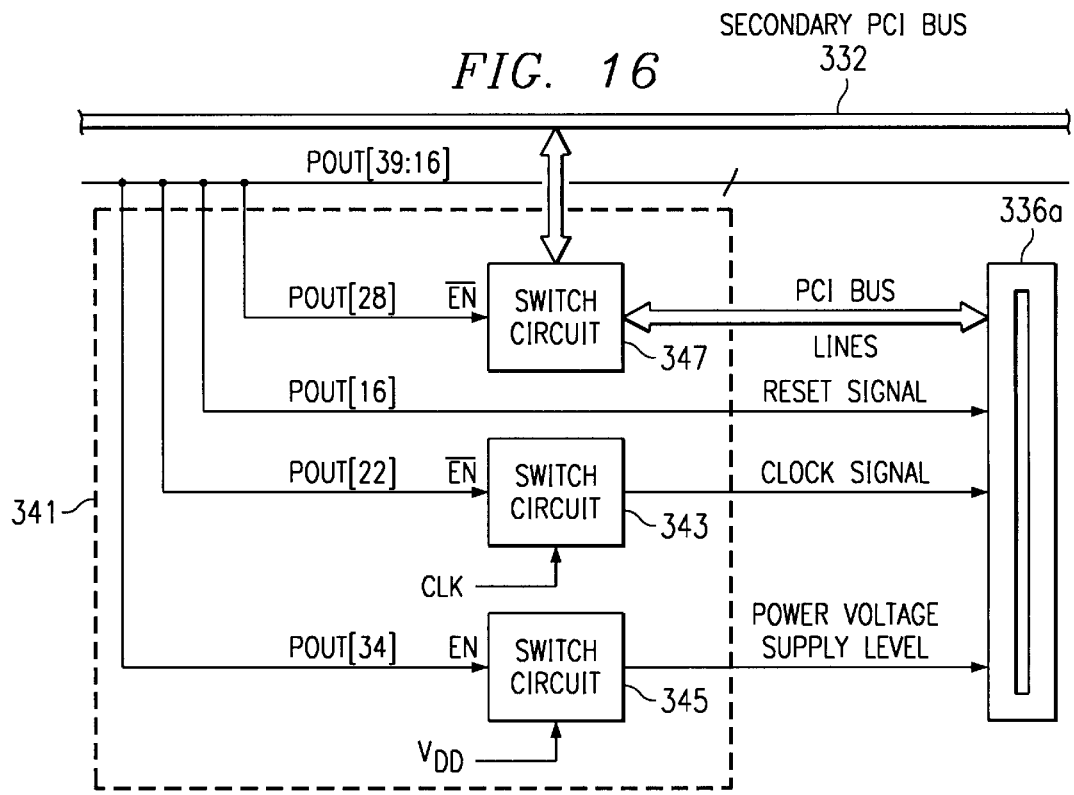
FIG. 16 is a schematic diagram illustrating circuitry for each expansion card slot.

Each hot plug slot connector 336 has associated switch circuitry 341 for connecting and disconnecting the slot connector 336 to and from the PCI bus 332. The switch circuitry 341 for each slot connector 336 receives four of the control signals POUT[39:16]. As an example, for the slot connector 336a, when the control signal POUT[28] (see FIG. 16) is asserted, or low, the slot connector 336a is connected to the bus signal lines of the PCI bus 332 by a switch circuit 347. When the control signal POUT[28] is deasserted, or high, the slot connector 336a is disconnected from the bus signal lines of the PCI bus 332.

When the control signal POUT[22] is asserted, or low, the slot connector 336a is connected to a PCI clock signal CLK through a switch circuit 343. When the control signal POUT[22] is deasserted, or high, the slot connector 336a is disconnected from the clock signal CLK.

When the control signal POUT[34] is asserted, or high, the slot connector 336a is connected to a card voltage supply level V$_{DD}$ through a switch circuit 345. The voltage supply V$_{DD}$ is a supply voltage furnished by one of the voltage supply lines (i.e., a +12V, −12V, +5V or 3.3V line) of the bus 332. When the control signal POUT[34] is deasserted, or low, the slot connector 336a is disconnected from the card voltage supply level V$_{DD}$.

When the control signal POUT[16] is asserted, or low, the slot connector 336a is reset and when the control signal POUT[16] is deasserted, or high, the slot connector 336a comes out of the reset state.

The controller 350 may selectively monitor up to one hundred twenty-eight (sixteen bytes) of latched status signals STATUS[127:0] furnished (via a serial signal called NEW_CSID) by the card platform 330. The status signals STATUS[127:0] form a "snapshot" of selected conditions of the card platform 30. The status signals STATUS[127:0] include six status signals STATUS[5:0] which indicate the securement status (opened or closed) of each of the levers 802. The controller 350 monitors the status signals STATUS [31:0] for changes in their logical voltage levels. The controller 350 serially shifts the status signals STATUS [127:32] into the controller 350 when instructed to do so by the CPU 314.

The controller 350 serially receives the status signals STATUS[127:0], least significant signal first, via the serial data signal NEW_CSID. The data signal NEW_CSID is furnished by the serial output of the thirty-two bit, parallel input shift register 382 located on board the card platform 330 along with the slot connectors 336.

The register 382, through its parallel inputs, receives twenty-four parallel status signals PIN[23:0], four associated with each of the hot plug slot connectors 336, that are included in the thirty-two least significant status signals STATUS[31:0]. When the status indicated by one or more of the status signals STATUS[31:0] changes (the logical voltage level changes), the controller 350 generates an interrupt request to the CPU 314 by asserting, or driving low, an interrupt request signal SI_INTR# which is furnished to the PCI bus 332. The status signals PIN[23:0] include two PCI card presence signals (PRSNT1# and PRSNT2#) associated with each slot connector 336.

Six status signals PIN[5:0], corresponding to their latched versions, status signals STATUS[5:0], indicate the securement, or engagement, status (open or closed) of each the levers 802. Referring to FIGS. 14 and 15, six sliding switches 805 are actuated by the movement of their corresponding levers 802 and are used to electrically indicate the securement status of the corresponding lever 802. Each switch 805 has a first terminal coupled to ground and a second terminal furnishing the corresponding one of the status signals PIN[5:0]. The second terminal is coupled to a supply voltage level V$_{DD}$ through one of six resistors 801.

If one of the levers 802 opens and the card 807 secured by the lever 802 becomes unsecured, the corresponding one of the status signals PIN[5:0] is asserted, or driven high. As an example, for the slot connector 336a, the status signal PIN[0] is deasserted, or driven low, when the corresponding lever 802 is closed. When the lever 802 for the slot connector 336a is opened, the status signal PIN[0] is asserted, or driven high.

The register 82 also receives a serial stream of latched status signals STATUS[127:32] that do not cause interrupts when the logical voltage level of one of the signals STATUS [127:32] changes. The status signals STATUS[127:32] are formed by the sixteen bit shift register 52 located on board the card platform 330 with the slot connectors 336. The shift register 352 receives status signals at its parallel inputs and latches the status signals STATUS[127:32] when instructed to do so by the controller 350. The shift register 352 serializes the status signals STATUS[127:32] and furnishes the signals STATUS[127:32] to the serial input of the register 382 via a serial data signal CSID_I.

When instructed by the controller 350, the register 382 latches status signals PIN[23:0], forms the status signals STATUS[31:0], furnishes the status signals STATUS[31:0] and furnishes a byte or more of the status signals STATUS [127:32] (when requested by the CPU 314), in a least significant signal first fashion, to the controller 350 via the serial data signal NEW_CSID. The status signals STATUS [127:0] are described by the following table:

STATUS[127:0]

| BIT | DESCRIPTION |
| --- | --- |
| 0 | Lever 802 status signal for slot connector 336a (PIN[0]) |
| 1 | Lever 802 status signal for slot connector 336b (PIN[1]) |
| 2 | Lever 802 status signal for slot connector 336c (PIN[2]) |
| 3 | Lever 802 status signal for slot connector 336d (PIN[3]) |
| 4 | Lever 802 status signal for slot connector 336e (PIN[4]) |
| 5 | Lever 802 status signal for slot connector 336f (PIN[5]) |
| 6 | Reserved for lever 802 status signal for additional hot plug slot |
| 7 | Reserved for lever 802 status signal for additional hot plug slot |
| 8 | Power fault status for slot connector 336a (PIN[18]) |
| 9 | Power fault status for slot connector 336b (PIN[19]) |
| 10 | Power fault status for slot connector 336c (PIN[20]) |
| 11 | Power fault status for slot connector 336d (PIN[21]) |
| 12 | Power fault status for slot connector 336e (PIN[22]) |
| 13 | Power fault status for slot connector 336f (PIN[23]) |
| 14 | Reserved for power fault status for additional hot plug slot connector 336 |
| 15 | Reserved for power fault status for additional hot plug slot connector 336 |
| 16 | PRSNT2# signal for slot connector 336a (PIN[6]) |
| 17 | PRSNT2# signal for slot connector 336b (PIN[7]) |
| 18 | PRSNT2# signal for slot connector 336c (PIN[8]) |
| 19 | PRSNT2# signal for slot connector 336d (PIN[9]) |
| 20 | PRSNT2# signal for slot connector 336e (PIN[10]) |
| 21 | PRSNT2# signal for slot connector 336f (PIN[11]) |
| 22 | Reserved for PRSNT#2 signal for additional hot plug slot connector 336 |
| 23 | Reserved for PRSNT#2 signal for additional hot plug slot connector 336 |
| 24 | PRSNT1# signal for slot connector 336a (PIN[12]) |
| 25 | PRSNT1# signal for slot connector 336b (PIN[13]) |
| 26 | PRSNT1# signal for slot connector 336c (PIN[14]) |
| 27 | PRSNT1# signal for slot connector 336d (PIN[15]) |
| 28 | PRSNT1# signal for slot connector 336e (PIN[16]) |
| 29 | PRSNT1# signal for slot connector 336f (PIN[17]) |
| 30 | Reserved for PRSNT1# status for additional hot plug slot connector 336 |
| 31 | Reserved for PRSNT1# status for additional hot plug slot connector 336 |
| 32–127 | Status signals that do not cause interrupt requests when their status changes |

Figure 18:
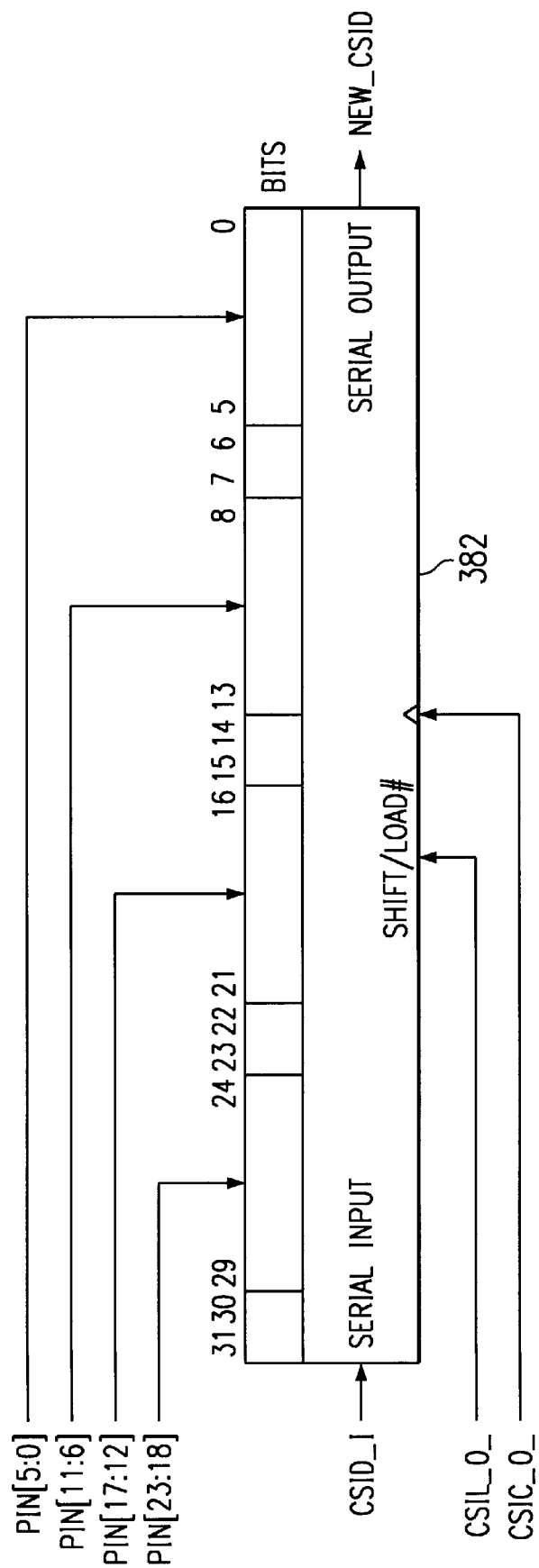
FIG. 18 is a schematic diagram of the parallel input register of FIG. 12.
Figure 21:
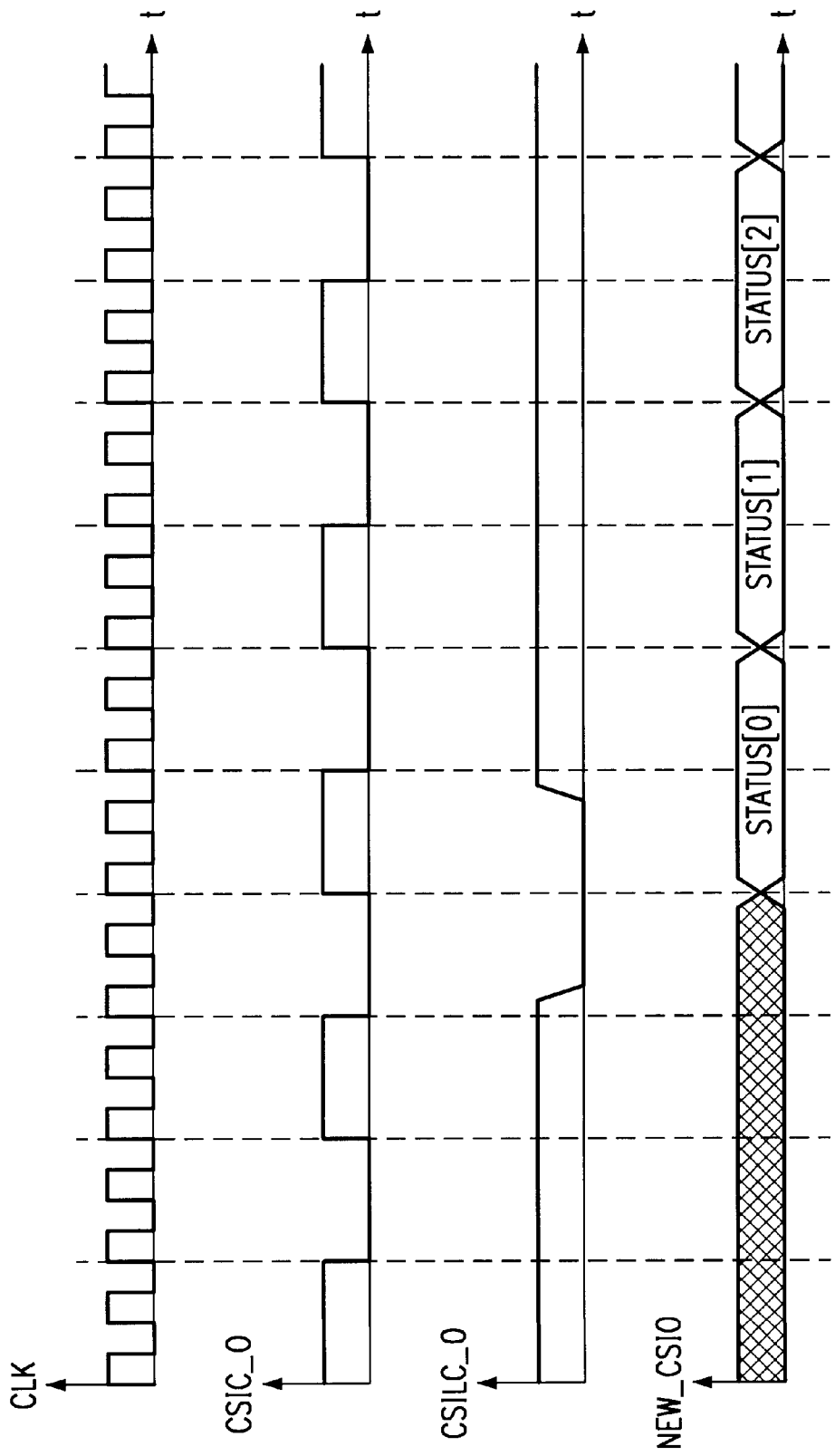
FIG. 21 shows waveforms of signals of the hot plug controller.

Referring to FIGS. 12, 18 and 21, when the controller 350 asserts, or drives low, a register load signal CSIL_O_, the shift register 352 synchronously latches the status signals STATUS[127:32], and the shift register 382 latches the status signals STATUS[31:0]. When the controller 350 negates, or drives high, the signal CSIL_O_, both the registers 352 and 382 serially shift their data to the controller 350 on the positive edge of a clock signal CSIC_O furnished by the controller 350. When active (as described below), the clock signal CSIC_O is synchronized to and one fourth the frequency of the PCI clock signal CLK.

Figure 17:
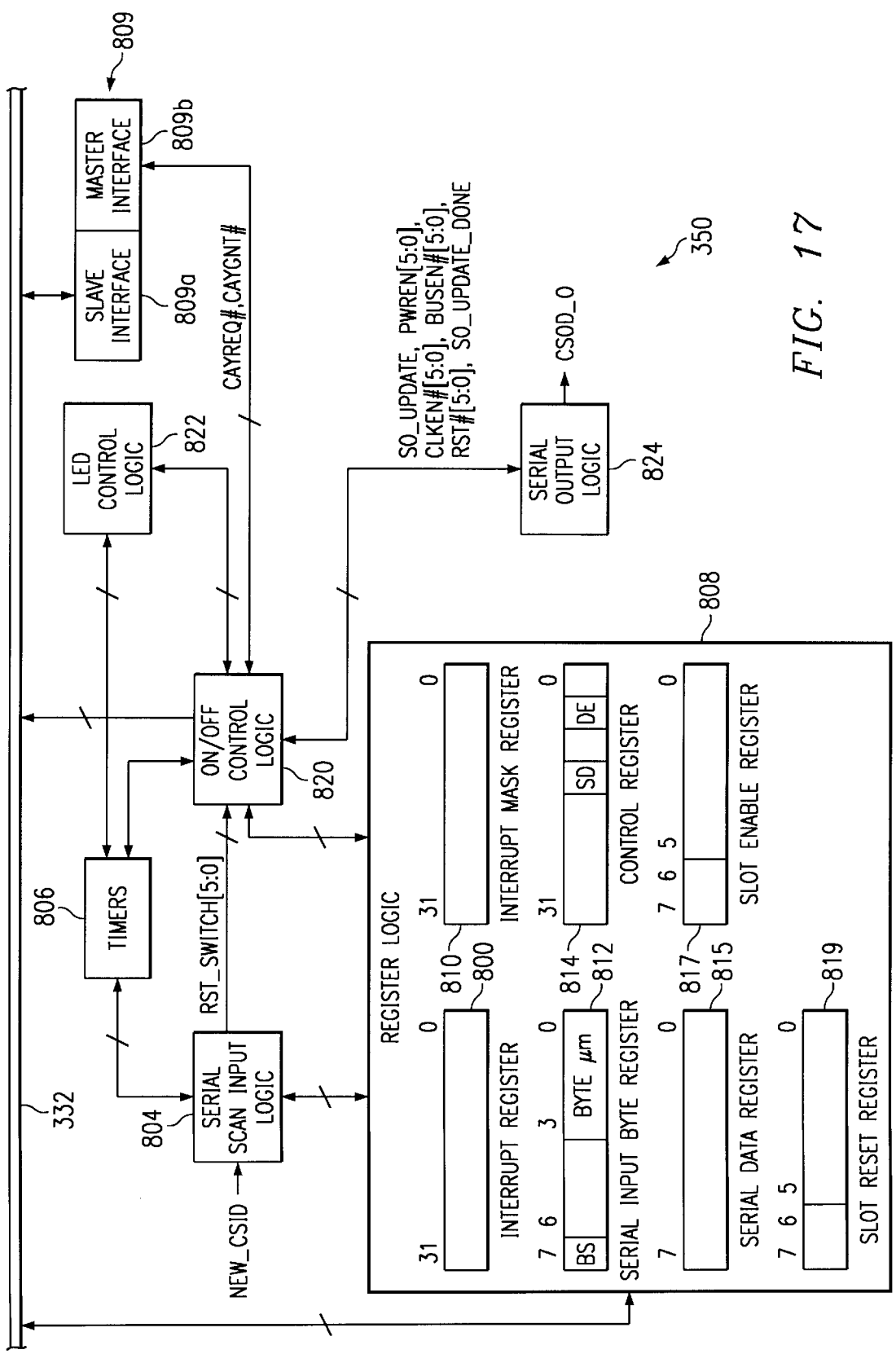
FIG. 17 is a block diagram of the hot plug controller of FIG. 9.

Referring to FIG. 17, for purposes of monitoring, or scanning, the status signals STATUS[31:0], the controller 350 uses a thirty-two bit interrupt register 800 whose bit positions correspond to the signals STATUS[31:0]. The controller 350 updates the bits of the interrupt register 800 to equal the corresponding status signals STATUS[31:0] that have been debounced, as further described below. Two status signals STATUS[7:6] are reserved for additional hot plug slot connectors 336, and the seventh and eighth most significant bits of the interrupt register 800 are also reserved for the additional slot connectors 336. The interrupt register 800 is part of a register logic block 808 of the controller 350 which is coupled to the PCI bus 332.

Serial scan input logic 804 of the controller 350 sequentially scans, or monitors, the status signals STATUS[31:0], least significant signal first, for changes, as indicated by transitions in their logical voltage levels. If the status of one or more of the status signals STATUS[5:0] associated with the levers 802 changes, the serial scan input logic 804 enters a slow scan mode such that the status signals STATUS[5:0] are scanned thirty-two times within a predetermined debounce time interval. If one or more of the status signals STATUS[5:0] changes, the serial scan input logic 804 updates the interrupt register 800 (and asserts the serial interrupt signal SI_INTR#) if the changed status signal STATUS[5:0] remains at the same logical voltage level for at least a predetermined debounce time interval. The serial scan input logic 804 is coupled to programmable timers 806 which generate and indicate the end of the debounce delay interval initiated by the serial scan logic 804. Requiring the status to remain stable for the debounce time interval minimizes the inadvertent powering down of one of the hot plug slot connectors 336 due to a false value (i.e., a "glitch") indicated by one of the status signals STATUS[5:0]. When all of the status signals STATUS[5:0] remain at the same logical voltage level for at least the debounce time interval, the serial scan input logic 804 then proceeds to once again scan all thirty-two status signals STATUS[31:0] in the faster scan mode.

If the serial scan input logic 804 detects a change in one of the status signals STATUS[31:6], the serial scan input logic 804 instructs the timers 806 to measure another debounce delay interval, subsequently asserts the serial interrupt signal SI_INTR#, updates the interrupt register 800 with the signals STATUS[31:6] that have changed, and ignores further changes in the status signals STATUS[31:6] until the debounce time interval expires. After expiration of the debounce time interval, the serial scan input logic 804 proceeds to recognize changes in the thirty-two status signals STATUS[31:0].

When the serial interrupt signal SI_INTR# is asserted, the CPU 314 subsequently reads the interrupt register 800, determines which (may be more than one) status signals STATUS[31:0] caused the interrupt, and deasserts the serial interrupt signal SI_INTR# by writing a "1" to the bit or bits of the interrupt register 800 that have changed.

The CPU 314 may selectively mask interrupt requests caused by the status signals STATUS[31:0] by writing a "1" to a corresponding bit of a thirty-two bit interrupt mask register 810. The CPU 314 can also selectively read any byte of the status signals STATUS[47:0] by writing a byte number of the selected byte to a serial input byte register 812. The controller 350 then transfers the desired byte into a serial data register 815.

For example, to read the third byte (byte number two) of the status signals STATUS[23:16], the CPU 314 writes a "2" to the serial input byte register 812. The serial scan input logic 804 then serially shifts byte two of the status signals STATUS[23:16] into the serial data register 815. A busy status bit BS of the serial input byte register 812 is equal to "1" when the CPU 314 initially writes the desired byte number to the serial input byte register 812. The bit BS is cleared by the controller 350 after the requested byte has been shifted into the serial data register 815.

The CPU 314 can power up one of the slot connectors 336 by writing a "1" to a corresponding bit of a slot enable register 817 and disable the slot connector 336 by writing a "0" to this bit. Furthermore, the CPU 314 can reset one of the slot connectors 336 by writing a "1" to a corresponding bit of a slot reset register 819. The contents of the slot enable 817 and slot reset 819 registers are represented by signals SLOT_EN[5:0] and SLOT_RST_[5:0], respectively.

To initiate the request indicated by the slot enable 817 and reset 819 registers, the CPU 314 writes a "1" to an SO bit of control register 814. After the SO bit is asserted (which asserts, or drives high, a GO_UPDATE signal), the controller 350 initiates and controls the required power down and/or power up sequences. The control register 814 also has a bit DE for controlling when the dummy bus cycles 200 are enabled (DE="1") or disabled (DE="0").

The serial scan input logic 804 is coupled to ON/OFF control logic 820 which controls the power up and power down sequences. The ON/OFF control logic 820 furnishes the signals BUSEN#[5:0], CLKEN#[5:0], RST#[5:0] and PWREN[5:0] to serial output logic 824.

Each power up or power down sequence involves four shift phases during which another step of the power down or power up sequence is performed. During each shift phase, the ON/OFF control logic 820 instructs the serial output logic 824 to combine the control signals BUSEN#[5:0], CLKEN#[5:0], RST#[5:0] and PWREN[5:0]; latch these signals; and serially furnish these signals (via a serial data signal CSOD_O) to the serial input of an output shift register 380. At end of each shift phase, the ON/OFF control logic 820 instructs the shift register 380 to update the control signals POUT[35:12].

The ON/OFF control logic 820 is also interfaced to the register logic 808 and Light Emitting Diode (LED) control logic 822. The LED control logic 822 controls the on/off status of the six LEDs 354, which visually indicate whether the corresponding levers 802 are latched or unlatched. The LEDs 354 can be programmed to blink when turned on through LED control registers (not shown) of the register logic 808.

The controller 350 also has a bus interface 809 (coupled to the on/off control logic 820) for communicating with the PCI bus 332. The interface 809 has a master interface 809b that is configured to work in conjunction with a slave interface 809a to furnish the dummy bus cycles 200 to the bus 332. The master interface 809a controls the initiator signals (e.g., the address commands, the FRAME signal, REQ# signal and IRDY# signal) of the dummy bus cycle 200, and the slave interface controls the target signals (e.g., the DEVSEL# signal and the TRDY# signal) of the dummy bus cycle 200. The appearance of the dummy bus cycle 200 is governed by the states of the on/off control logic 820, described below.

Figure 19A:
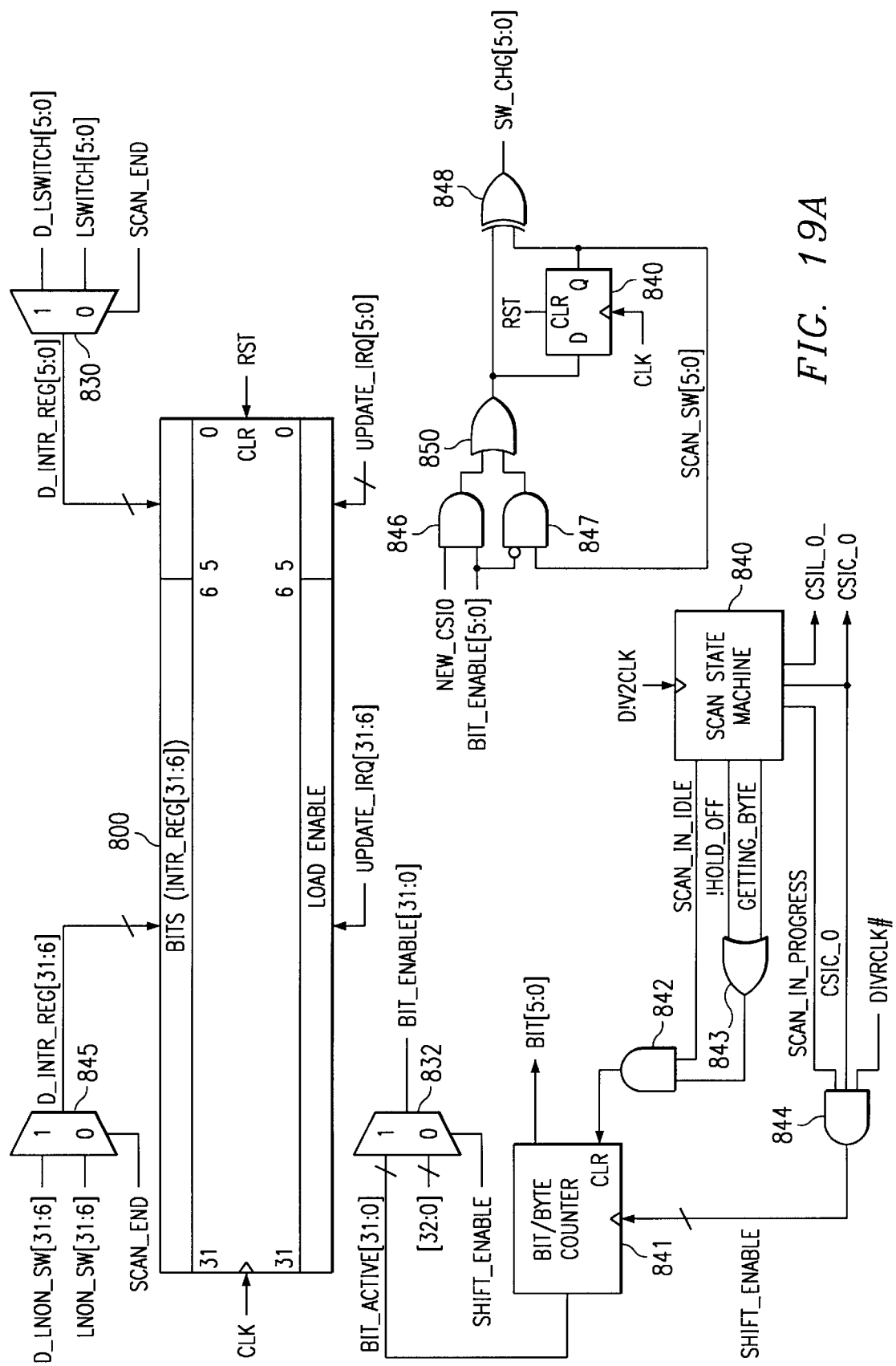
FIGS. 19A, 19B, 19C, 19D and 19E are schematic diagrams of scan logic of the hot plug controller.

As shown in FIG. 19A, the serial scan input logic 804 includes a scan state machine 840 which controls the scanning of the status signals STATUS[31:0] for changes and controls the shifting of a selected byte of the status signals STATUS[47:0] into the serial input byte register 815.

The scan state machine 840 is clocked on the negative edge of a clock signal DIV2CLK, which is synchronized to a PCI clock signal CLK and one half of the frequency of the PCI clock signal CLK. The load and clock signals, CSIL_O_ and CSIC_O, respectively, are furnished by the scan state machine 840. The clock signal, when enabled, is synchronized to the clock signal CSIC_O.

A bit/byte counter 841, through a thirty-two bit signal BIT_ACTIVE[31:0], indicates which bit of the status signals STATUS[31:0] is currently represented by the serial data signal NEW_CSID. The asserted bit of the signal BIT_ACTIVE[31:0] has the same bit position as the status signal STATUS[31:0] represented by the data signal NEW_CSID.

The counter 841 also furnishes a three bit signal BIT[2:0] which represents which bit of the current byte of the status signals STATUS[31:0] is currently being scanned by the scan state machine 840. The counter 841 is clocked on the negative edge of a signal SHIFT_ENABLE. The outputs of the counter 841 are reset, or cleared, when the output of an AND gate 842, connected to the clear input of the counter 841, is negated.

The scan state machine 840 furnishes a signal SCAN_IN_IDLE which when asserted, or high, indicates that the scan state machine 840 is in an IDLE state and not currently scanning any of the status signals STATUS[127:0]. The signal SCAN_IN_IDLE is deasserted otherwise.

The signal SCAN_IN_IDLE is furnished to one input of the AND gate 842. The other input of the AND gate 842 is connected to the output of an OR gate 843. One input of the OR gate 843 receives an inverted HOLD_OFF signal, and the other input of the OR gate 843 receives a signal GETTING_BYTE.

The signal HOLD_OFF, when asserted, or driven high, indicates that a change in one of the status signals STATUS[5:0] has been detected, and the serial scan logic 804 has entered the slow scan mode. In the slow scan mode, the serial scan input logic 804 waits for a predetermined slow scan interval before traversing the status signals STATUS[31:0] again. The serial scan input logic 804 counts the number of times the serial scan signals STATUS[5:0] are scanned during the slow scan mode and uses this count to determine when one of the status signal STATUS[5:0] has remain unchanged for the debounce delay interval, as further described below.

Therefore, when the scan state machine 840 is in the IDLE state and the either the HOLD_OFF signal is deasserted or the scan state machine 840 is reading in a selected byte (selected by the CPU 314) of the status signals STATUS[147:0], all outputs of the counter 841 are cleared, or set equal to zero.

In another embodiment, the HOLD_OFF signal does not cause the serial scan logic to enter the slow scan mode. Instead, the state machine 840 runs continually and is only briefly in the idle state. When HOLD_OFF signal is asserted, or driven high, it indicates that a change has occurred on one or more of the STATUS[5:0] signals and that the STATUS[5:0] signals are being debounced. The duration of the HOLD_OFF signal is controlled by time 806.

In this other embodiment, the HOLD_OFF signal prevents the (filter) counters 831 from advancing, even though the STATUS[5:0] signals have not changed in the previous scan. However, any scan in which the STATUS[5:0] signals have changed will cause the filter counters 831 to be cleared or set equal to zero, regardless of the state of the HOLD_OFF signal. When the timer 806 completes measuring the HOLD_OFF delay interval, it causes the HOLD_OFF signal to deassert via assertion of signal FILTER_TIMEOUT using JK flip-flop 885. For as long as any one of the STATUS[5:0] signals have not reached its maximum count (as indicated by the MAX[5:0] signals), the HOLD_OFF signal will be deasserted for one scan period, following the assertion of the FILTER_TIMEOUT signal. The product of the HOLD_OFF assertion time interval and the maximum number of counts for counters 831 is equal to the debounce time interval (8 ms).

The signal SHIFT_ENABLE is furnished by the output of an AND gate 844. One input of the AND gate 844 receives the clock signal CSIC_O. Another input of the AND gate 844 receives a signal DIV2CLK#. The signal DIV2CLK# is asserted, or driven low, on the negative edge of the signal CLKDIV4. The third input of the AND gate 844 receives a signal SCAN_IN_PROGRESS, which when asserted, or driven high, indicates that the scan state machine 840 is currently scanning the status signals STATUS[127:0], and the signal SCAN_IN_PROGRESS is deasserted otherwise.

Therefore, when the scan state machine 840 is not shifting in the status signals STATUS[127:0], the counter 841 is disabled. Furthermore, when enabled, the counter 841 is clocked on the negative edge of the clock signal DIV2CLK.

The interrupt register 800 receives input signals D_INTR-REG[31:0] at its corresponding thirty-two inputs. The load enable inputs of the interrupt register 800 receive corresponding load enable signals UPDATE_IRQ[31:0]. The interrupt register 800 is clocked on the positive edge of the PCI clock signal CLK.

For purposes of keeping track of the status signals STATUS[5:0] after each scan, a multi-bit, D-type flip-flop 836 furnishes status signals SCAN_SW[5:0]. The clear input of the flip-flop 836 receives the reset signal RST, and the flip-flop 836 is clocked on the positive edge of the clock signal CLK. The input of the flip-flop 836 is connected to the output of a multi-bit OR gate 850 which has one input connected to the output of a multi-bit AND gate 846 and one input connected to the output of a multi-bit AND gate 847. One input of the AND gate 846 receives six bit enable signals BIT_ENABLE[5:0] (described below) and the other input of the AND gate 846 receives the serial data signal NEW_CSID. One input of the AND gate 847 receives inverted bit enable signals BIT_ENABLE[5:0], and the other input of the AND gate 847 receives the signals SCAN_SW[5:0].

Only one of the bit enable signals BIT_ENABLE[5:0] is asserted at one time (when the scan state machine 840 is scanning), and the asserted bit indicates which one of the corresponding status signals STATUS[31:0] is represented by the signal NEW_CSID. Thus, when the scan state machine 840 is scanning, on every positive edge of the clock signal CLK, the signals SCAN_SW[5:0] are updated.

The bit enable signals BIT_ENABLE[31:0] are furnished by the output of a multi-bit multiplexer 832 that receives the bits BIT_ACTIVE[31:0] at its one input. The zero input of the multiplexer 832 receives a thirty-two bit signal indicative of logic zero. The select input of the multiplexer 832 receives the signal SHIFT_ENABLE.

For purposes of detecting a change in the status signals STATUS[5:0], a multi-bit, Exclusive Or (XOR) gate 848 furnishes switch change signals SW CHG[5:0]. When one of the signals SW_CHG[5:0] is asserted, or high, the logical voltage of the corresponding status signal STATUS[5:0] changed during successive scans. One input of the XOR gate 848 is connected to the input of the flip-flop 836, and the other input of the XOR gate 848 receives the signals SCAN_SW[5:0].

Figure 19B:
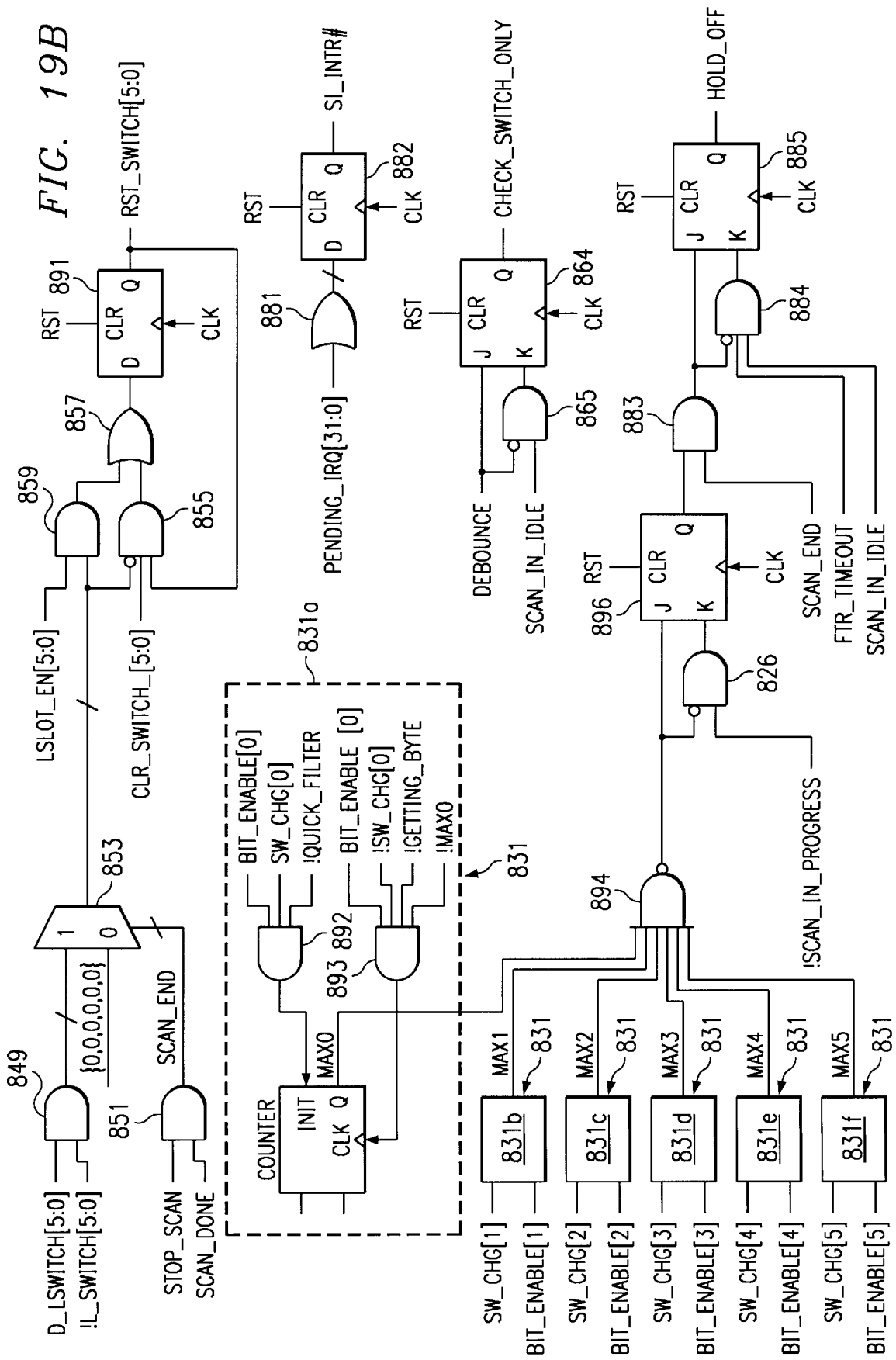
Figure 19C:
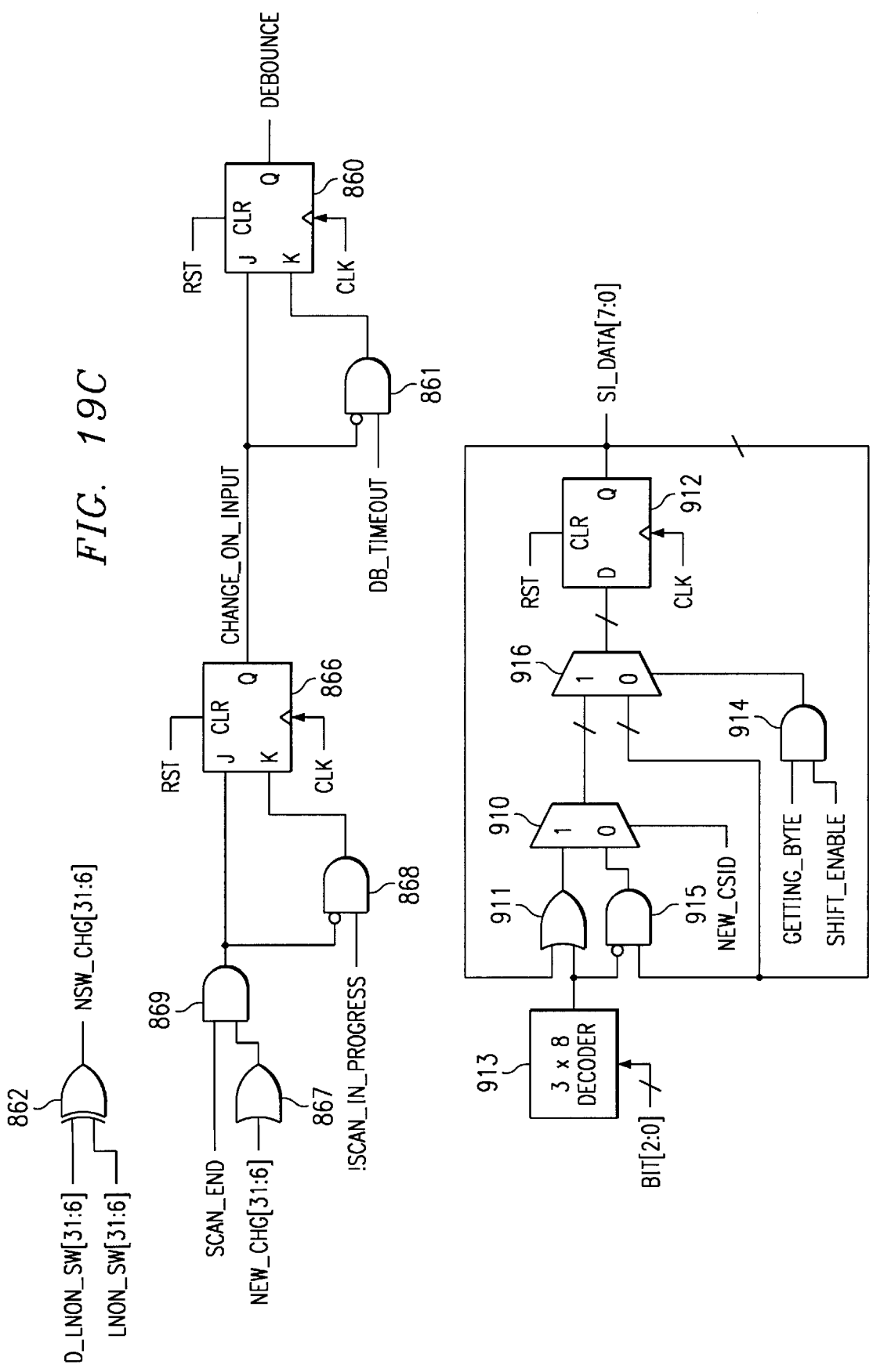
Figure 19D:
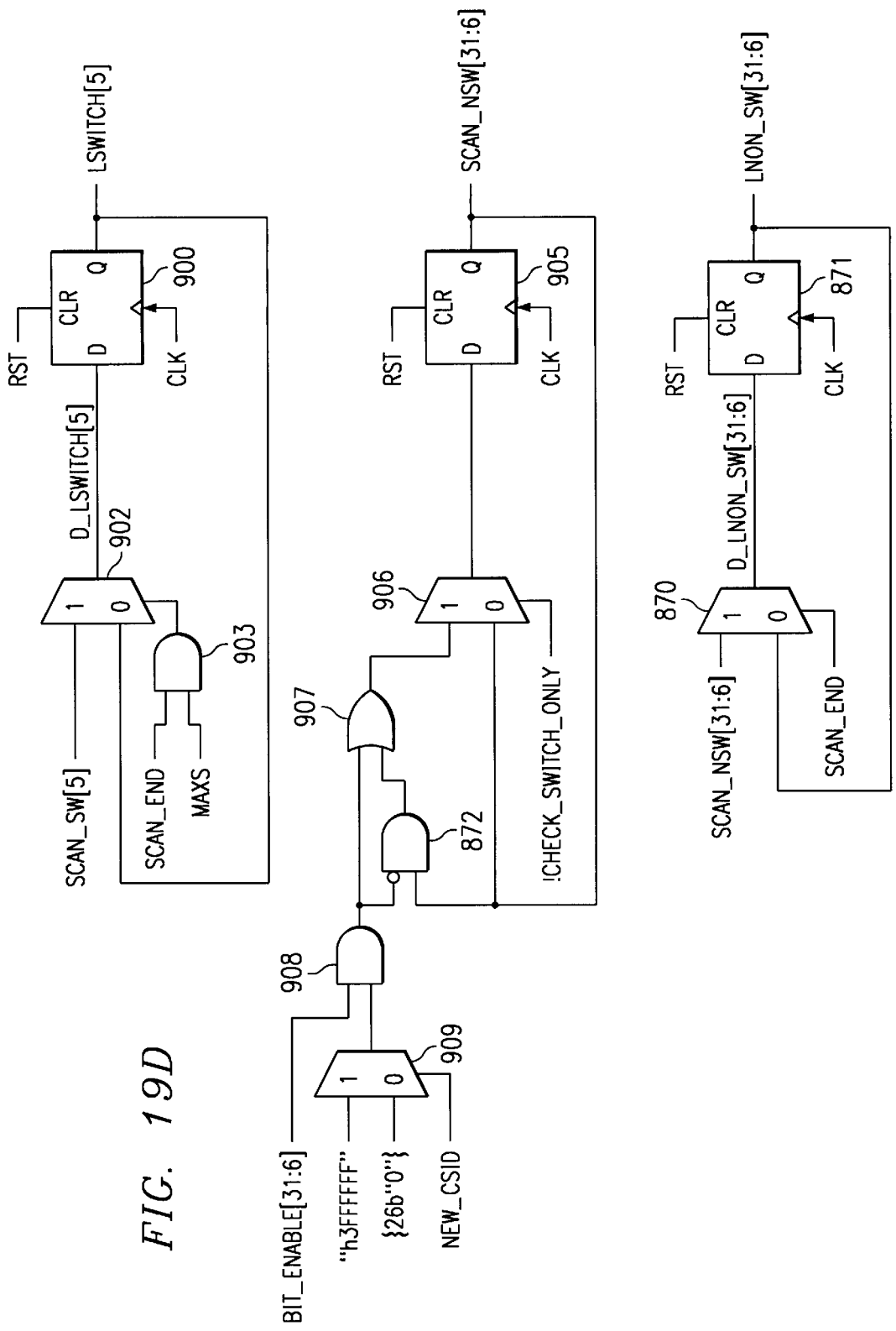

As shown in FIG. 19D, for purposes of indicating when the logical voltage level of a selected status signal STATUS [5:0] has remained at the logical voltage level for at least the duration of the debounce delay interval, the scan input logic 804 has six signals LSWITCH[5:0]. The non-inverting input of a D-type flip-flop 900 furnishes the signal LSWITCH[5] at its non-inverting output. The signal LSWITCH[5] is asserted, or driven high, to indicate the above-described condition and deasserted otherwise. The flip-flop 900 is clocked on the positive edge of the clock signal CLK, and the clear input of the flip-flop 900 receives the RST signal.

The input of the flip-flop 900 is connected to the output of a multiplexer 902 which furnishes a D_LSWITCH[5] signal. The select input of the multiplexer 902 is connected to the output of an AND gate 903 that receives a MAX5 signal and a SCAN_END signal. The SCAN_END signal, when asserted, indicates the scan state machine 840 has completed the current scan. Five signals (MAX5, MAX4, MAX3, MAX2, MAX1 AND MAX0) indicate whether the corresponding status signal STATUS[5], STATUS[4], STATUS [3], STATUS[2], STATUS[1], or STATUS[0], respectively, has remained at the same logical voltage level for a least the duration of the debounce time interval. The zero input of the multiplexer 902 receives the signal LSWITCH[5], and the one input of the multiplexer 902 receives the signal SCAN_SW[5]. The signal SCAN_END is furnished by the output of an AND gate 851 (FIG. 12B). The AND gate 851 receives a signal STOP_SCAN and a signal SCAN_DONE. The signal STOP_SCAN is asserted, or driven high, when conditions for ending the scanning by the scan state machine 840 are present, as further described below. The signal SCAN_END is a pulsed (for one cycle of the CLK signal) version of the STOP_SCAN signal. The signals LSWITCH [4]–LSWITCH[0] and D_LSWITCH[4]–D_LSWITCH[0] are generated in a similar fashion from the respective SCAN_SW[4]–SCAN_SW[0] signals and the respective signals MAX4–MAX0.

For purposes of updating the logical voltage level of the status signals STATUS[31:6] as these signals are scanned in, a multi-bit D-type flip-flop 905 (see FIG. 19D) furnishes twenty-six signals SCAN_NSW[31:6]. One of the signals SCAN_NSW[31:6] is asserted, or driven high, to indicate this condition and deasserted otherwise. The flip-flop 905 is clocked on the positive edge of the clock signal CLK, and the clear input of the flip-flop 905 receives the RST signal.

The input of the flip-flop 905 is connected to the output of a multi-bit multiplexer 906. The select input of the multiplexer 906 receives an inverted CHECK_SWITCH_ONLY signal. The CHECK_SWITCH_ONLY signal is asserted, or driven high, when the scan state machine 840 is only scanning the status signals STATUS[5:0] or status signals STATUS[127:32] (i.e., ignoring changes in the signals STATUS[31:6]) and deasserted otherwise. The zero input of the multiplexer 906 receives the signals SCAN-NSW[31:6], and the one input of the multiplexer 906 is connected to the output of a multi-bit OR gate 907. One input of the OR gate 907 is connected to the output of a multi-bit AND gate 908, and the other input of the OR gate 907 is connected to the output of a multi-bit AND gate 872.

One input of the AND gate 908 receives the signals BIT_ENABLE[31:6]. The other input of the AND gate 908 is connected to the output of a multi-bit multiplexer 909. If the NEW_CSID signal is asserted, or high, the multiplexer 909 furnishes a twenty-six bit signal equal to "h3FFFFFF."

Otherwise, the multiplexer furnishes a twenty-six bit signal equal to "0." One input of the AND gate 872 is connected to the inverted output of the AND gate 908, and the other input of the AND gate 872 receives the signals SCAN_NSW[31:6].

For purposes of storing the logical voltage level of the status signals STATUS[31:6] after every scan, a multi-bit, D-type flip-flop 871 furnishes twenty-six signals LNON_SW[31:6]. One of the signals LNON_SW[31:6] is asserted, or driven high, to indicate this condition and deasserted otherwise. The flip-flop 871 is clocked on the positive edge of the clock signal CLK, and the clear input of the flip-flop 871 receives the RST signal.

The input of the flip-flop 871 is connected to the output of a multi-bit multiplexer 870 which furnishes the signals D_LNON_SW[31:6]. The select input of the multiplexer 870 receives the signal SCAN_END. The zero input of the multiplexer 870 receives the signals LNON_SW[31:6], and the one input of the multiplexer 807 receives the signals SCAN_NSW[31:6].

Referring to FIG. 19B, for purposes of generating the MAX0, MAX1, MAX2, MAX3, MAX4, and MAX5 signals, the serial input logic 804 includes six counters 831a–f, respectively, of common design 831. Each counter 831 is initialized (to a predetermined count value) when an AND gate 892 asserts, or drives high, its output. For the counter 831a, the AND gate 892 receives the signal BIT_ENABLE[0], the signal SW_CHG[0] and an inverted signal QUICK_FILTER. The signal QUICK_FILTER, when asserted, or high, can be used to circumvent the debounce time interval. The QUICK_FILTER signal is normally deasserted, or low. The clock input of the counter 831 is connected to the output of an AND gate 893. For the counter 831a, the AND gate 893 receives the BIT_ENABLE[0] signal, the inverted SW_CHG[0] signal, the inverted GETTING_BYTE signal, and the inverted MAX0 signal. Therefore, for the counter 831a, once the logical voltage of the status signal STATUS[0] changes, each time the serial scan logic 804 scans the status signal STATUS[0], the counter 831a is incremented. When the counter 831a reaches its maximum value, the signal MAX0 is asserted which indicates the debounce time interval has elapsed. If the logical voltage of the status signal STATUS[0] changes during the count, the counter 831a is reinitialized and the count begins again. The other counters 831b–f function in a similar fashion for their corresponding status signals STATUS [5:1].

The HOLD_OFF signal, when asserted, instructs one of the timers 806 to measure a predetermined slow scan interval which puts the serial scan state machine 840 in the slow scan mode. When the timer 806 completes measuring this delay interval, the timer 806 asserts, or drives high, a FTR_TIMEOUT signal which is otherwise deasserted, or negated. The product of this slow scan interval and the number of counts for the counter 831 to reach its maximum value is equal to the debounce time interval (8 ms).

The HOLD_OFF signal is furnished by the output of a JK flip-flop 885. The flip-flop 885 is clocked on the positive edge of the CLK signal, and the clear input of the flip-flop 885 receives the RST signal. The J input is connected to the output of an AND gate 883, and the K input is connected to the output of an AND gate 884. One input of the AND gate 884 is connected to the output of a JK-type flip-flop 896, and the other input of the AND gate 883 receives the SCAN_END signal. One input of the AND gate 884 is connected to the inverted output of the AND gate 883, one input of the AND gate 884 receives the FTR_TIMEOUT signal, and another input of the AND gate 884 receives a SCAN_IN_IDLE signal, which is asserted when the scan state machine 840 is in its IDLE state, as further described below.

The flip-flop 895 is clocked on the positive edge of the CLK signal, and the clear input of the flip-flop 895 receives the RST signal. The J input is connected to the output of a NAND gate 894 which receives the MAX0, MAX1, MAX2, MAX3, MAX4 and MAX5 signals. The K input is connected to the output of an AND gate 826 which is connected to the inverted J input of the flip-flop 895 and receives an inverted SCAN_IN_PROGRESS signal which is asserted when the scan state machine 840 is scanning the status signals STATUS[31:0].

For purposes of generating the CHECK_SWITCH_ONLY signal, the serial scan input logic 804 includes a JK-type flip-flop 864 which furnishes the CHECK_SWITCH_ONLY signal at its non-inverting output and is clocked on the positive edge of the CLK signal. The clear input of the flip-flip 864 receives the RST signal, and the J input of the flip-flop 864 receives a DEBOUNCE signal, which when asserted, or driven high, indicates that one of the logical voltage level of one or more of the status signals STATUS[31:6] has changed. The K input of the flip-flop 864 is connected to the output of a AND gate 865. One input of the AND gate 865 receives the inverted DEBOUNCE signal, and one input of the AND gate 865 receives the SCAN_IN_IDLE signal.

Referring to FIG. 19C, the debounce signal DEBOUNCE is furnished by the non-inverting output of a JK-type flip-flop 860. The flip-flop 860 is clocked by the positive edge of the clock signal CLK, and the clear input of the flip-flop 860 receives the reset signal RST. The J input of the flip-flop 860 receives a signal CHANGE_ON_INPUT signal. The CHANGE_ON_INPUT signal is asserted, or driven high, when a change in one of the status signals STATUS[31:6] is detected at the end of a scan by the serial input logic 804 and deasserted otherwise. The K input is connected to the output of an AND gate 861 which receives a DB_TIMEOUT signal at one of its inputs. The other input of the AND gate 861 receives the inverted CHANGE_ON_INPUT signal. The DB_TIMEOUT signal is asserted by the timers 806 for one cycle of the CLK signal when the debounce time delay (initiated by the assertion of the DEBOUNCE signal) has expired. The assertion of the DB_TIMEOUT signal negates the DEBOUNCE signal on the next positive edge of the CLK signal.

The CHANGE_ON_INPUT signal is furnished by the non-inverting output of a JK-type flip-flop 866 which is clocked on the positive edge of the CLK signal. The clear input of the flip-flop receives the RST signal. The J input of the flip-flop 866 is connected to the output of an AND gate 869 which receives the SCAN_END signal, and another input of the AND gate 869 is connected to the output of an OR gate 867. The OR gate 867 logically Ors all of a set of NSW_CHG[31:6] signals. The bit positions of the signals NSW_CHG[31:6] correspond to the bit positions of the status signals STATUS[31:6] and indicate, by their assertion, whether the corresponding status signal STATUS[31:6] has changed after the last scan. The AND gate 869 further receives the SCAN_END signal. The K input of the flip-flop 866 is connected to the output of an AND gate 868 which receives the inverted SCAN_IN_PROGRESS signal and the inverted output of the AND gate 869. The signals NSW_CHG[31:6] are fmrnished by the output of a multi-bit, XOR gate 862 which receives the signals D_LNON_SW[31:6] and LNON_SW[31:6].

The non-inverting output of a multi-bit D-type flip-flop 912 furnishes bits SI_DATA[7:0] for the serial data register 815. The clear input of the flip-flop 912 receives the signal RST, and the flip-flop 912 is clocked on the positive edge of the CLK signal. The signal input of the flip-flop 912 is connected to the output of a multi-bit multiplexer 916. The select input of the multiplexer 916 is connected to the output of an AND gate 914, and the zero input of the multiplexer 916 receives the bits SI_DATA[7:0]. The AND gate 914 receives the signals GETTING_BYTE and SHIFT_ENABLE. Thus, when the serial scan logic 804 is not shifting in a requested byte of the status signals STATUS[47:0], the values of the bits SI_DATA[7:0] are preserved.

The one input of the multiplexer 916 is connected to the output of a multi-bit multiplexer 910. The one input of the multiplexer 910 is connected to the output of a multi-bit OR gate 911, and the zero input of the multiplexer is connected to the output of a multi-bit AND gate 915. The select input of the multiplexer 910 receives the signal NEW_CSID.

One input of the AND gate 915 receives the bits SI_DATA[7:0], and an inverting input of the AND gate 915 is connected to the output of a 3×8 decoder 913. The decoder 913 receives the signal BIT[2:0]. One input of the OR gate 911 receives the bits SI_DATA[7:0], and the other input of the OR gate 911 receives the output of the decoder 913.

The serial input logic 804 furnishes five signals RST_SWITCH[5:0] (corresponding to the bit positions of the status signals STATUS[5:0]) to the ON/OFF control logic 820 which indicate, by their assertion, whether the corresponding slot connector 336a–f should be powered down. The ON/OFF control logic 820 indicates when the slot connector 336 (indicated by the RST_SWITCH[5:0] signals) has subsequently been powered down by the subsequent assertion of one of five signals CLR_SWITCH_[5:0] signals whose bit positions correspond to the signals RST_SWITCH[5:0]. After receiving the indication that the slot connector 336 has been powered down, the serial logic 804 then deasserts the corresponding RST_SWITCH[5:0] signal.

The signals RST_SWITCH[5:0] are furnished by the non-inverting output of a multi-bit, D-type flip-flop 891 (FIG. 12B). The clear input of the flip-flop 891 receives the reset signal RST, and the flip-flop 891 is clocked on the positive edge of the clock signal CLK. The input of the flip-flop 891 is connected to the output of a multi-bit OR gate 857 which has one input connected to the output of a multi-bit AND gate 859 and one input connected to the output of a multi-bit AND gate 855. One input of the AND gate 859 is connected to the output of a multiplexer 853, and the other input of the AND gate 859 receives latched slot enable signals LSLOT_EN[5:0] which indicate, by their assertion, whether the corresponding slot connector 336a–f is powered up. One input of the AND gate 855 receives the signals CLR_SWITCH_[5:0] signals. Another input of the AND gate 855 receives the signals RST_SWITCH[5:0]. Another input of the AND gate 855 is connected to the inverted output of the multiplexer 853.

The zero input of the multiplexer 853 receives a six bit signal indicative of zero. The one input of the multiplexer 853 is connected to the output of a multi-bit AND gate 849. One input of the AND gate 849 receives the signals D_LSWITCH[5:0], and the other input of the AND gate 849 receives the inverted signals L_SWITCH[5:0]. The select input of the multiplexer 853 receives the SCAN_END signal.

For purposes of generating the SI_INTR# signal, the serial scan logic 804 includes a D-type flip-flop 882 which furnishes the serial interrupt signal SI_INTR# at its inverting output. The flip-flop 882 is clocked on the positive edge of the CLK signal, and the clear input of the flip-flip 882 receives the RST signal. The input of the flip-flop 882 is connected to the output of an OR gate 881 which receives thirty two pending interrupt signals PENDING_IRQ[31:0], which indicate, by their assertion, or driving high, whether an interrupt is pending for the corresponding one of the status signals STATUS[31:0]. The signals PENDING_IRQ [31:0] are otherwise deasserted.

Figure 19E:
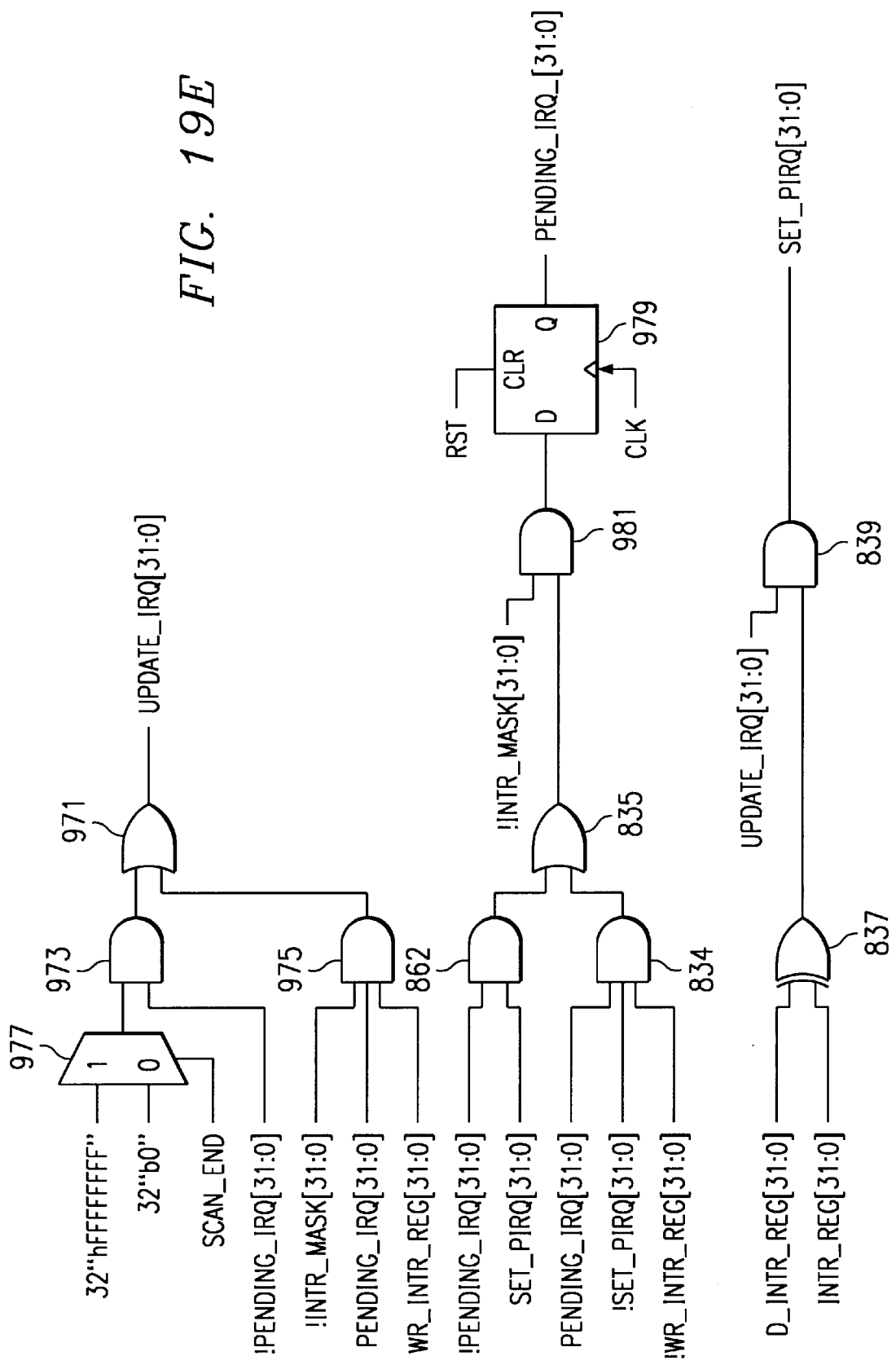

Referring to FIG. 19E, a multi-bit, D-type flip-flop 979 furnishes the signals PENDING_IRQ[31:0] at its non-inverting output. The flip-flop 979 is clocked on the positive edge of the signal CLK signal and receives the signal RST at its clear input. The input of the flip-flop 979 is connected to the output of a multi-bit AND gate 981 which receives inverted interrupt mask signals INTR_MASK[31:0] at one input. The signals INTR_MASK[31:0] are indicative of corresponding bit of the interrupt mask register 810. The other input of the AND gate 981 is connected to the output of a multi-bit OR gate 835. One input of the OR gate 835 is connected to the output of a multi-bit AND gate 862, and the other input of the OR gate 835 is connected to the output of a multi-bit AND gate 834.

The AND gate 862 receives inverted PENDING_IRQ [31:0] signals and signals SET_PIRQ[31:0]. The signals SET_PIRQ[31:0] are asserted to indicate an interrupt request should be generated for the corresponding one of the status signals STATUS[31:0]. Therefore, the signals PENDING_IRQ[31:0] are updated with the signals SET_PIRQ[31:0] if not masked by the signals INTR_MASK [31:0].

The AND gate 834 receives the signals PENDING_IRQ [31:0], inverted signals SET_PIRQ[31:0] and inverted WR_INTR_REG[31:0] signals. The signals WR_INTR_REG[31:0] indicate the write data furnished by the CPU 314 to the interrupt register 800. The CPU clears an interrupt by writing a "1" to the corresponding bit of the interrupt register 800. Therefore, if this occurs, and no new interrupt requests are indicated for the corresponding one of the status signals STATUS[31:0], the corresponding one of the signals PENDING_IRQ[31:0] is cleared.

The signals SET_PIRQ[31:0] are furnished by the output of a multi-bit AND gate 839. One input of the AND gate 839 receives the signals UPDATE_IRQ[31:0]. The other input of the AND gate 839 is connected to the output of a multi-bit XOR gate 837. One input of the XOR gate 837 receives the signals D_INTR_REG[31:0], the other input of the XOR gate 837 receives the signals INTR_REG[31:0]. Therefore, when the bits of the interrupt register 800 transition from one logical state to another, an interrupt request is generated.

For purposes of updating the bits of the interrupt register 800, the signals UPDATE_IRQ[31:0] are furnished to the corresponding load inputs of the register 800. When one of the signals UPDATE_IRQ[31:0] is asserted, or driven high, the corresponding bit is loaded with the corresponding one of the signals D_INTR_REG[31:0].

The signals UPDATE_IRQ[31:0] are furnished by the output of a multi-bit OR gate 971. One input of the OR gate 971 is connected to the output of a multi-bit AND gate 973. One input of the AND gate 973 is connected to the output of a multi-bit multiplexer 977, and the other input of the AND gate 973 receives inverted PENDING_IRQ[31:0] signals. The select input of the multiplexer 977 receives the signal SCAN_END, the one input of the multiplexer 977 receives a thirty-two bit signal indicative of "FFFFFFFFh," and the zero input of the multiplexer 977 receives a thirty-two bit signal indicative of "0." Therefore, at the end of a scan, the signals UPDATE_IRQ[31:0] allow the bits of the interrupt register 800 to be updated that correspond to the asserted PENDING_IRQ[31:0] signals.

Another input of the OR gate 971 is connected to the output of a multi-bit AND gate 975. One input of the AND gate 975 receives the inverted INTR_MASK[31:0] signals, another input of the AND gate 975 receives the signals PENDING_IRQ[31:0], and another input of the AND gate 975 receives the signals WR_INTR_REG[31:0]. Therefore, the CPU 314 can selectively clear bits of the signals PENDING_IRQ[31:0].

The signals D_INTR_REG[5:0] are furnished by the output of a multi-bit multiplexer 830. When the SCAN_END signal is asserted, the signals D_INTR_REG[5:0] are equal to the signals D_LSWITCH[5:0]. When the SCAN_END signal is deasserted, the signals D_INTR_REG[5:0] are equal to the signals SWITCH[5:0].

The signals D_INTR_REG[31:6] are furnished by the output of a multi-bit multiplexer 845. When the SCAN_END signal is asserted, the signals D_INTR_REG[31:6] are equal to the signals D_LNON_SW[31:6]. When the SCAN_END signal is deasserted, the signals D_INTR_REG[5:0] are equal to the signals LNON_SW[31:6]. The interrupt register 800 takes on new values only when the signal SCAN_END is asserted.

Figure 20:
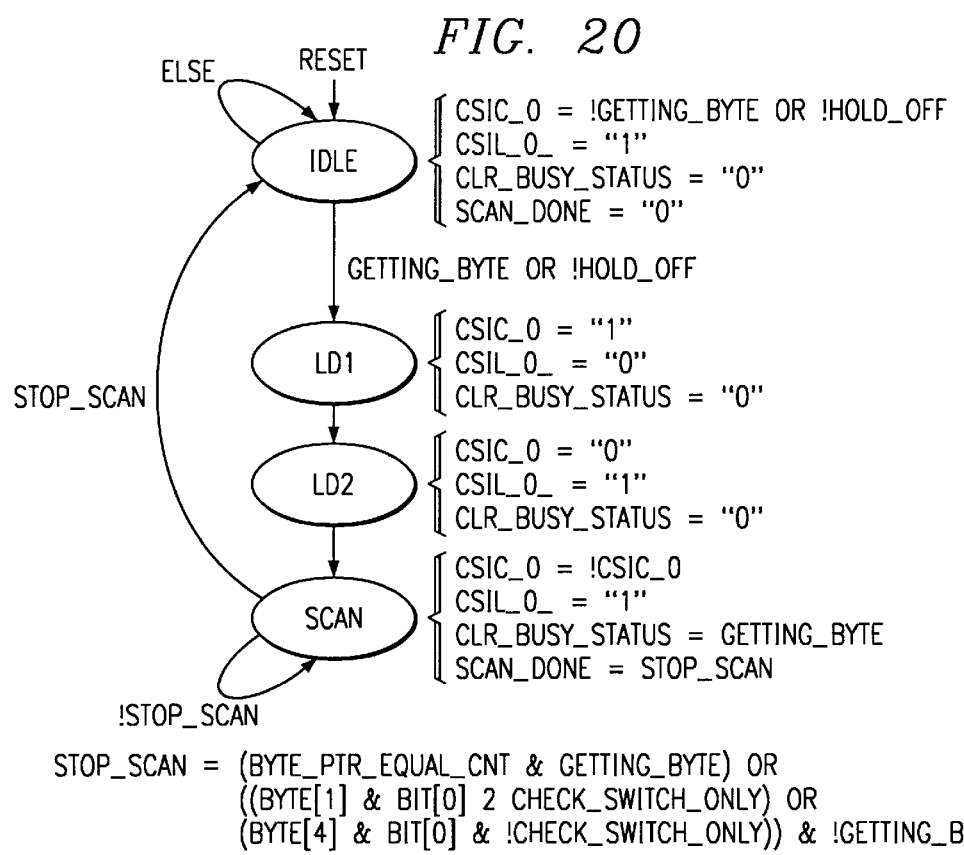
FIG. 20 is a state diagram illustrating operation of the scan state machine of FIG. 19A.

Referring to FIGS. 20 and 21, the scan state machine 840 enters an IDLE state after the assertion of the reset signal RST. When not in the IDLE state, the scan state machine 840 toggles the states of the serial input clock signal CSIC_O in order to clock the shift register 382. Furthermore, when not in a first load state LD1, the scan state machine 840 asserts, or drives high, the load signal CSIL_O_ in order to enable the registers 382 and 352 to serially shift the status signals STATUS[127:0] to the controller 350. In the IDLE state, the scan state machine 840 sets the signal SCAN_DONE equal to zero.

The scan state machine 840 transitions from the IDLE state to the state LD1 when either the signal GETTING_BYTE is asserted or the signal HOLD_OFF is deasserted. Otherwise, the scan state machine 840 remains in the IDLE state. In the LD1 state, the scan state machine 840 asserts, or drives low, the load signal CSIL_O_ which enables the registers 382 and 352 to latch and start receiving the status signals STATUS[127:0].

The scan state machine 840 transitions from the LD1 state, to a load two state LD2. In the LD2 state, the load signal CSIL_O_ is kept asserted which enables the registers 382 and 352 to serially shift the status signals STATUS [127:0].

The scan state machine 840 subsequently transitions to a scan state SCAN. In the SCAN state, the serial scan input logic 804 scans in one of the status signals STATUS[127:0] on each negative edge of the clock signal DIV2CLK. When the signal STOP_SCAN is asserted, the scan state machine 840 transitions back to the IDLE state. The STOP_SCAN signal is asserted when either the desired byte of the status signals STATUS[127:0] has been shifted into the serial data register 815; the lever status signals STATUS[5:0] have been scanned in and the serial interrupt signal SI_INTR# has been asserted; or all of the status signals STATUS[31:0] have been shifted in. In the SCAN state, the SCAN_DONE signal is set equal to the STOP_SCAN signal.

Figure 22:
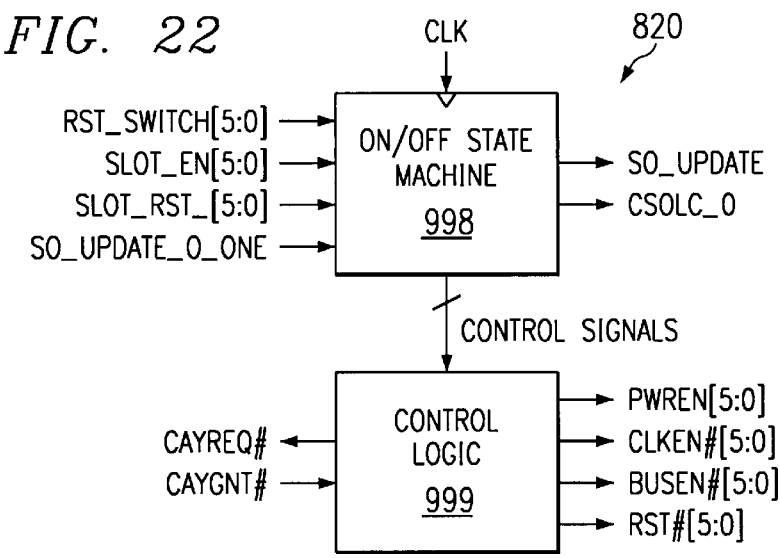
FIG. 22 is a schematic diagram of the on/off logic of the hot plug controller.
Figure 24B:
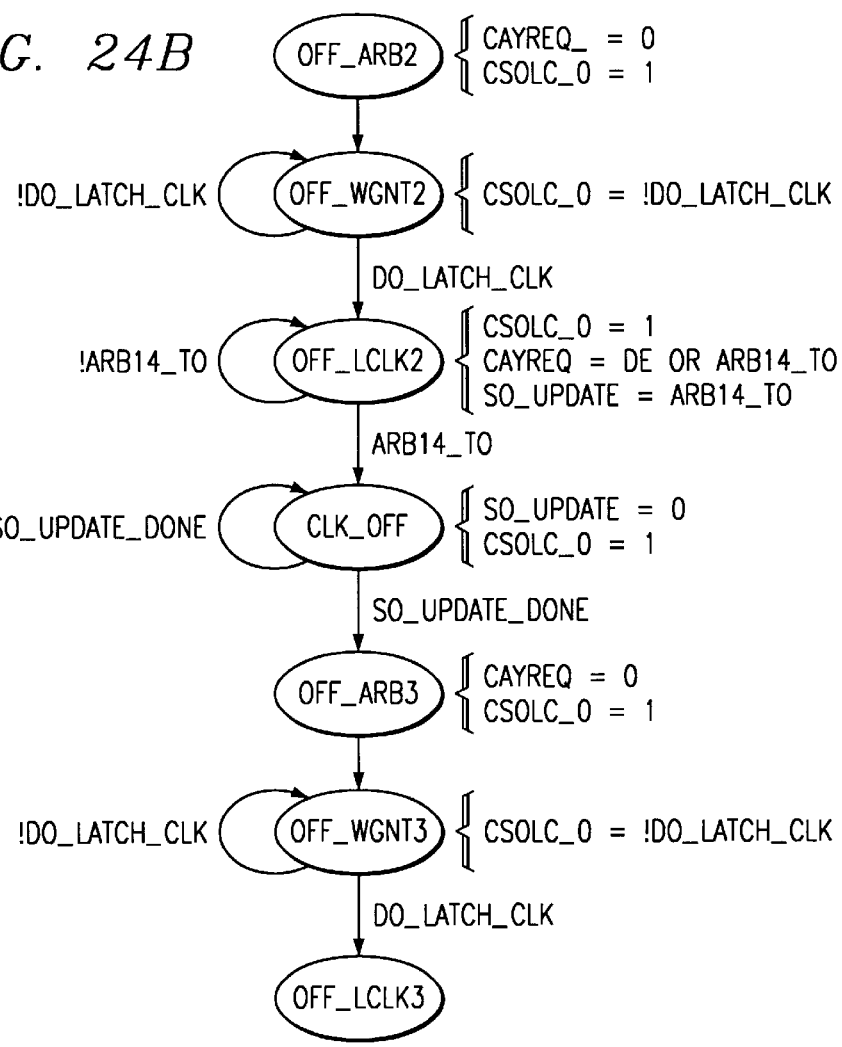
FIGS. 24A, 24B, 24C, 24D, 24E and 24F are a state diagram illustrating operation of the on/off logic of the hot plug controller.
Figure 23:
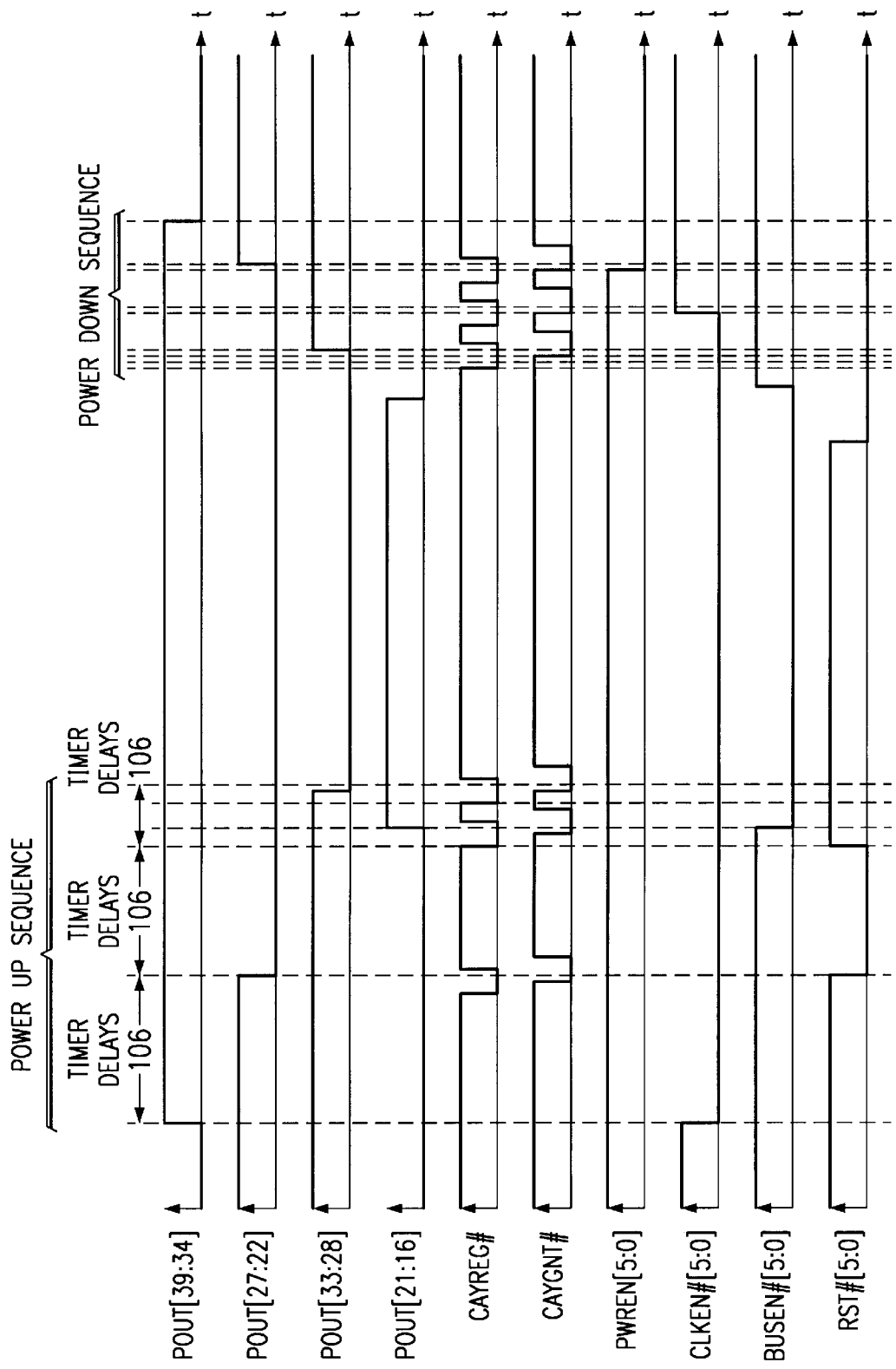
FIG. 23 shows waveforms of signals of the hot plug controller.
Figure 24A:
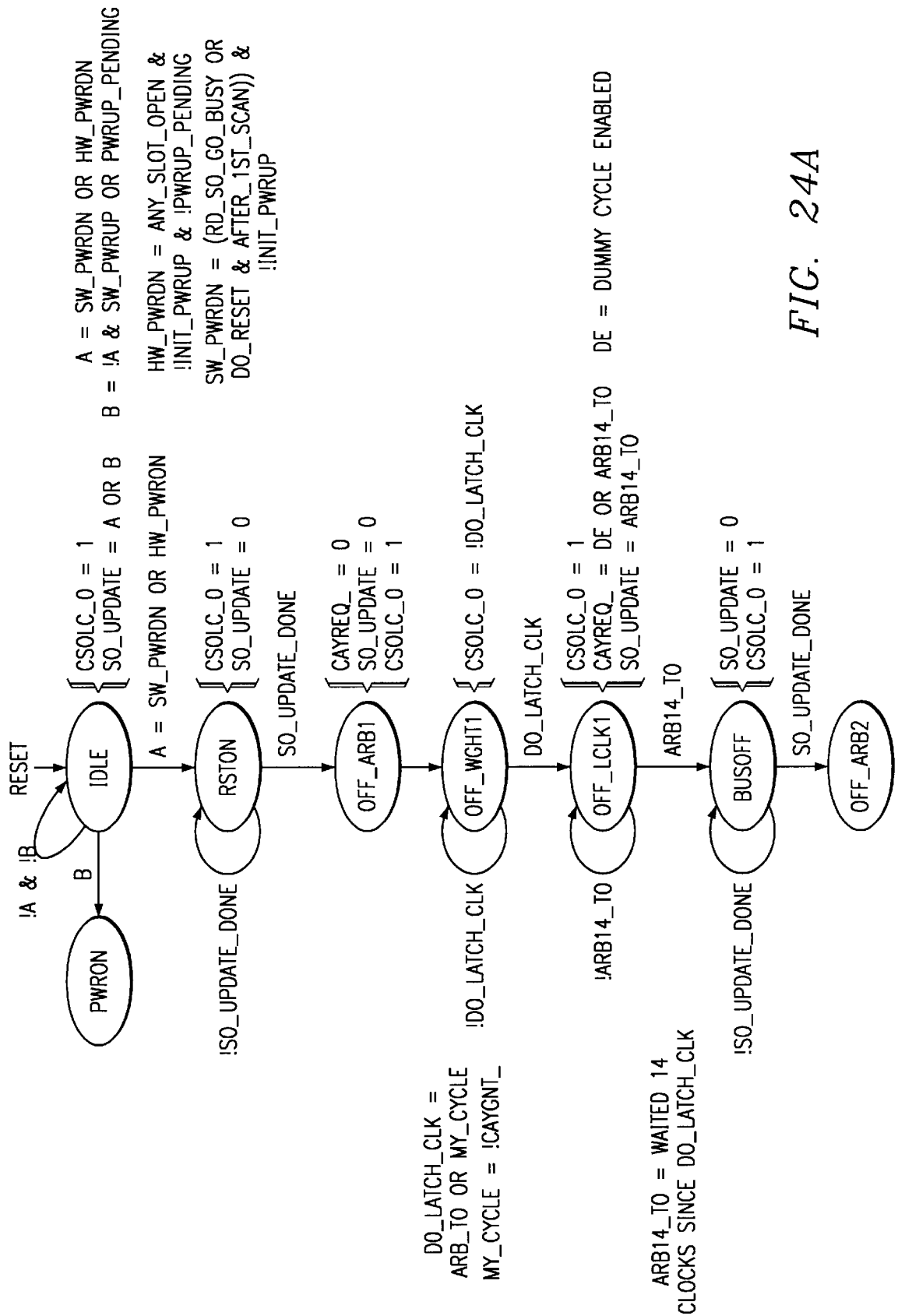
Figure 24C:
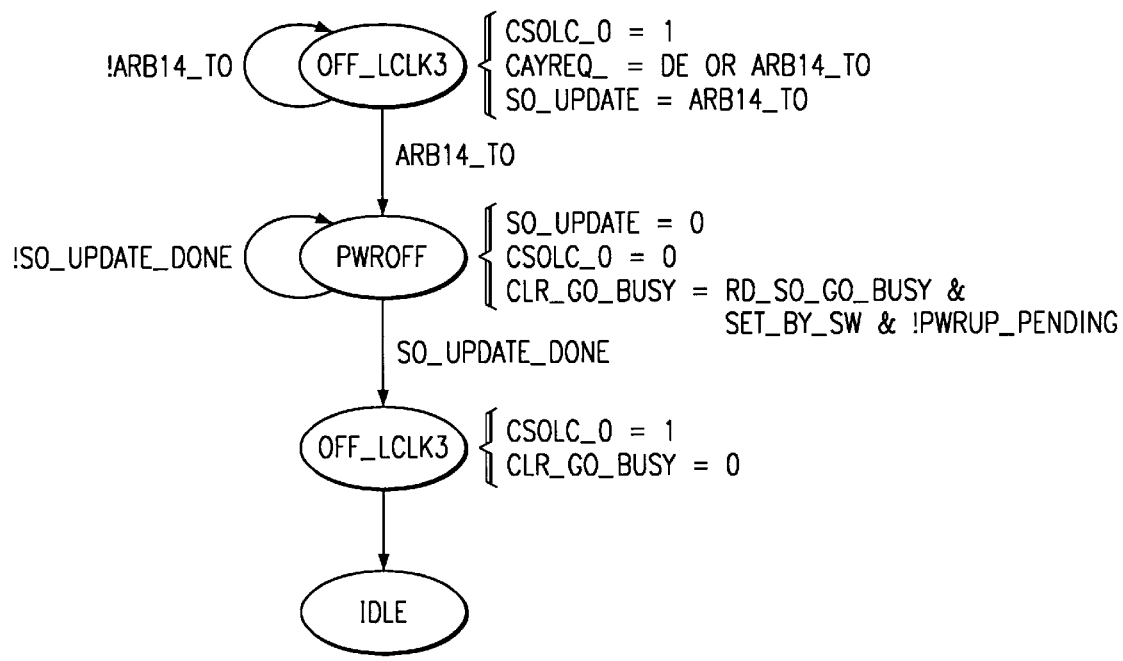
Figure 24F:
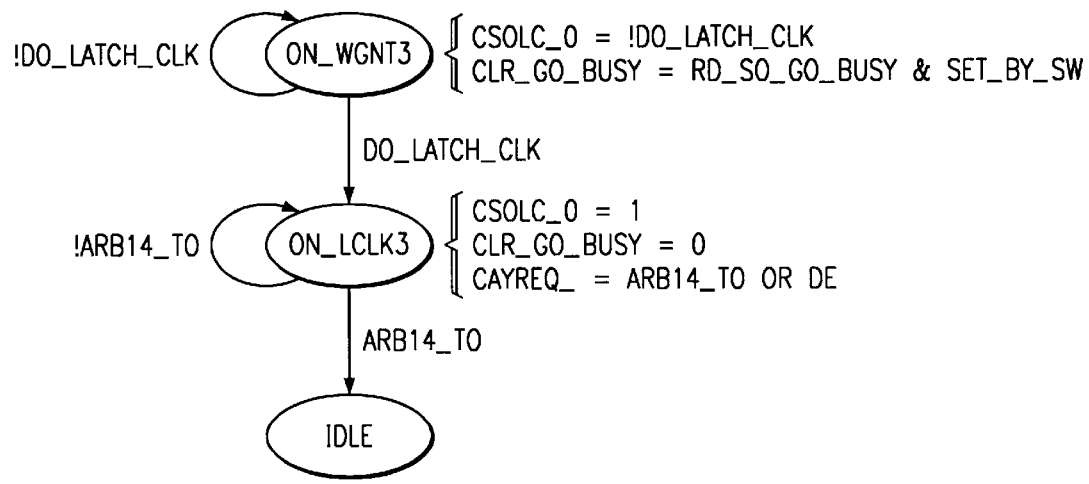
Figure 24D:
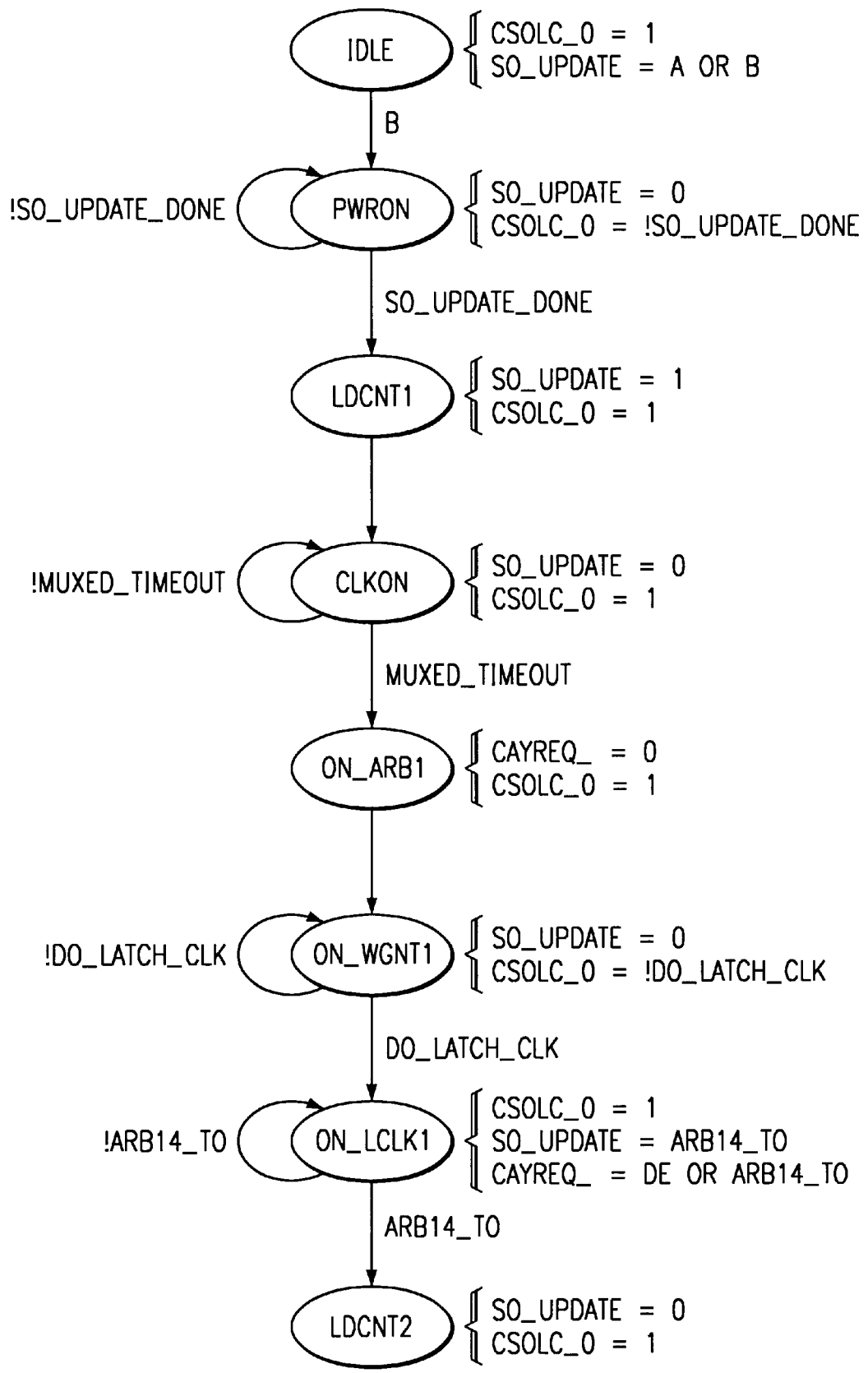
Figure 24E:
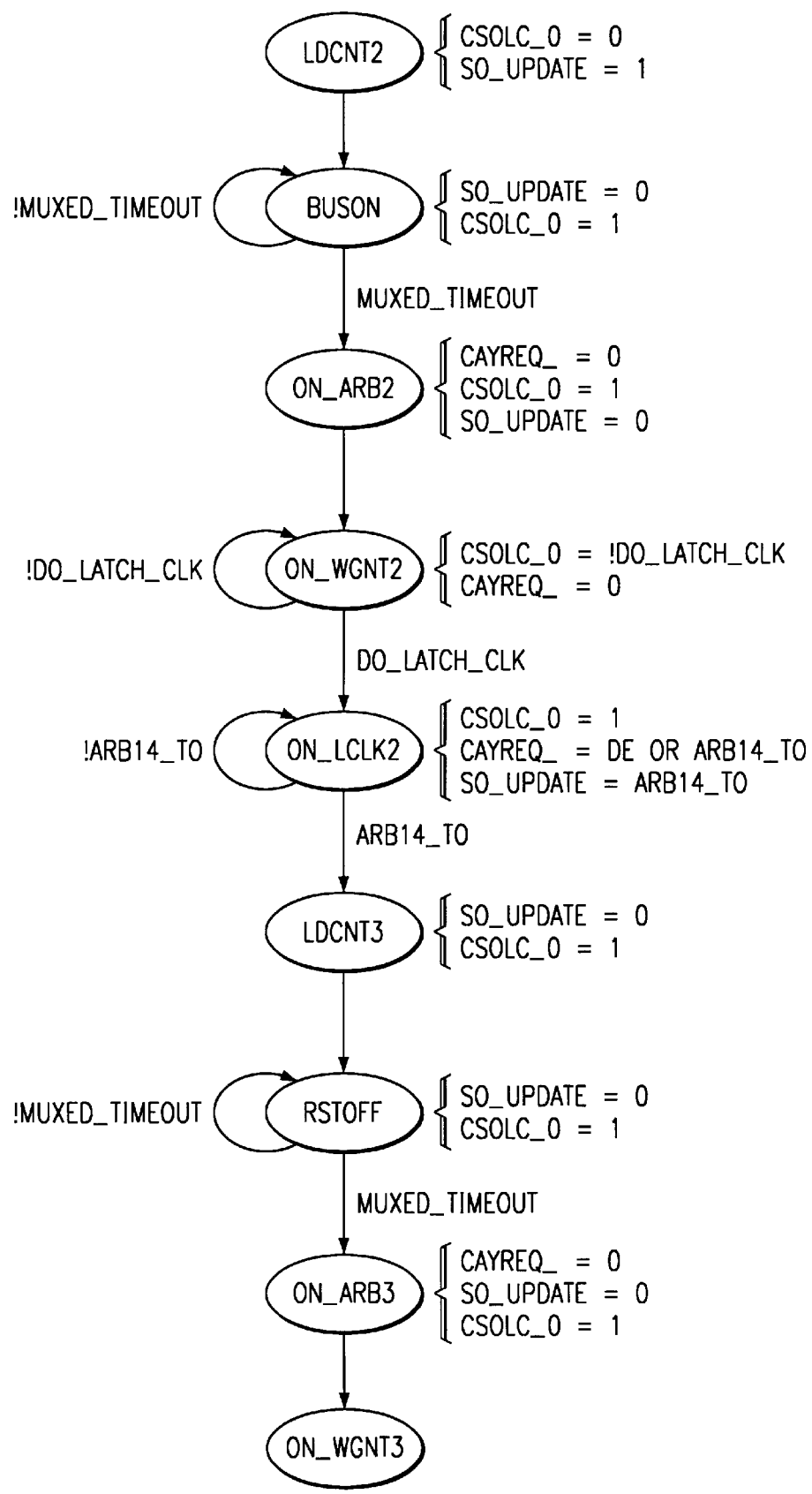

As shown in FIG. 22, the ON/OFF control logic 820 includes an ON/OFF state machine 998 which receives the signals RST_SWITCH[5:0], SLOT_EN[5:0] and SLOT_RST_[5:0]. Based on the conditions indicated by these signals, the ON/OFF state machine 998 indicates and controls the appropriate power up or power down sequences. The ON/OFF state machine 998 furnishes control signals to control logic 999.

The ON/OFF state machine 998 furnishes a serial output update signal SO_UPDATE to the serial output logic 824. When the signal SO_UPDATE is asserted, or driven high, the serial output logic 824 begins the shifting phase and serially shifts control data, via the signal CSOD_O, to the register 80. The serial output logic 824 indicates completion of the shifting phase by asserting a signal SO_UPDATE_DONE which is received by the ON/OFF state machine 998. The ON/OFF state machine 998 subsequently updates the control signals POUT[39:0] by negating, or clocking, the latch signal CSOLC_O_ which is received by the register 80.

The control logic 999 furnishes the signals PWREN[5:0], CLKEN#[5:0], BUSEN#[5:0] and RST#[5:0] to the serial output logic 824. The control logic 999 also furnishes a PCI bus request signal CAYREQ# which is received by the master interface 809b. The control logic 999 asserts the CAYREQ# signal to request ownership of the PCI bus 332. The master interface 809b receives the CAYREEQ# signal and asserts a GNT# line (assigned to the hot plug controller 350) on the bus 332 when the CAYREQ# signal is asserted. When the arbiter 327 grants ownership of the bus 332 to the controller 350 (as indicated by the assertion of a REQ# line assigned to the hot plug controller 350), the master interface 809b asserts a signal called CAYGNT# which is received by the control logic 999. The assertion of the CAYREQ# signal marks the beginning of the dummy bus cycle 200.

Referring to FIGS. 23 and 24A–F, the ON/OFF state machine 998 enters an idle state IDLE upon assertion of the reset signal RST. If not idle, the ON/OFF state machine 998 controls one of three sequences: the power down sequence, the power on sequence, or a one pass sequence (not shown). The one pass sequence is used to update the control signals POUT[39:0] as indicated by the slot enable 817 and LED control (not shown) registers.

The ON/OFF state machine 998 begins the power down sequence when either the software requests a power down of at least one of the slot connectors 336, as indicated by the deassertion of the signals SLOT_EN[5:0] or the serial scan input logic 804 determines at least one of the slot connectors 336a–f should undergo the power down sequence, as indicated by the assertion of the signals RST_SWITCH[5:0]. To begin the power down sequence, the ON/OFF state machine 998 asserts the SO_UPDATE signal to begin a shifting phase to reset selected card(s) 807 and transitions from the IDLE state to a RSTON state.

During the RSTON state, the control logic 999 negates the reset signals RST#[5:0] for the slot connectors 336 that are to be powered down, and the serial output logic 824 serially shifts the reset signals RST#[5:0] to the output register 380. The ON/OFF state machine 998 also negates the signal SO UPDATE. Once all forty-control signals are shifted by the serial output logic 824 to the register 380, as indicated by the assertion of the signal SO_UPDATE_DONE, the ON/OFF state machine 998 transitions from the RSTON state to an OFF_ARB1 state where the state machine 998 requests control of the secondary PCI bus 332 (by asserting the PCI request signal CAYREQ#).

The state machine 998 transitions from the OFF_ARB1 state to an OFF_WGNT1 state where the machine 998 waits for either the grant of the PCI bus 332 (as indicated by the assertion of the CAYGNT# signal) or the expiration of an arbiter timeout signal called ARB_TO. The deadman timer measures a predetermined window of time for the arbiter 327 to grant access to the bus 332. Once either the deadman timer expires or the controller 350 is granted control of the bus 332, the controller 350 begins the dummy bus cycle 200a (if the use of dummy cycles 200 is enabled by a configuration bit DE), and the state machine 998 transitions to a state called OFF_LCLK1. After being granted the bus 332, once any preexisting cycles on the bus 332 complete, the controller 350 furnishes the dummy bus cycle 200a (if the bit DE is set in the control register 814). In transitioning to the OFF_LCLK1 state, the state machine 998 drives low the CSOLC_O signal for one PCI clock cycle to latch in the new POUT[39:0] values in the output register 380 (i.e., to reset the selected card(s)).

The ON/OFF state machine 998 remains in the OFF_LCLK1 state for a predetermined number (e.g., 14) of PCI clock cycles to allow circuitry on the card 807 to fully reset. During this time, if the use of dummy cycles 200 is disenabled (as indicated by the configuration bit called DE), the state machine 998 asserts the CAYREQ# signal to request use of the bus 332. However, if the use of dummy cycles 200 is enabled, the state machine 998 keeps the CAYREQ# signal deasserted. After the predetermined number of clock cycles expires (as indicated by the assertion of a signal called ARB14_TO), the state machine 998 deasserts the CAYREQ# signal (if asserted) and transitions to a state called BUSOFF to update the register 380 with the values required to disconnect the bus 332 from the selected card(s) 807. In transitioning to the BUSOFF state, the state machine 998 asserts the SO_UPDATE signal for one PCI clock cycle to begin another shifting sequence to transfer the new POUT[39:0] values into the outputregister 380.

During the BUSOFF state, the control logic 999 deasserts, or drives high, the bus enable signals BUSEN#[5:0] for the slot connectors 336 that are to be powered down, and the serial output logic 824 serially shifts the bus enable signals BUSEN#[5:0] to the outputregister 380. The ON/OFF state machine 998 also negates the signal SO_UPDATE and asserts the signal CSOLC_O. Once all forty-control signals are shifted by the serial output logic 824, as indicated by the assertion of the signal SO_UPDATE_DONE, the ON/OFF state machine 998 transitions from the BUSOFF state to an OFF_ARB2 state to request control of the PCI bus 332.

In the OFF_ARB2 state, the ON/OFF state machine 998 requests control of the secondary PCI bus 332 by asserting the request signal CAYREQ#. The ON/OFF state machine 998 then transitions to an OFF_WGNT2 state where the state machine 998 waits for the grant of the secondary PCI bus 332. When the arbiter 327 grants control of the bus 332 (as indicated by the assertion of the CAYGNT# signal) or when the arbitration deadman time expires (as indicated by the assertion of a signal called ARB_TO), the ON/OFF state machine 998 negates the signal CSOLC_O for one cycle of the signal CLK to update the control signals POUT[39:0] and transitions to an OFF_LCLK2 state. After being granted the bus 332, once any preexisting cycles on the bus 332 complete, the controller 350 furnishes the dummy bus cycle 200a (if the bit DE is set in the control register 814).

The ON/OFF state machine 998 remains in the OFF_LCLK2 state for a predetermined number (e.g., 14) of PCI clock cycles to allow circuitry on the card 807 to be fully reset. During this time, if the use of dummy cycles 200 is not enabled (as indicated by the configuration bit DE), the state machine 998 asserts the CAYREQ# signal to request use of the bus 332. However, if the use of dummy cycles 200 is enabled, the state machine 998 keeps the CAYREQ# signal deasserted. After the predetermined number of clock cycles expires (as indicated by the assertion of a signal called ARB14_TO), the state machine 998 deasserts the CAYREQ# signal (if asserted) and transitions to a state called CLK_OFF to update theregister 380 with the values required to disconnect the PCI clock signal from the selected card(s) 807. In transitioning to the CLK_OFF state, the state machine 998 asserts the SO UPDATE signal for one PCI clock cycle to begin another shift sequence to transfer the new POUT[39:0] values into the outputregister 380.

During the CLK_OFF state, the control logic 999 deasserts, or drives high, the clock enable signals CLKEN# [5:0] for the slot connectors 336 that are to be powered down. The signals RST#[5:0] do not change, and the serial output logic 824 serially shifts the clock enable signals CLKEN#[5:0] to the outputregister 380. The ON/OFF state machine 998 also negates the signal SO_UPDATE. Once all forty control signals are shifted by the serial output logic 824, as indicated by the assertion of the signal SO_UPDATE_DONE, the ON/OFF state machine 998 transitions from the CLK_OFF state to an OFF_ARB3 state, where the state machine 998 once again requests control of the PCI bus 332 by asserting the CAYREQ# signal.

The state machine 998 then transitions from the OFF_ARB3 state to an OFF_WGNT3 state where the state machine 998 waits for either the grant of the PCI bus 332 or the expiration of the arbitration deadman timer. Once the grant is received or the arbitration deadman timer expires, the state machine 998 transitions to an OFF_LCLK3 state. After being granted the bus 332, once any preexisting cycles on the bus 332 complete, the controller 350 furnishes the dummy bus cycle 200a (if the bit DE is set in the control register 814).

The ON/OFF state machine 998 remains in the OFF_LCLK3 state for a predetermined number (e.g., 14) of PCI clock cycles to allow circuitry on the card 807 to become functional with the PCI clock signal. During this time, if the use of dummy cycles 200 is not enabled (as indicated by a configuration bit called DE), the state machine 998 asserts the CAYREQ# signal to request use of the bus 332. However, if the use of dummy cycles 200 is enabled, the state machine 998 keeps the CAYREQ# signal deasserted. After the predetermined number of clock cycles expires (as indicated by the assertion of a signal called ARB14_TO), the state machine 998 deasserts the CAYREQ# signal (if asserted) and transitions to a state called PWROFF to update theregister 380 with the values required to remove power from the selected card(s) 807. In transitioning to the PWR OFF state, the state machine 998 asserts the SO UPDATE signal for one PCI clock cycle to begin another shift sequence to transfer the new POUT[39:0] values into the outputregister 380 and thus, begin another shifting phase.

During the PWROFF state, the control logic 999 deasserts, or dries low, the power enable signals PWREN [5:0] for the slot connectors 336 that are to be powered down. The signals RST#[5:0], BUSEN#[5:0], and CLKEN# [5:0] do not change, and the serial output logic 824 serially shifts the power enable signals PWREN[5:0] to the outputregister 380. The ON/OFF state machine 998 also negates the signal SO_UPDATE. Once all forty control signals are shifted by the serial output logic 824, as indicated by the assertion of the signal SO_UPDATE_DONE, the ON/OFF state machine 998 transitions from the PWROFF state to an OFF_LCLK4 state where the signals POUT[39:0] are updated by negating the signal CSOLC_O for one cycle of the signal CLK. The state machine 998 then transitions to the IDLE state which completes the power down sequence.

If a power down sequence is not required, the ON/OFF state machine 998 determines if the power up sequence is required. If either the software has requested at least one of the slot connectors 336 to powered up or a power up of the card platform 330 is pending, then the ON/OFF state machine 998 transitions from the IDLE state to a power on PWRON state to begin the power on sequence. To begin the power on sequence, the ON/OFF state machine 998 asserts the SO_UPDATE signal to begin a shift phase and transitions from the IDLE state to a power on state PWRON.

During the PWRON state, the control logic 999 asserts the power enable signals PWREN[5:0] for the card(s) 807 that are to be powered up, and the serial output logic 824 serially shifts the power enable signals PWREN[5:0] to the outputregister 380. The ON/OFF state machine 998 also negates the signal SO-UPDATE. Once all forty control signals are shifted by the serial output logic 824, as indicated by the assertion of the signal SO_UPDATE_DONE, the ON/OFF state machine 998 transitions from the PWRON state to a timer 806 initialization state LDCNT1, and during the transition, the state machine 998 negates the load signal CSOLC_O for one PCI clock cycle to update the control signals POUT[39:0].

In the LDCNT1 state, the ON/OFF state machine 998 initializes the timers 806 so that the timers 806 provide an indication when a predetermined stabilization delay interval has expired. The stabilization delay interval allows sufficient time for the card 807 that is being powered up to stabilize once the voltage level $V_{DD}$ is furnished to the card 807. In the LDCNT1 state, the ON/OFF state machine 998 asserts the signal CSOLC_O. The ON/OFF state machine 820 transitions from the LDCNT1 state to a CLKON state to provide the PCI clock signal to the selected card(s) 807.

During the CLKON state, the control logic 999 asserts, or drives low, the clock enable signals CLKEN#[5:0] for the slot connectors 336 that are to be powered up. The PWREN [5:0] signals remain unchanged, and the serial output logic 824 serially shifts the clock enable signals CLKEN#[5:0] to the output register 380. The ON/OFF state machine 998 also negates the signal SO_UPDATE. Once a stabilization delay interval has expired, the ON/OFF state machine 998 transitions from the CLKOFF state to an ON_ARB1 state.

In the ON_ARB1 state, the ON/OFF state machine 998 requests control of the secondary PCI bus 332 by asserting the request signal CAYREQ# which begins the dummy cycle 200a (if enabled by the bit DE). The ON/OFF state machine 998 then transitions to an ON_WGNT1 state where the state machine 998 waits for the grant of the secondary PCI bus 332. When the arbiter 327 grants control of the bus 332 (as indicated by the assertion of the CAYGNT# signal) or when an arbitration deadman time expires (as indicated by the assertion of a signal called ARB_TO), the ON/OFF state machine 998 negates the signal CSOLC_O for one cycle of the signal CLK to update the control signals POUT[39:0] and transitions to an ON_LCLK2 state. After being granted the bus 332, once any preexisting cycles on the bus 332 complete, the controller 350 furnishes the dummy bus cycle 200a (if the bit DE is set in the control register 814).

The ON/OFF state machine 998 remains in the ON_LCLK1 state for a predetermined number (e.g., 14) of PCI clock cycles to allow circuitry on the card 807 to fully reset. During this time, if the dummy cycles 200 are not enabled (as indicated by a configuration bit called DE), the state machine 998 asserts the CAYREQ# signal to request use of the bus 332. However, if the dummy cycles 200 are enabled, the state machine 998 keeps the CAYREQ# signal deasserted. After the predetermined number of clock cycles expires (as indicated by the assertion of a signal called ARB14_TO), the state machine 998 deasserts the CAYREQ# signal (if asserted) and transitions to a state called LDCNT2 to initialize the timers 806 so that the timers 806 provide an indication when a predetermined stabilization delay interval has expired. In transitioning to the LDCNT2 state, the state machine 998 asserts the SO_UPDATE signal for one PCI clock cycle to begin another shift sequence to transfer the new POUT[39:0] values into the outputregister 380 and thus, begin another shifting phase. The state machine 998 transitions from the LDCNT2 state to the BUSON state where the outputregister 380 is updated with the values needed to connect selected card(s) 807 to communication lines of the bus 332.

During the BUSON state, the control logic 999 asserts, or drives low, the bus enable signals BUSEN#[5:0] for the slot connectors 336 that are to be powered up. The signals CLKEN#[5:0] and PWREN[5:0] remain unchanged, and the serial output logic 824 serially shifts the bus enable signals BUSEN#[5:0] to the outputregister 380. The ON/OFF state machine 998 also negates the signal SO-UPDATE. Once a predetermined stabilization delay expires (a delay sufficient to allow all forty signals to be shifted out to the controlregister 380), the ON/OFF state machine 998 transitions from the BUSON state to an ON_ARB2 state where the state machine 998 once again requests control of the PCI bus 332 which begins the dummy bus cycle 200a (if enabled by the bit DE).

In the ON_ARB2 state, the ON/OFF state machine 998 requests control of the secondary PCI bus 332 by asserting the request signal CAYREQ# which begins the dummy cycle 200a (if enabled by the bit DE). The ON/OFF state machine 998 then transitions to an ON_WGNT2 state where the state machine 998 waits for the grant of the secondary PCI bus 332. When the arbiter 327 grants control of the bus 332 (as indicated by the assertion of the CAYGNT# signal) or when the deadman time expires (as indicated by the assertion of a signal called ARB_TO), the ON/OFF state machine 998 negates the signal CSOLC_O for one cycle of the signal CLK to update the control signals POUT[39:0] and transitions to an ON_LCLK2 state. After being granted the bus 332, once any preexisting cycles on the bus 332 complete, the controller 350 furnishes the dummy bus cycle 200a (if the bit DE is set in the control register 814).

The ON/OFF state machine 998 remains in the ON_LCLK2 state for a predetermined number (e.g., 14) of PCI clock cycles to allow circuitry on the card 807 to become functional with the PCI bus signals. During this time, if the use of the dummy cycles 200 is not enabled (as indicated by a configuration bit called DE), the state machine 998 asserts the CAYREQ# signal to request use of the bus 332. However, if the use of the dummy cycles 200 is enabled, the state machine 998 keeps the CAYREQ# signal deasserted. After the predetermined number of clock cycles expires (as indicated by the assertion of a signal called ARB14_TO), the state machine 998 deasserts the CAYREQ# signal (if asserted) and transitions to a state called LDCNT3 to initialize the timers 806 so that the timers 806 provide an indication when a predetermined stabilization delay interval has expired. In transitioning to the LDCNT3 state, the state machine 998 asserts the SO_UPDATE signal for one PCI clock cycle to begin another shift sequence to transfer the new POUT[39:0] values into the outputregister 380 and thus, begin another shifting phase. The state machine 998 transitions from the LDCNT3 state to a RSTOFF state where the outputregister 380 is updated with the values needed to bring selected card(s) 807 out of reset.

During the RSTOFF state, the control logic 999 asserts, or negates, the reset signals RST#[5:0] for the slot connectors 336 that are to be powered up, depending on their respective SLOT_RST_[5:0] signals. The signals CLKEN#[5:0], PWREN[5:0] and BUSEN#[5:0] remain unchanged, and the serial output logic 824 serially shifts the reset signals RST#[5:0] to the outputregister 380. The ON/OFF state machine 998 also negates the signal SO_UPDATE. During the RSTOFF state, the state machine 998 shifts all forty control signals via the serial output logic 824. Once a stabilization delay interval has expired, the ON/OFF state machine 998 transitions from the RSTOFF state to an ON_ARB3 state where the state machine 998 once again requests control of the PCI bus 332 and initiates the dummy bus cycle 200a (if the bit DE is set).

The ON/OFF state machine 998 then transitions to an ON_WGNT3 state where the state machine 998 waits for the grant of the secondary PCI bus 332. After being granted the bus 332, once any preexisting cycles on the bus 332 complete, the controller 350 furnishes the dummy bus cycle 200a (if the bit DE is set in the control register 814). If access is not granted by the arbiter 327 within a predetermined window of time, the ON/OFF state machine 998 proceeds to the IDLE state, which completes the power up sequence. When the arbiter 327 grants control of the bus 332 (as indicated by the assertion of the CAYGNT# signal) or when the deadman time expires (as indicated by the assertion of a signal called ARB_TO), the ON/OFF state machine 998 negates the signal CSOLC_O for one cycle of the signal CLK to update the control signals POUT[39:0] and transitions to the IDLE state, which completes the power up sequence.

Figure 25:
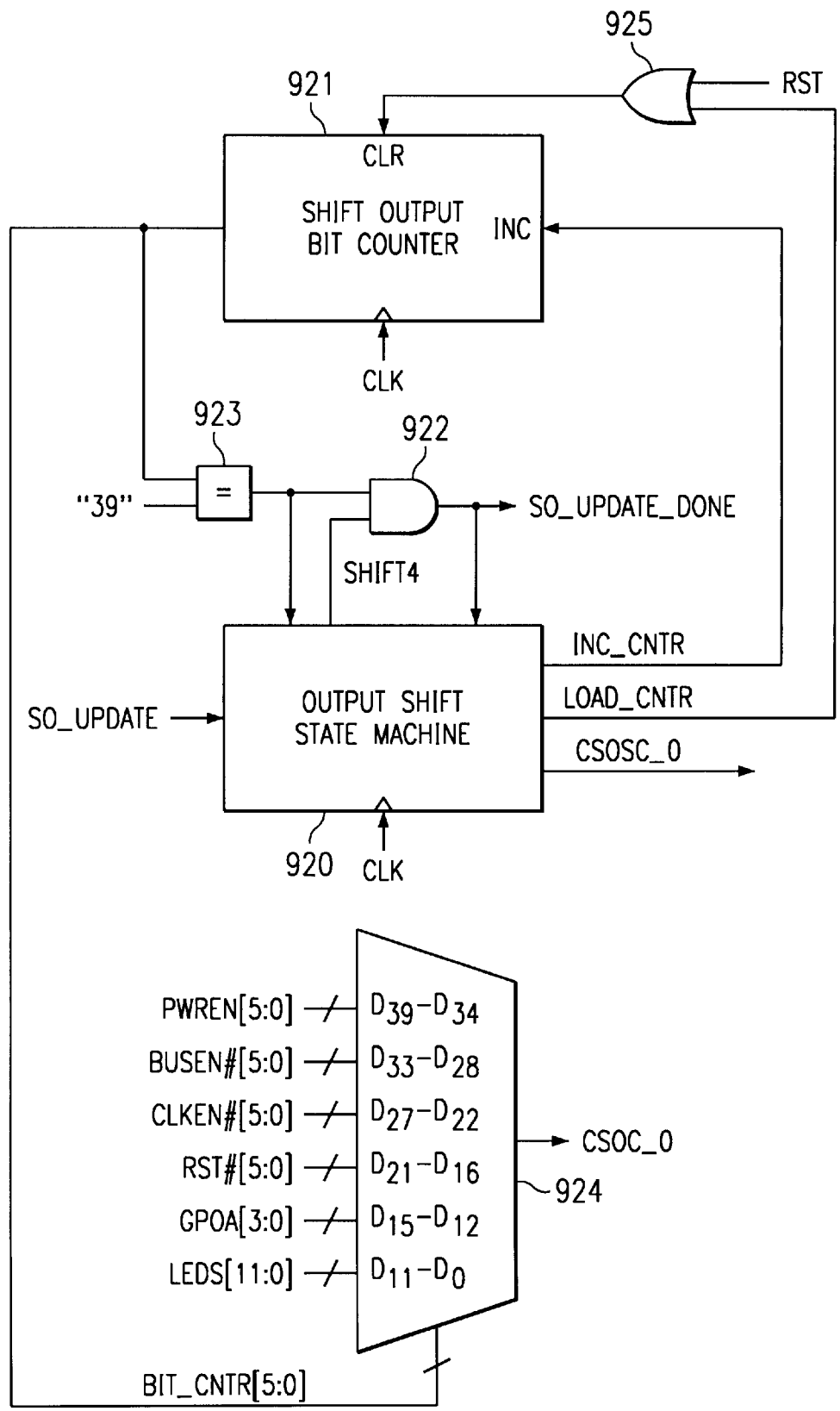
FIG. 25 is a schematic diagram of output logic of the hot plug controller.

Referring to FIG. 25, the serial output logic 824 includes a shift output bit counter 921 that provides a six bit counter output signal BIT_CNTR[5:0] which tracks the control signal shifted out of the serial output logic 824 via the signal CSOD_O. When the signal BIT_CNTR[5:0] is equal to a six digit number equivalent to "39" then a signal MAX_CNT is asserted. The signal MAX_CNT is provided to the input of an AND gate 922. The AND gate 922 further receives a signal SHIFT4 which is asserted when the output shift state machine 920 enters its SHIFT4 state, further described below. The output of the AND gate 922 provides the signal SO_UPDATE_DONE.

The output shift state machine 920 furnishes an increment counter signal INC_CNTR to the bit counter 921. When the INC_CNTR signal is asserted, the bit counter 921 increments the value represented by the signal BIT_CNTR[5:0]. When a load counter signal LOAD_CNTR is asserted or when the RST signal is asserted, then the output of an OR gate 925, connected to a clear input of the bit counter 921, clears the signal BIT_CNTR[5:0].

The signal BIT_CNTR[5:0] is furnished to the select input of a multi-bit multiplexer 924 that furnishes the signal CSOD_O. The zero through eleven inputs of the multiplexer 924 receive the LED control signals LEDS[11:0]. The twelve through fifteen inputs of the multiplexer 924 receive general purpose output signals GPOA[3:0]. The sixteen through twenty-one inputs receive the reset signals RST#

[5:0]. The twenty-two through twenty-seven inputs receive the clock enable signals CLKEN#[5:0]. The twenty-eight through thirty-three inputs receive the bus enable signals BUSEN#[5:0]. The thirty-four through thirty-nine inputs receive the power enable signals PWREN[5:0].

Figure 26:
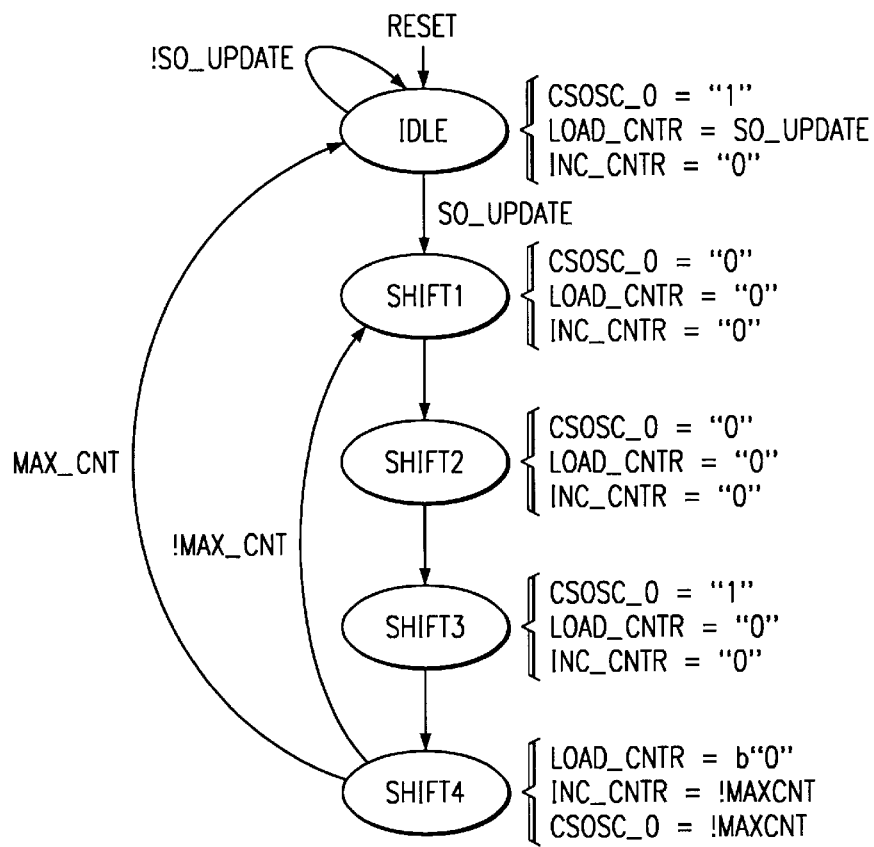
FIG. 26 is a state diagram illustrating operation of the output logic of FIG. 25.
Figure 27:
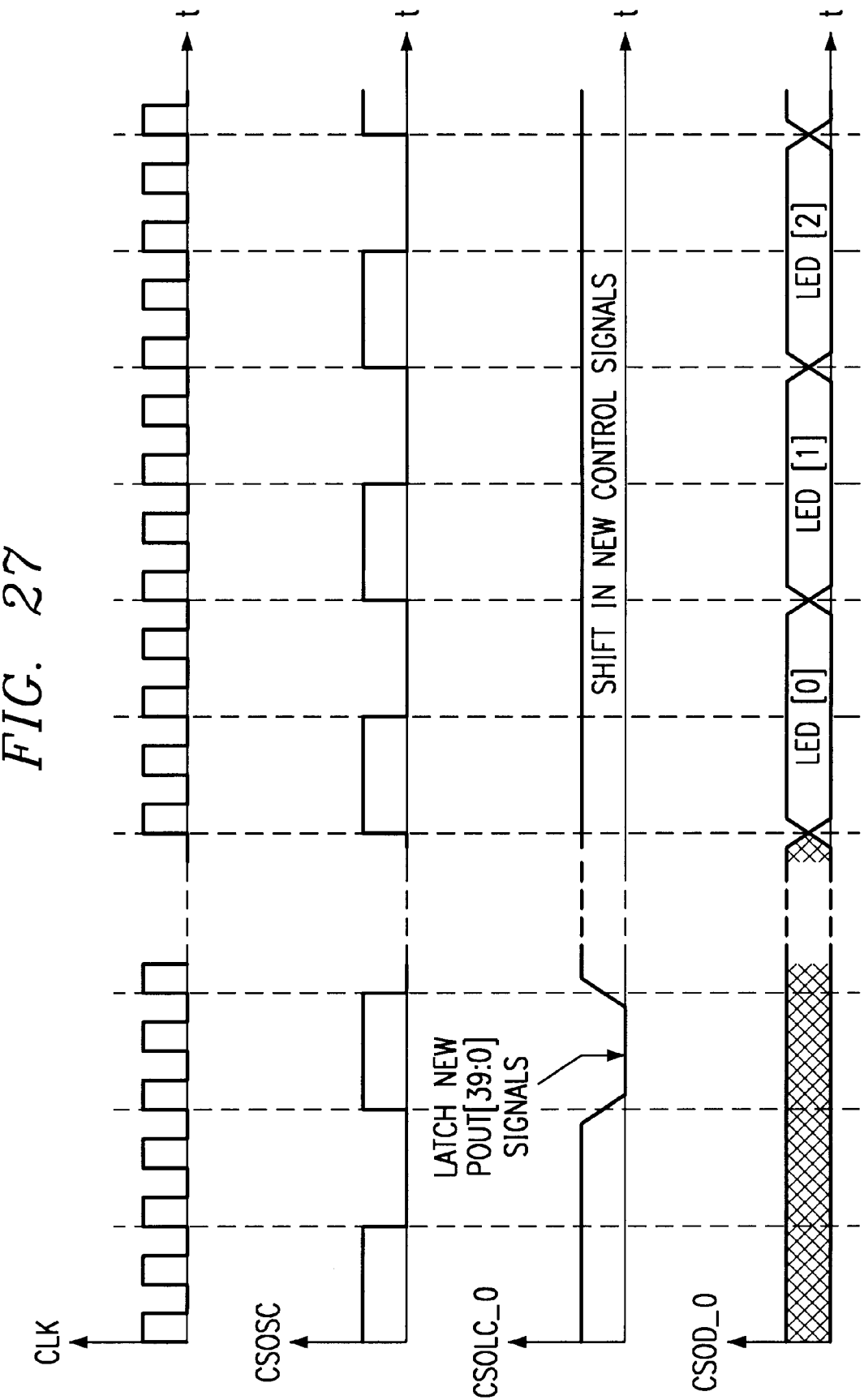
FIG. 27 shows waveforms of output signals of the hot plug controller.

Referring to FIGS. 26 and 27, the output shift state machine 920 enters an IDLE state when the signal RST is asserted. If the signal SO_UPDATE is asserted, then the output shift state machine 920 transitions from the IDLE state to a SHIFT1 state.

Because the output shift state machine 920 is clocked on the positive edge of the PCI clock signal CLK, the output shift state machine 920 transitions through a SHIFT1 state, a SHIFT2 state, a SHIFT3 state and a SHIFT4 state to generate the clock signal CSOSC_O that is one fourth of the frequency of the clock signal CLK. During the SHIFT1 and SHIFT2 states the clock signal CSOSC_O is negated, or low, and during the SHIFT3 and SHIFT4 states, the clock signal CSOSC_O is asserted, or high. When the current shift phase is completed, as indicated by the assertion of the signal MAXCNT, the shift state machine 920 returns to the IDLE state and the clock signal CSOSC_O is asserted until the beginning of the next shifting phase.

Figure 28:
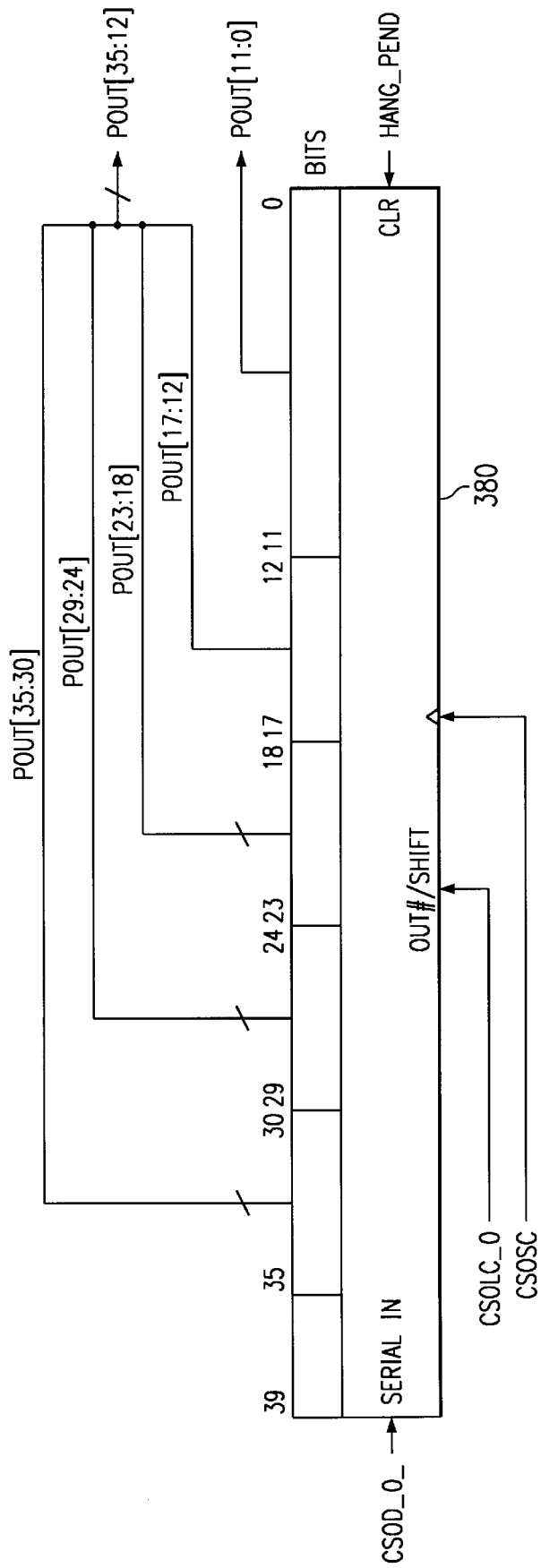
FIG. 28 is a schematic diagram of an output shift register of the hot plug controller.

As shown in FIG. 28, a HANG_PEND signal is received by the clear input of theregister 380. The assertion, or driving high, or the HANG_PEND signal asynchronously clears the appropriate output control signals POUT[39:0] to power down all slot connectors 336 when the PCI bus 332 is in a locked up condition.

In other embodiments, in the power down sequence, the card 807 may be placed in reset before the bus lines of the card 807 are disconnected. In the power up sequence, the card 807 may be brought out of reset after the bus lines of the card 807 are connected. The dummy bus cycles 200 may be a normal read or write operation, a block read or write operation, or a read configuration operation. The dummy bus cycle 200 may not be a complete bus cycle at all. For example, the dummy bus cycle 200 may include asserting the PCI FRAME# signal for the duration of the dummy bus cycle 200.

Figure 30:
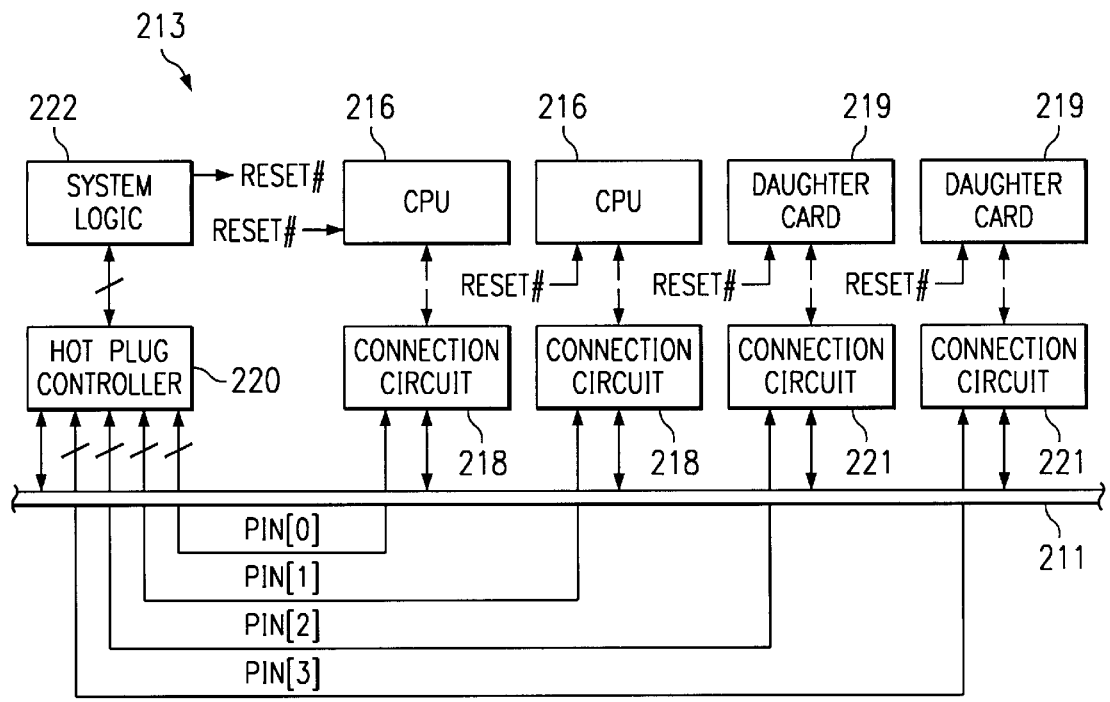

Referring to FIG. 30, besides hot plugging expansion bus devices, in another arrangement, other components (e.g., daughter cards 219 (e.g., a processor module) and central processing units (CPU)s 216) may be hot plugged into a local bus 211. The term "local bus" refers to a bus that is connected to a CPU, i.e., a bus that is local or close to the CPU. The local bus may reside, for example, on a motherboard of the computer system 310 or on one of the expansion cards 807. As a result of the hot plugging, the components may be added or removed from the computer system without requiring the computer system to be powered down.

Figure 9:
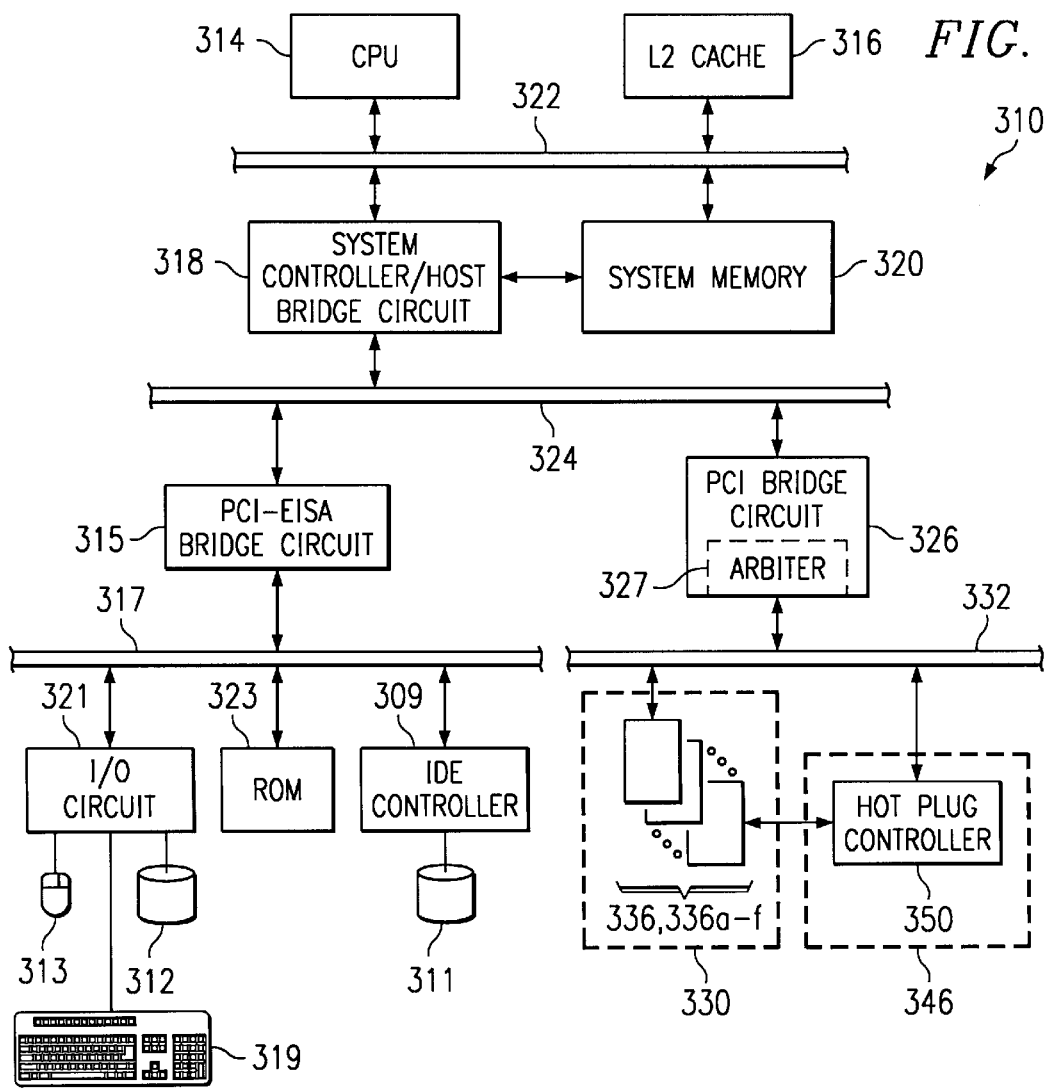
FIG. 9 is a block diagram of a computer system.
Figure 29:
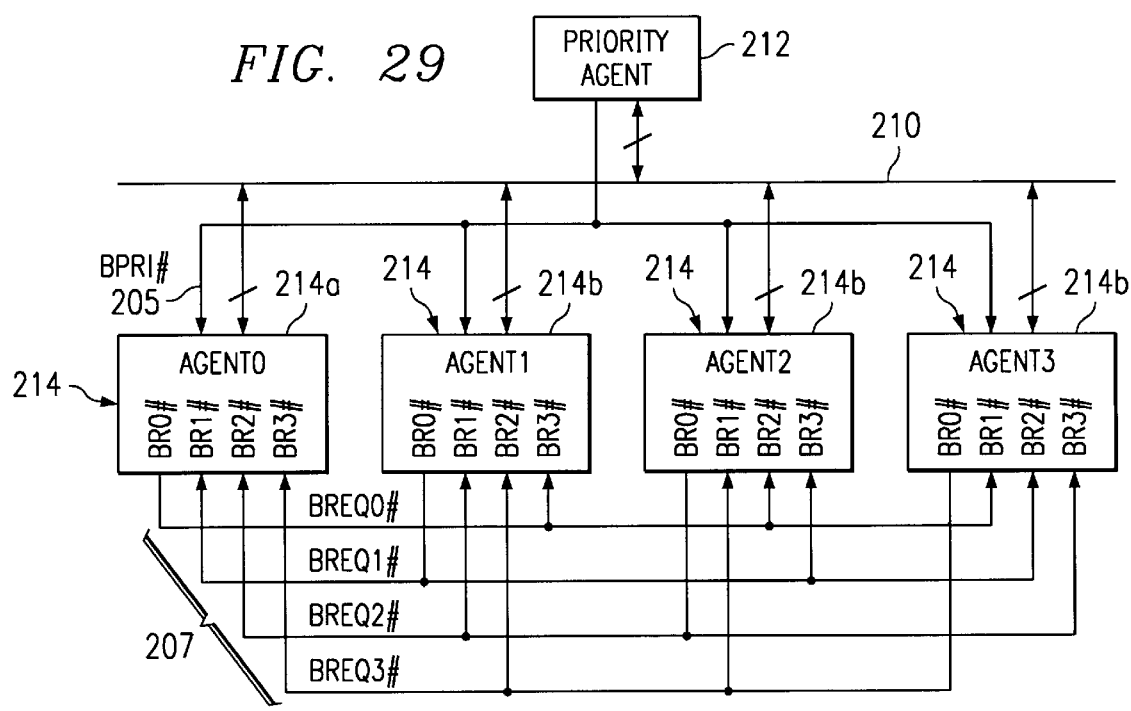
FIGS. 29 and 30 are block diagrams of computer systems.

Referring to FIG. 29, unlike the PCI bus, arbitration on a local bus 210 (e.g., a Pentium Pro Processor bus) does not require a dedicated bus arbiter (e.g., the arbiter 327 of FIG. 9). Instead, all of the potential bus mastering agents on the local bus 210 apply the same rules for determining which agent should own the bus 210. Some bus agents only serve as targets on the bus 210 and never arbitrate for ownership of the bus 210. Each potential bus mastering agent may be classified as being either a symmetric agent 214 (e.g., agents 214a, 214b, 214c, and 214d) or a priority agent 212.

For the symmetric agents 214, ownership of the bus 210 is determined by a predetermined priority scheme, such as a round robin priority scheme. To accomplish this, the local bus 210 has four bus request lines 207 (i.e., BREQ0# line, a BREQ1# line, a BREQ2# line, and a BREQ3# line) assigned uniquely to the agents 214. During an arbitration phase, one or more of the bus agents 214 request the bus 210 by asserting its respective bus request line 207. Each agent 214 stores a two-bit rotating identifier that points to the agent 214 with the lowest arbitration priority. Thus, due to the round robin priority scheme, the current owner of the bus 210 has the lowest arbitration priority for the next arbitration phase. A central processing unit (CPU) is one such example for the symmetric agent 214.

For purposes of arbitration, the priority agent 212 has a higher priority than any of the symmetric agents 214. The priority agent 212 uses a BPRI# line 205 on the bus 210 to request ownership of the bus 210. In this manner, any request made via the line 205 overrides any requests made by the symmetric agents 214 via the lines 207. The priority agent 212 may be, for example, a direct memory access controller (e.g., the circuit 18).

To determine the presence of other agents 214, each agent 214, on reset of the computer system, exclusively asserts one of the bus request lines 207. When the system comes out of reset, the agents 214 determine which agents 214 are present by monitoring the lines 207 for assertion.

Referring back to FIG. 30, in a computer system 213, bus agents, such as potential bus mastering, symmetric agents (e.g., the two CPUs 216 and the daughter card 219) or target agents may be inserted and removed while the system 213 remains powered up. To accomplish this, the system 213 has connection circuits (e.g., a connection circuit 218 for the CPUs 216, and connection circuits 221 for the daughter cards 219) that are coupled to a local bus 211 and controlled by a hot plug controller 220. The hot plug controller 220 is of a similar design to the hot plug controllers 60 and 350, discussed above, with some of the differences pointed out below. The hot plug controller 220 powers up and down the bus agents using the same power up and power down sequences used by the hot plug controller 350.

As with the hot plug controller 350, the hot plug controller 220 furnishes dummy cycles to the bus 211 during selected portions of the power up and power down sequences. These dummy cycles may be, for example, a read or write operation that is extended via wait states. The dummy cycles appear to the bus agents as real cycles on the bus 211. To totally lock out other bus agents from the bus 211, the hot plug controller 220 (in one arrangement) asserts a LOCK# signal on the bus 211 during the entirety of the power up and power down sequences.

Because the symmetric agents (e.g., the CPUs 216 and the daughter card 219) determine what other potential bus mastering agents are present in the system 213 at reset, the hot plug controller 220, upon completion of the power and power down sequences, interacts with system logic 222 to reset (via a signal called RESET#) all of the symmetric bus agents. In some arrangments, the hot plug controller 220 resets all of the bus agents any time one of the bus agents is powered up or down.

The connection circuit 217 for the daughter card 219 has a lever (similar to the lever 802 of FIG. 14) for securing the card 219 to a slot (similar to the slot connector 336) of the connection circuit 221. The connection circuit 221 also includes circuitry similar to the switch circuitry 341 (FIG. 17) for connecting the daughter card 219 to the local bus 211.

Figure 31:
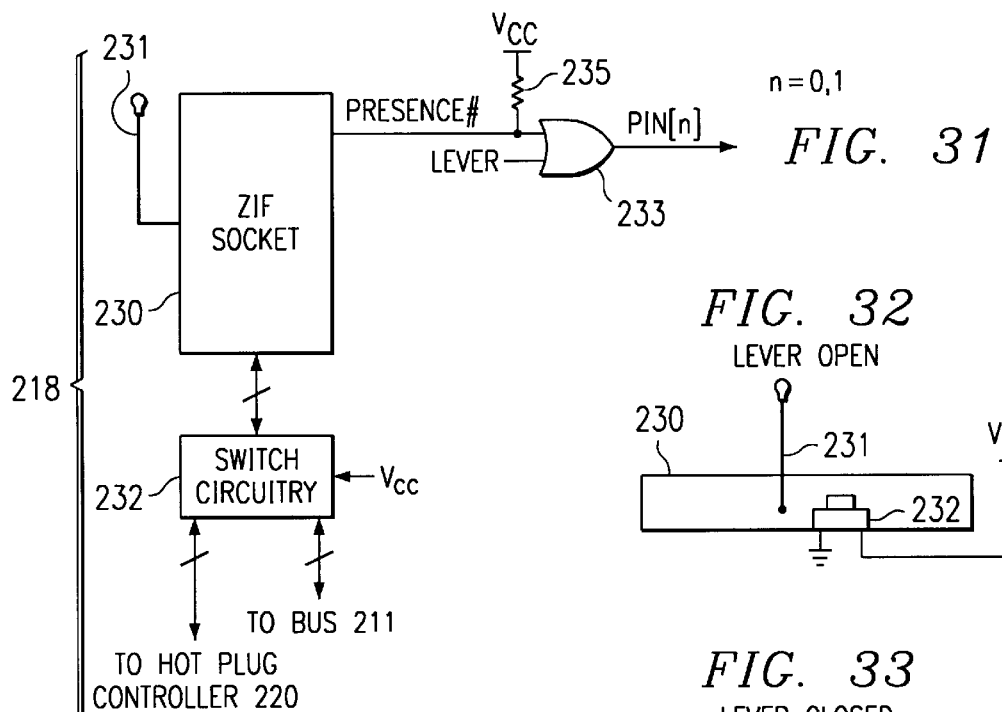
FIG. 31 is a schematic diagram of the connection circuitry of FIG. 30.

Referring to FIG. 31, the connection circuit 218 has a zero insertion force (ZIF) socket 230 which connects pins of the CPU 216 to a switch circuit 232 (of similar design to the switch circuitry 341) for connection to the bus 211. The hot plug controller 220 interacts with the switch circuit 232 to selectively connect pins of the CPU 216 to the bus 211 in a manner to implement the power up and power down sequences described above for the expansion cards 807.

As with the hot plug controller 350, the hot plug controller 220 monitors the connection status of the bus agents via bits (one for each of the connection circuits 217, 218 and 221) of a multi-bit status signal called PIN[3:0] (similar to the previously described PIN[31:0] signal that is received by the hot plug controller 350). Each bit of PIN[3:0] is furnished by an OR gate 233. One input of the OR gate 233 receives a signal PRESENCE# which indicates, by its assertion, whether the corresponding bus agent (e.g., the CPU 216) is in the socket 230. To accomplish this, one of the ground pins of the bus agent may be used to assert the PRESENCE# signal. The OR gate 233 also receives a LEVER signal which indicates the position (i.e., latched or unlatched) of a lever 231 of the socket 230.

Figure 32:
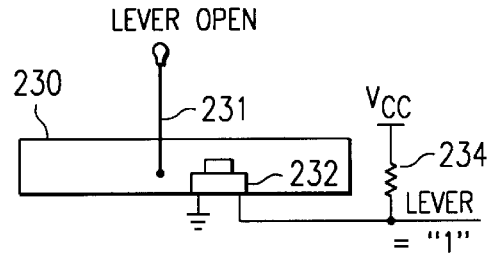
FIGS. 32 and 33 are a schematic diagrams of the socket of FIG. 30.
Figure 33:
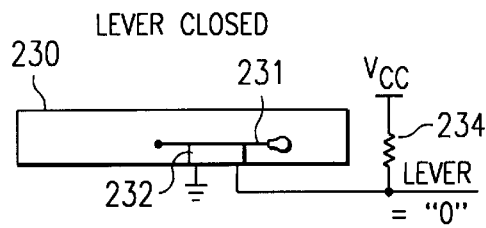

Referring to FIGS. 32 and 33, when the lever 231 is unlatched, a push-button switch 232 (providing the LEVER signal) is open, and the LEVER signal (pulled high by a pull-up resistor 234) is deasserted, or high. When the lever 231 is latched, the switch 232 is closed, and the LEVER signal is asserted, or low. Thus, the associated bit of the PIN[3:0] signal for the connection circuit 218 is deasserted, or high, when either the lever 231 is open or the CPU 216 is not in the socket 230. The associated bit of the PIN[3:0] signal for the connection circuit 218 is asserted, or low, when both the lever 231 is open and the CPU 216 is in the socket 230. Similar to the hot plug controller 350 and the signal PIN[31:0] (described above), the bits of the signal PIN[3:0] are serially scanned into the hot plug controller 220 which monitors the bits of the signal PIN[3:0] for changes.

What is claimed is:

1. A method for detecting insertion and removal of a memory module in a connnector, the memory module having presence detection logic connectable to a common presence bus for providing presence bits, the connector having pre-determined pins connectable to the common presence bus, the method comprising:

performing a read operation on the common presence bus directed to the memory module;

determining if valid presence bits were returned in response to the read operation;

providing an insertion indication that the memory module is inserted if valid presence bits were returned in response to the read operation; and providing a removal indication that the memory module is removed if invalid presence bits were returned in response to the read operation.

2. The method of claim 1, further comprising:

applying power to the connector before performing the read operation.

3. The method of claim 1, wherein the connector is connectable to a memory bus, the method further comprising:

connecting the memory bus to the connector in response to the insertion indication.

4. The method of claim 1, wherein the connector is connectable to a memory bus, the method comprising:

disconnecting the memory bus from the connector before performing the read operation.

5. The method of claim 4, wherein the disconnecting step includes maintaining power to the connector.

6. The method of claim 1, wherein the determining step further comprises:

determining if an exchange period has expired;

if the exchange period has expired, providing an indication to a user to complete the insertion or removal operation within a warning period; and aborting the insertion or removal operation if the warning period has expired.

7. The method of claim 1, wherein the determining step further comprises:

determining if an exchange period has expired;

requesting a response from a user to continue waiting for the insertion or removal; and aborting the insertion or removal operation if no response is received during a warning period.

8. A method for use with a computer system having a memory bus and a connector capable of receiving a memory module, the memory module having presence detection logic connectable to a common presence bus for providing presence bits, the connector having pre-determined pins connectable to the common presence bus, the method comprising:

performing a read operation on the common presence bus directed to the memory module;

determining if valid presence bits were returned in response to the read operation;

providing an insertion confirmation that the memory module is inserted if valid presence bits were returned in response to the read operation; and connecting the memory bus to the connector in response to the insertion confirmation.

9. The method of claim 8, further comprising:

receiving an insertion indication that a memory module will be inserted into the connector, before performing the read operation; and inserting the memory module after receipt of the insertion indication.

10. The method of claim 8, wherein the determining step further comprises:

determining if an exchange period has expired;

if the exchange period has expired, providing an indication to a user to complete the insertion operation within a warning period; and aborting the insertion operation if the warning period has expired.

11. The method of claim 8, wherein the determining step further comprises:

determining if an exchange period has expired;

requesting a response from a user to continue waiting for the insertion; and aborting the insertion operation if no response is received during a warning period.

12. A method for use with a computer system having a memory bus and a connector capable of receiving a memory module, the memory module having presence detection logic connectable to a common presence bus for providing presence bits, the connector having pre-determined pins connectable to the common presence bus, the method comprising:

disconnecting the memory bus from the connector;

performing a read operation on the common presence bus directed to the memory module after the memory bus is disconnected;

determining if valid presence bits were returned in response to the read operation; and providing a removal indication that the memory module is removed if invalid presence bits were returned in response to the read operation.

13. The method of claim 12, further comprising:
removing the memory module after disconnecting the memory bus from the connector.

14. The method of claim 12, further comprising:
receiving an insertion indication that a memory module will be inserted into the connector;
performing a read operation on the common presence bus directed to the memory module after receipt of the insertion indication;
determining if valid presence bits were returned in response to the read operation; and
providing an insertion confirmation that the memory module is inserted if valid presence bits were returned in response to the read operation.

15. The method of claim 14, further comprising:
connecting the memory bus to the connector in response to the insertion confirmation.

16. The method of claim 14, further comprising:
inserting the memory module after receipt of the insertion indication.

17. The method of claim 12, wherein the determining step further comprises:
determining if an exchange period has expired;
if the exchange period has expired, providing an indication to a user to complete the removal operation within a warning period; and
aborting the removal operation if the warning period has expired.

18. The method of claim 12, wherein the determining step further comprises:
determining if an exchange period has expired;
requesting a response from a user to continue waiting for the removal; and
aborting the removal operation if no response is received during a warning period.

19. A computer system, comprising:
one or more memory modules, each memory module including presence detect logic for providing presence detect data;
one or more slot connectors, each for holding one memory module;
a memory bus connectable to each slot connector; and
a memory controller coupled to the memory bus and having a presence detect controller for reading presence detect data from the memory modules, the memory controller operable to cause the memory bus to be connected to a particular slot connector, and the presence detect controller operable to determine if a memory module is present in the particular slot connector by reading the presence detect data from the memory module,
wherein a memory module is not present if the presence detect data read by the presence detect controller is invalid, and
wherein a memory module is present if the presence detect data read by the presence detect controller is valid.

20. The computer system of claim 19, wherein if the memory module is present, the memory controller connects the memory bus to the particular slot connector.

21. The computer system of claim 20, further comprising:
a clock line,
wherein the memory controller connects the clock line to the particular slot connector after determining that the memory module is present.

22. The computer system of claim 19, wherein the memory controller disconnects the memory bus from the particular slot connector before determining if the memory module is present.

23. The computer system of claim 22, further comprising:
a clock line,
wherein the memory controller disconnects the clock line from the particular slot connector before determining if the memory module is present.

24. The computer system of claim 19, further comprising:
a power line,
wherein the memory controller is further operable to connect the power line to the particular slot connector before determining if the memory module is present.

25. A computer system, comprising:
one or more memory modules, each memory module including presence detect logic for providing presence detect data;
one or more slot connectors, each for holding one memory module;
a hard disk drive for storing data capable of being held in the memory modules;
a memory bus connectable to each slot connector and coupled to the hard disk drive; and
a memory controller coupled to the memory bus and having a presence detect controller for reading presence detect data from the memory modules, the memory controller operable to cause the memory bus to be connected to a particular slot connector, and the presence detect controller operable to determine if a memory module is present in the particular slot connector by reading the presence detect data from the memory module,
wherein a memory module is not present if the presence detect data read by the presence detect controller is invalid, and
wherein a memory module is present if the presence detect data read by the presence detect controller is valid.

26. The computer system of claim 25, wherein if the memory module is present, the memory controller connects the memory bus to the particular slot connector.

27. The computer system of claim 26, further comprising:
a clock line,
wherein the memory controller connects the clock line to the particular slot connector after determining that the memory module is present.

28. The computer system of claim 25, wherein the memory controller disconnects the memory bus from the particular slot connector before determining if the memory module is present.

29. The computer system of claim 28, further comprising:
a clock line,
wherein the memory controller disconnects the clock line from the particular slot connector before determining if the memory module is present.

30. The computer system of claim 25, further comprising:
a power line,
wherein the memory controller is further operable to connect the power line to the particular slot connector before determining if the memory module is present.

31. The computer system of claim 25, wherein the memory controller further includes a timer for timing an exchange period, and wherein if the exchange period has expired the timer causes an indication to be provided to a user to warn the user that the insertion or removal operation will be aborted after a predetermined warning period.

32. The computer system of claim 25, wherein the memory controller further includes a timer for timing an exchange period and a warning period, wherein if the exchange period has expired the timer causes a request to be communicated to the user requesting a response from the user to continue waiting for the insertion or removal, and wherein the insertion or removal operation is aborted if no response is received during the warning period.

33. A computer system, comprising:

a memory module having presence detection logic connectable to a common presence bus for providing presence bits;

a connector capable of receiving the memory module, the connector being coupled to the common presence bus;

a memory bus connectable to the connector;

means for performing a read operation on the common presence bus directed to the memory module;

means for determining if valid presence bits were returned in response to the read operation;

means for providing an insertion confirmation that the memory module is inserted if valid presence bits were returned in response to the read operation; and means for connecting the memory bus to the connector in response to the insertion confirmation.

34. The computer system of claim 33, further comprising:

means for receiving an insertion indication that a memory module will be inserted into the connector, before performing the read operation; and means for inserting the memory module after receipt of the insertion indication.

* * * * *